(12) United States Patent
Merritt et al.

(10) Patent No.: US 9,970,394 B2
(45) Date of Patent: May 15, 2018

(54) FILTER HOUSING, FLUTED FILTER AND SAFETY FILTER

(71) Applicant: Baldwin Filters, Inc., Kearney, NE (US)

(72) Inventors: Steven J. Merritt, Kearney, NE (US); Farrell F. Calcaterra, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 428 days.

(21) Appl. No.: 14/417,029

(22) PCT Filed: Jul. 23, 2013

(86) PCT No.: PCT/US2013/051675
§ 371 (c)(1),
(2) Date: Jan. 23, 2015

(87) PCT Pub. No.: WO2014/018528
PCT Pub. Date: Jan. 30, 2014

(65) Prior Publication Data
US 2015/0204282 A1 Jul. 23, 2015

Related U.S. Application Data

(60) Provisional application No. 61/675,679, filed on Jul. 25, 2012.

(51) Int. Cl.
*F02M 35/024* (2006.01)
*B01D 46/00* (2006.01)
(Continued)

(52) U.S. Cl.
CPC ..... *F02M 35/0245* (2013.01); *B01D 46/0002* (2013.01); *B01D 46/0005* (2013.01);
(Continued)

(58) Field of Classification Search
CPC ......... F02M 35/0245; F02M 35/02483; F02M 35/02441; F02M 35/02416;
(Continued)

(56) References Cited

U.S. PATENT DOCUMENTS

| 1,700,126 A | 1/1929 | Godloe |
| 1,943,080 A | 1/1934 | Langston |

(Continued)

FOREIGN PATENT DOCUMENTS

| JP | H04-014758 | 2/1992 |
| JP | H09-508850 A | 9/1997 |

(Continued)

OTHER PUBLICATIONS

Patent Interference No. 106,021; Decision —Invalidity Motions; entered Jul. 31, 2017; 76 pages.

*Primary Examiner* — Christopher P Jones
*Assistant Examiner* — Britanny Precht
(74) *Attorney, Agent, or Firm* — Reinhart Boerner Van Deuren P.C.

(57) ABSTRACT

The present invention generally relates to filtration, and more particularly to filter assemblies including filter housings, filter elements and safety filter elements for filtering flowing fluid such as air.

21 Claims, 49 Drawing Sheets

(51) Int. Cl.
*B01D 46/52* (2006.01)
*F24F 13/08* (2006.01)
*B01D 46/10* (2006.01)

(52) U.S. Cl.
CPC ..... *B01D 46/0023* (2013.01); *B01D 46/0047* (2013.01); *B01D 46/106* (2013.01); *B01D 46/525* (2013.01); *F02M 35/02416* (2013.01); *F02M 35/02441* (2013.01); *F02M 35/02483* (2013.01); *F24F 13/085* (2013.01)

(58) Field of Classification Search
CPC .............. B01D 46/0005; B01D 46/525; B01D 46/0002; B01D 46/106; B01D 46/0047; B01D 46/0023; F24F 13/085
See application file for complete search history.

(56) References Cited

U.S. PATENT DOCUMENTS

| | | |
|---|---|---|
| 1,947,066 A | 2/1934 | Sieg |
| 1,954,881 A | 4/1934 | List |
| 3,025,963 A | 3/1962 | Bauer |
| 3,255,889 A | 6/1966 | Goldman et al. |
| 3,397,518 A | 8/1968 | Rogers |
| 3,438,588 A | 4/1969 | Steinholtz et al. |
| 3,676,247 A | 7/1972 | Morris et al. |
| 3,679,057 A | 7/1972 | Perez |
| 4,252,591 A | 2/1981 | Rosenberg |
| 4,253,228 A | 3/1981 | Easley |
| 4,257,790 A | 3/1981 | Bergquist et al. |
| 4,373,635 A | 2/1983 | Mules |
| 4,444,575 A | 4/1984 | Miller et al. |
| 4,498,989 A * | 2/1985 | Miyakawa ........... B01D 29/012 210/450 |
| 4,579,698 A | 4/1986 | Meyering et al. |
| 4,589,983 A | 5/1986 | Wydevan |
| 4,710,297 A | 12/1987 | Suzuki et al. |
| 4,720,292 A | 1/1988 | Engel et al. |
| 4,747,944 A | 5/1988 | George |
| H556 H | 12/1988 | Tarko |
| 4,798,575 A | 1/1989 | Siversson |
| 4,838,905 A | 6/1989 | Billiet et al. |
| 4,976,677 A | 12/1990 | Siversson |
| 4,976,857 A | 12/1990 | Solomon |
| 5,167,683 A | 12/1992 | Behrendt et al. |
| 5,182,015 A | 1/1993 | Lee |
| 5,186,829 A | 2/1993 | Janik |
| 5,213,275 A | 5/1993 | Giesy |
| 5,238,474 A | 8/1993 | Kahlbaugh et al. |
| 5,245,897 A | 9/1993 | Arnold et al. |
| 5,338,325 A | 8/1994 | Stanelle |
| 5,342,511 A | 8/1994 | Brown et al. |
| 5,346,675 A | 9/1994 | Usui et al. |
| 5,374,006 A | 12/1994 | Mheidle |
| 5,389,175 A | 2/1995 | Wenz |
| 5,435,870 A | 7/1995 | Takagaki et al. |
| 5,449,086 A | 9/1995 | Harris |
| 5,472,379 A | 12/1995 | Andress et al. |
| 5,484,466 A | 1/1996 | Brown et al. |
| 5,487,767 A | 1/1996 | Brown |
| 5,490,930 A | 2/1996 | Krull |
| 5,588,945 A | 2/1996 | Lauderbaugh |
| 5,525,226 A | 6/1996 | Brown et al. |
| 5,543,007 A | 8/1996 | Takagaki et al. |
| 5,609,711 A | 3/1997 | Miller |
| 5,669,949 A | 9/1997 | Dudrey et al. |
| 5,676,273 A | 10/1997 | Jonkers et al. |
| 5,685,985 A | 11/1997 | Brown et al. |
| 5,693,109 A | 12/1997 | Coulonvaux |
| 5,720,790 A | 2/1998 | Kometani et al. |
| 5,755,843 A | 5/1998 | Sundquist |
| 5,772,883 A | 6/1998 | Rothman et al. |
| 5,792,242 A | 8/1998 | Haskett |
| 5,792,247 A | 8/1998 | Gillingham et al. |
| 5,820,646 A | 10/1998 | Gillingham et al. |
| 5,895,574 A | 4/1999 | Friedmann et al. |
| 5,897,676 A | 4/1999 | Engel et al. |
| 5,902,364 A | 5/1999 | Tokar et al. |
| 5,906,740 A | 5/1999 | Brown et al. |
| 6,022,305 A | 2/2000 | Choi et al. |
| 6,024,229 A | 2/2000 | Ayers |
| 6,048,386 A | 4/2000 | Gillingham et al. |
| 6,126,833 A | 10/2000 | Stobbe et al. |
| 6,146,527 A | 11/2000 | Oelschlaegel |
| 6,156,089 A | 12/2000 | Stemmer et al. |
| 6,179,890 B1 | 1/2001 | Ramos et al. |
| D437,402 S | 2/2001 | Gieseke et al. |
| 6,187,188 B1 | 2/2001 | Janik et al. |
| 6,190,432 B1 | 2/2001 | Gieseke et al. |
| 6,210,469 B1 | 4/2001 | Tokar |
| 6,221,122 B1 | 4/2001 | Gieseke et al. |
| 6,235,195 B1 | 5/2001 | Tokar |
| 6,261,334 B1 | 7/2001 | Morgan et al. |
| D450,827 S | 11/2001 | Gieseke et al. |
| D450,828 S | 11/2001 | Tokar |
| 6,348,084 B1 | 2/2002 | Gieseke et al. |
| 6,348,085 B1 | 2/2002 | Tokar et al. |
| 6,350,291 B1 | 2/2002 | Gieseke et al. |
| 6,368,374 B1 | 4/2002 | Tokar et al. |
| 6,402,798 B1 | 6/2002 | Kallsen et al. |
| 6,405,875 B1 | 6/2002 | Culter |
| D460,169 S | 7/2002 | Anderson et al. |
| D461,003 S | 7/2002 | Gieseke et al. |
| 6,416,561 B1 * | 7/2002 | Kallsen .................. B01D 29/21 55/385.3 |
| 6,416,605 B1 | 7/2002 | Golden |
| D461,884 S | 8/2002 | Gieseke et al. |
| 6,436,162 B1 | 8/2002 | Wake et al. |
| 6,447,567 B1 | 9/2002 | Ehrenberg |
| 6,464,761 B1 | 10/2002 | Bugli |
| D466,602 S | 12/2002 | Gieseke et al. |
| 6,511,599 B2 | 1/2003 | Jaroszczyk et al. |
| 6,517,598 B2 | 2/2003 | Anderson et al. |
| 6,533,845 B2 | 3/2003 | Tokar et al. |
| D473,637 S | 4/2003 | Golden |
| 6,547,857 B2 | 4/2003 | Gieseke et al. |
| 6,599,344 B2 | 7/2003 | Tokar et al. |
| 6,610,117 B2 | 8/2003 | Gieseke et al. |
| 6,610,126 B2 | 8/2003 | Xu et al. |
| 6,610,177 B2 | 8/2003 | Tsay et al. |
| D483,459 S | 12/2003 | DeWit et al. |
| D484,584 S | 12/2003 | Anderson et al. |
| 6,673,136 B2 | 1/2004 | Gillingham et al. |
| 6,703,675 B1 | 3/2004 | Rodgers |
| 6,706,087 B1 | 3/2004 | Gebler et al. |
| 6,743,317 B2 | 6/2004 | Wydeven |
| 6,746,518 B2 | 6/2004 | Gieseke et al. |
| 6,783,565 B2 | 8/2004 | Gieseke et al. |
| 6,851,569 B2 | 2/2005 | Conti et al. |
| 6,852,141 B2 | 2/2005 | Bishop et al. |
| 6,878,190 B1 | 4/2005 | Xu et al. |
| 6,887,343 B2 | 5/2005 | Schukar et al. |
| 6,890,366 B2 * | 5/2005 | Bugli .................. B01D 46/0005 55/385.3 |
| 6,893,561 B2 | 5/2005 | Janiek |
| D506,539 S | 6/2005 | Bishop et al. |
| 6,946,012 B1 | 9/2005 | Miller et al. |
| 6,959,819 B2 | 11/2005 | Moscaritolo et al. |
| 6,960,245 B2 | 11/2005 | Tokar et al. |
| 6,966,940 B2 | 11/2005 | Krisko et al. |
| 6,974,490 B2 | 12/2005 | Gillingham et al. |
| 6,994,744 B2 | 2/2006 | Tokar et al. |
| 6,997,968 B2 | 2/2006 | Xu et al. |
| 7,001,450 B2 | 2/2006 | Gieseke et al. |
| 7,008,465 B2 | 3/2006 | Graham et al. |
| 7,008,467 B2 | 3/2006 | Krisko et al. |
| 7,070,642 B2 * | 7/2006 | Scott .................. B01D 46/0001 55/498 |
| 7,090,712 B2 | 8/2006 | Gillingham et al. |
| 7,150,903 B2 | 12/2006 | Frey |
| 7,168,573 B2 | 1/2007 | Brown et al. |
| 7,179,317 B2 | 2/2007 | Chung et al. |
| 7,211,124 B2 | 5/2007 | Gieseke et al. |

(56) References Cited

U.S. PATENT DOCUMENTS

| | | | |
|---|---|---|---|
| 7,252,704 B2 | 8/2007 | Tokar et al. | |
| 7,255,300 B2 | 8/2007 | Johnston | |
| 7,261,756 B2 | 8/2007 | Merritt | |
| 7,270,692 B2 | 9/2007 | Gillingham et al. | |
| 7,282,075 B2 | 10/2007 | Sporre et al. | |
| 7,303,604 B2 | 12/2007 | Gieseke et al. | |
| 7,316,723 B2 | 1/2008 | Chung et al. | |
| 7,318,851 B2 | 1/2008 | Brown et al. | |
| 7,318,852 B2 | 1/2008 | Chung et al. | |
| 7,323,029 B2 | 1/2008 | Engelland et al. | |
| 7,329,326 B2 | 2/2008 | Wagner et al. | |
| 7,338,544 B2 | 3/2008 | Sporre et al. | |
| 7,341,613 B2 | 3/2008 | Kirsch | |
| 7,351,270 B2 | 4/2008 | Engelland et al. | |
| 7,393,375 B2 | 7/2008 | Xu et al. | |
| 7,396,375 B2 | 7/2008 | Nepsund et al. | |
| 7,396,376 B2 | 7/2008 | Schrage et al. | |
| 7,662,216 B1* | 2/2010 | Terres | B01D 46/0005 55/482 |
| 7,674,308 B2 | 3/2010 | Krisko et al. | |
| 7,695,539 B2 | 4/2010 | Waibel | |
| 7,753,982 B2 | 7/2010 | Merritt | |
| 7,905,936 B2* | 3/2011 | Coulonvaux | B01D 46/0023 55/357 |
| 7,931,725 B2* | 4/2011 | Wydeven | B01D 46/0005 123/198 E |
| 7,959,703 B2* | 6/2011 | Merritt | B01D 46/0001 55/498 |
| 8,083,825 B2 | 12/2011 | Mosset et al. | |
| 8,147,576 B2* | 4/2012 | Gillenberg | B01D 46/0046 210/248 |
| 8,419,938 B2* | 4/2013 | Ries | B01D 29/15 210/236 |
| 8,506,668 B2* | 8/2013 | Swanson | B01D 46/2411 55/498 |
| 8,518,139 B2* | 8/2013 | Jessberger | B01D 46/0005 55/495 |
| 8,673,043 B2* | 3/2014 | Merritt | B01D 46/527 422/169 |
| 8,852,310 B2* | 10/2014 | Holzmann | B01D 46/0001 55/484 |
| 8,864,866 B2* | 10/2014 | Osendorf | B01D 46/0005 210/493.2 |
| 8,888,885 B2* | 11/2014 | Barreteau | B01D 46/0001 210/493.1 |
| 9,067,161 B2* | 6/2015 | Campbell | B01D 46/2411 |
| 9,212,635 B2* | 12/2015 | Von Merkatz | B01D 46/0005 |
| 9,242,197 B2* | 1/2016 | Croissant | B01D 46/525 |
| 9,440,173 B2* | 9/2016 | Ohashi | B01D 46/0002 |
| 9,623,351 B2* | 4/2017 | Kindkeppel | B01D 35/30 |
| 2002/0100262 A1 | 8/2002 | Gieseke et al. | |
| 2002/0184864 A1 | 12/2002 | Bishop et al. | |
| 2002/0185008 A1 | 12/2002 | Anderson et al. | |
| 2003/0089654 A1 | 5/2003 | Jainek | |
| 2003/0121845 A1 | 7/2003 | Wagner et al. | |
| 2003/0146149 A1 | 8/2003 | Binder et al. | |
| 2003/0182909 A1 | 10/2003 | Gieseke et al. | |
| 2003/0217534 A1 | 11/2003 | Krisko et al. | |
| 2003/0226800 A1 | 12/2003 | Brown et al. | |
| 2004/0071940 A1 | 4/2004 | Frey | |
| 2004/0118771 A1 | 6/2004 | Schukar et al. | |
| 2004/0206058 A1 | 10/2004 | Bugli et al. | |
| 2004/0221555 A1 | 11/2004 | Engelland et al. | |
| 2005/0029184 A1 | 2/2005 | Desmarais | |
| 2005/0166561 A1 | 8/2005 | Schrage et al. | |
| 2005/0183405 A1 | 8/2005 | Gillingham et al. | |
| 2005/0229561 A1 | 10/2005 | Nepsund et al. | |
| 2005/0252182 A1 | 11/2005 | Golden et al. | |
| 2006/0081528 A1 | 4/2006 | Oelpke et al. | |
| 2006/0090431 A1 | 5/2006 | Brown | |
| 2006/0090432 A1* | 5/2006 | Merritt | B01D 46/0002 55/482 |
| 2006/0090434 A1 | 5/2006 | Brown et al. | |
| 2006/0091061 A1* | 5/2006 | Brown | B01D 46/527 210/440 |
| 2006/0091064 A1 | 5/2006 | Brown et al. | |
| 2006/0091066 A1 | 5/2006 | Driml et al. | |
| 2006/0091084 A1 | 5/2006 | Merritt et al. | |
| 2006/0101795 A1 | 5/2006 | Krisko et al. | |
| 2006/0137316 A1 | 6/2006 | Krull et al. | |
| 2006/0151655 A1 | 7/2006 | Johnston | |
| 2006/0163150 A1 | 7/2006 | Golden et al. | |
| 2007/0039296 A1 | 2/2007 | Schrage et al. | |
| 2007/0175194 A1 | 8/2007 | Nepsund et al. | |
| 2007/0186528 A1 | 8/2007 | Wydeven et al. | |
| 2007/0193236 A1 | 8/2007 | Merritt | |
| 2007/0199285 A1 | 8/2007 | Gieseke et al. | |
| 2007/0234903 A1 | 10/2007 | Xu et al. | |
| 2007/0261374 A1 | 11/2007 | Nelson et al. | |
| 2007/0289265 A1 | 12/2007 | Coulonvaux et al. | |
| 2008/0010959 A1 | 1/2008 | Gillingham et al. | |
| 2008/0016832 A1 | 1/2008 | Krisko et al. | |
| 2008/0022641 A1 | 1/2008 | Engelland et al. | |
| 2008/0060329 A1 | 3/2008 | Brown et al. | |
| 2008/0066434 A1 | 3/2008 | Kuempel et al. | |
| 2008/0086990 A1 | 4/2008 | Kuempel et al. | |
| 2008/0110142 A1 | 5/2008 | Nelson et al. | |
| 2008/0110822 A1 | 5/2008 | Chung et al. | |
| 2008/0115470 A1 | 5/2008 | Kuempel et al. | |
| 2008/0115758 A1 | 5/2008 | Engelland et al. | |
| 2008/0135471 A1 | 6/2008 | Merritt et al. | |
| 2008/0209874 A1 | 9/2008 | Gieseke et al. | |
| 2008/0216654 A1 | 9/2008 | Wagner et al. | |
| 2008/0250763 A1 | 10/2008 | Widerski et al. | |
| 2008/0250766 A1 | 10/2008 | Schrage et al. | |
| 2008/0264020 A1 | 10/2008 | Schrage et al. | |
| 2009/0114590 A1 | 5/2009 | Merritt et al. | |
| 2009/0241494 A1 | 10/2009 | Schrage et al. | |
| 2009/0255227 A1 | 10/2009 | Schrage et al. | |
| 2009/0266041 A1 | 10/2009 | Schrage et al. | |
| 2009/0301045 A1 | 12/2009 | Nelson et al. | |
| 2009/0320423 A1 | 12/2009 | Merritt et al. | |
| 2009/0320424 A1 | 12/2009 | Merritt et al. | |
| 2010/0000934 A1 | 1/2010 | Brown | |
| 2010/0011725 A1 | 1/2010 | Babb | |
| 2010/0044297 A1 | 2/2010 | Krogue et al. | |
| 2010/0115897 A1 | 5/2010 | Krisko et al. | |
| 2010/0242425 A1* | 9/2010 | Swanson | B01D 46/2411 55/498 |
| 2011/0173937 A1* | 7/2011 | Nelson | B01D 46/0005 55/497 |
| 2011/0197556 A1 | 8/2011 | Brown et al. | |
| 2015/0068174 A1 | 3/2015 | Krisko et al. | |

FOREIGN PATENT DOCUMENTS

| | | |
|---|---|---|
| JP | 2004-508169 A | 3/2004 |
| JP | 2007-530259 A | 11/2007 |
| JP | 2008-518757 A | 6/2008 |
| JP | 2008-540088 A | 11/2008 |
| JP | 2011-528987 A | 12/2011 |
| WO | WO 91/19898 A1 | 12/1991 |
| WO | WO 02/20135 A2 | 3/2002 |
| WO | WO 2002/098540 A1 | 12/2002 |
| WO | WO 2013/139992 A1 | 12/2002 |
| WO | WO 2005/094655 A2 | 10/2005 |
| WO | WO 2006/119414 A1 | 11/2006 |
| WO | WO 2010/011628 A2 | 1/2010 |

\* cited by examiner

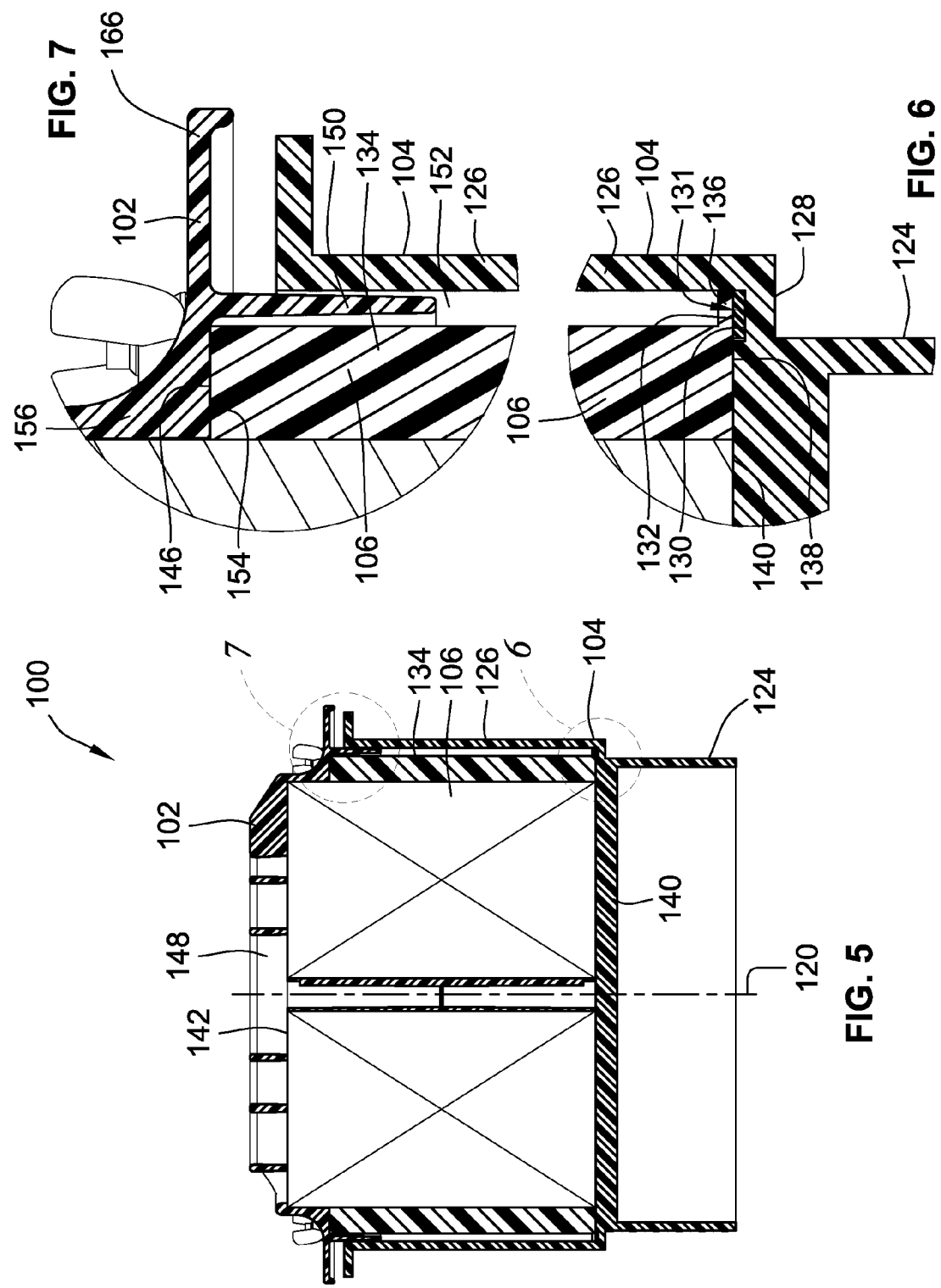

FILTER HOUSING, FLUTED FILTER AND SAFETY FILTER

FIELD OF THE INVENTION

The present invention generally relates to fluid filtration, and more particularly to filter assemblies including filter housings, filter elements and safety filter elements for filtering flowing fluid, such as air.

BACKGROUND OF THE INVENTION

Various systems require filtration of fluid prior to use of the fluid within the system. For instance, engines utilize air filtration systems for filtering air, the fluid, prior to using the air within the engine to combust a fuel. These filtration systems will typically utilize a housing that cooperates with a replaceable filter element to filter the flowing fluid. When the filter element becomes spent, such as when it has become full with removed dust particulates, the filter element can be removed from the filter housing.

One particular type of filter element used in air filtration is fluted filter media, which as used herein will be broad enough to include, but not limited to gathered, corrugated and tapered, fluted filter media. In one instance, the filter media is wound to form a media pack. The axis for winding the filter media is typically parallel to the general flow direction through the filter media. If the filter media pack is not properly supported or becomes too large, the media pack can telescope due to the pressure differential across the media pack during operation.

The invention provides improvements over the current state of the art of filtration assemblies.

BRIEF SUMMARY OF THE INVENTION

Various embodiments of filter assemblies including filter housings and filter elements are provided. One aspect of many of the embodiments is that the filter assemblies include one or more grates that extend across an outlet end of the filter media of the primary filter element to prevent telescoping thereof. Preferably, the grate is not provided by the filter element itself.

Other aspects are also provided by embodiments of the present invention. For instance, in some embodiments, the seal member for sealing the primary filter element to the housing is provided by a secondary filter element.

In one embodiment, a filter assembly comprising a filter housing, a first grate, a cover, a seal, and a filter element is provided. The filter housing defines an internal cavity, an inlet and an outlet. The first grate is interposed between the inlet and the outlet. The cover is axially spaced from the first grate. The filter element has filter media. The filter element is axially interposed between the first grate and the cover and positioned, at least in part, within the internal cavity of the housing. The seal acts between the filter element and the filter housing preventing bypass around the filter media from the inlet to the outlet.

In a particular embodiment, the filter element has an inlet flow face and an outlet flow face. The first grate extends across and axially adjacent the outlet flow face and the cover extends across and axially adjacent/proximate the inlet flow face. The first grate is adjacent the outlet flow face substantially inhibiting telescoping of the filter media in a direction of flow through the filter assembly.

In one embodiment, the first grate is integrally formed as part of the filter housing as a one-piece construction (i.e. formed from a continuous piece of material).

In one embodiment, the first grate is an independent component part from the filter housing and is removable therefrom and is independent from the seal and the filter element.

In one embodiment, the seal is compressed axially between the filter housing and the filter element forming an axial seal.

In one embodiment, the filter element includes an outer wrapper. The filter media is positioned within the outer wrapper and is circumscribed by the outer wrapper. In a more particular embodiment, the outer wrapper is imperforate and is plastic.

In one embodiment, the seal is compressed axially between the filter housing and the outer wrapper. In a preferred embodiment, the seal is not carried by the filter element and is shipped loose from the filter element.

In one embodiment, the outer wrapper includes a radially outward extending flange. The seal is axially compressed between the radially outward extending flange and the filter housing.

In one embodiment, the outer wrapper includes a plurality of a support ribs extending radially outward, the ribs being axially elongated.

In one embodiment, the outer wrapper includes a radially outward extending flange that extends radially outward further than the support ribs.

In one embodiment, the filter media has a first axial length between an inlet face of the filter element and an outlet face of the filter element. The wrapper has a second axial length being less than the first axial length such that an exposed portion of the outer cylindrical periphery of the filter media extends axially out of the outer wrapper. In one embodiment, the cover includes an annular axially extending first flange portion that circumscribes the exposed portion of the filter media when the filter assembly is assembled. In another embodiment, the cover includes an annular axially extending second flange portion. The second flange portion extends axially into the internal cavity of the filter housing and is radially interposed between the filter element and the filter housing. The second flange portion being radially spaced from the first flange portion radially outward.

In a more particular embodiment, the cover includes a radially outward extending annular mounting flange and the filter housing includes a radially outward extending mounting flange. The mounting flanges of the cover and the filter housing axially abutting or are proximate one another when the filter assembly is assembled. A seal member may be axially pinched between the mounting flanges.

In one more particular embodiment, the first and second flange portions of the cover provide a stepped relationship with the first flange portion having an internal diameter that is less than an internal diameter of the second flange portion. A radially extending portion connects the first and second flanges. Further, the first and second flange portions are axially offset from one another along the axis running between the inlet face and the outlet face of the filter element.

In one embodiment, the filter element includes a radially outward directed seal support flange operably secured to the filter media and the seal is axially compressed between the seal support flange and the housing, and particularly a mounting flange of the housing.

In one embodiment, the housing includes a radially outward directed seal support flange. The seal is axially compressed between the seal support flanges of the housing and the filter element.

Attachment mechanisms can be provided for securing the cover to the housing. In one embodiment, the attachment mechanisms includes at least one of A) screws extending through the seal support flanges of the housing and the filter element or B) latches securing the cover to the housing.

Preferably, the filter media is fluted filter media.

In one embodiment, a filter element including a media pack, and an outer wrapper is provided. The fluted filter media pack has an inlet flow face and an outlet flow face. Flutes of the fluted filter media extending between the inlet and outlet flow faces. The outer wrapper circumscribes the fluted filter media pack and extends axially less than an entire length of the flutes of the fluted filter media pack such that an axially extending portion of the fluted filter media pack is exposed.

In one embodiment, the outer wrapper defines a distal end axially offset from the inlet flow face. The outer wrapper includes a radially outward extending flange proximate the distal end.

In another embodiment, a filter assembly comprising a filter housing, a primary filter element and a secondary filter element is provided. The filter housing defines an internal cavity, an inlet and an outlet. The primary filter element has a media pack and a sealing flange. The media pack extends axially between an inlet end and an outlet end. The sealing flange has a radially outward facing sealing face. The sealing flange being operably secured to the media pack. The safety filter element has filter media, a seal support structure, an outward directed radial seal surface and an inward directed radial seal surface. The seal support structure is operably secured to the filter media. The outward directed radial seal surface is supported by the seal support structure and sealingly engages an inner surface of the filter housing. The inward directed radial seal surface is supported by the seal support structure and sealingly engages the radially outward facing sealing face of the sealing flange of the primary filter element.

In one embodiment, the seal support structure has a seal support supporting the inward and outward seal surfaces and an intermediate section extending between the seal support and the filter media of the safety filter element. The intermediate section and the inward directed radial seal surface form a channel therebetween axially receiving the sealing flange of the primary filter therein when the radially outward facing sealing face thereof engages the inward directed radial seal surface of the safety filter element.

In one embodiment, the seal support is a generally axially extending first flange and the intermediate section includes a second generally axially extending second flange spaced radially inward therefrom. The intermediate section structure further includes a radially extending section coupling the first and second flanges.

In one embodiment, the outward and inward directed radial seal surfaces are provided by a single seal member. In a further embodiment, the single seal member is attached to the seal support with the seal support radially interposed between the inward and outward directed radial seal surfaces. In a more particular embodiment, the seal support includes radially directed reliefs formed therethrough, the seal member extending radially through the reliefs. The reliefs may be slots or apertures.

In one embodiment, the safety filter axially abuts the fluted media pack of the primary filter when assembled to prevent telescoping of the fluted media pack.

In one embodiment, the safety filter includes a grate axially abutting the outlet end of the fluted media pack.

In one embodiment, an inlet face of the filter media of the safety filter element is axially closer to the outlet end of the fluted media pack of the primary filter than the engagement between the sealing flange of the primary filter element and the inward directed radial seal surface.

In one embodiment, the filter housing has a radially inward directed step. The safety filter element axially abuts the radially inward directed step.

In one embodiment, the sealing flange is more rigid than a material forming the inward directed radial seal surface.

Preferably, the seal member is formed from foamed polyurethane.

In one embodiment, the sealing face of the sealing flange is axially spaced from the media pack.

In one embodiment, the sealing face of the sealing flange is axially positioned, at least in part, between the inlet and outlet ends of the fluted media pack.

In one embodiment, the outward directed radial seal surface is axially spaced from the inward directed radial seal surface.

In one embodiment, the inward directed radial seal surface is axially closer to the outlet end of the fluted media pack of the primary filter element than the outward directed radial seal surface, when assembled.

In one embodiment, the seal support structure axially receives, at least part of, the primary filter element when the filter assembly is assembled.

In one embodiment, at least part of the inward directed radial seal surface is axially between the inlet end and the outlet end of the fluted media pack when the filter assembly is assembled.

In another embodiment, a safety filter element (also referred to as a secondary filter element) is provided. The secondary filter element includes filter media; an outward directed radial seal surface; an inward directed radial seal surface; and a seal support structure. The seal support structure is operably secured to the filter media and supports the outward and inward directed radial seal surfaces. The seal support structure has a seal support supporting the inward and outward directed radial seal surfaces and an intermediate section extending between the seal support and the filter media. The intermediate section and the inward directed radial seal surface form a channel therebetween with the radially inward directed radial seal surface faces the intermediate portion.

In one embodiment, the seal support is a generally axially extending first flange and the intermediate section includes a second generally axially extending second flange spaced radially inward therefrom. The intermediate section further includes a radially extending section coupling the first and second flanges.

Preferably, the outward and inward directed radial seal surfaces are provided by a single seal member. Preferably, the single seal member is attached to the seal support with the seal support radially interposed between the inward and outward directed radial seal surfaces.

In another embodiment, a primary filter element including a media pack and a rigid seal flange is provided. The media pack is preferably fluted and has an inlet end and an outlet end. The rigid seal flange is secured to the fluted media pack. The rigid seal flange defines a radially outward directed seal surface for sealing with a softer sealing material.

In one embodiment, the radially outward directed seal surface is axially spaced from an outlet end of the fluted media pack.

In one embodiment, the filter element further includes an intermediate portion connecting the rigid seal flange to the fluted media pack. In a more particular embodiment, the intermediate portion is secured to a radially outer periphery of the fluted media pack and is dimensioned radially greater than the rigid seal flange.

In one embodiment, the radially outward directed seal surface is, at least in part, axially positioned between the inlet and outlet ends of the fluted media pack.

In another embodiment, a filter assembly including a filter housing, a primary filter element and a safety filter element is provided. The filter housing defines an internal cavity, an inlet and an outlet. The primary filter element has a fluted media pack extending axially between an inlet end and an outlet end. The primary filter element also has a sealing flange having a radially outward facing sealing face. The sealing flange is operably secured to the media pack to prevent fluid flow therebetween. The safety filter element is tubular defining an internal cavity in which the fluted media pack of the primary filter element extends. The tubular safety filter element has a tubular ring of filter media; an outward directed radial seal surface operably attached to the filter media sealingly engaging an inner surface of the filter housing; and an inward directed radial seal surface operably attached to the filter media sealingly engaging the radially outward facing sealing face of the sealing flange of the primary filter element.

In one embodiment, the tubular safety filter further includes an end cap closing an end of the filter media thereof. In one embodiment, the fluid flow path through the filter assembly includes initially entering into the inlet end of the fluted media pack of the primary element, passing axially through the fluted media pack and exiting the outlet end, and then passing radially outward through the tubular safety filter.

In one embodiment, the primary filter element includes a generally imperforate cylindrical wrapper extending axially between the inlet and outlet ends of the fluted media pack. The outlet end fluidly communicates with the internal cavity of the tubular safety filter.

In one embodiment, the assembly further includes a support structure axially supporting at least a portion of the outlet end of the primary filter element.

In one embodiment, the filter housing includes a decreasing diameter section that decreases in dimension along the fluid flow direction. The decreasing diameter section includes a plurality of flow dividing fins extending generally radially inward.

In one embodiment, the flow dividing fins define an axial abutment against which the tubular safety filter abuts when inserted within the housing.

In one embodiment, the tubular safety filter is generally positioned between the inlet of the housing and the flow dividing fins.

In one embodiment, the inward directed radial seal surface is spaced radially inward from an inner cylindrical periphery of the tubular ring of filter media and the outward directed radial seal surface is spaced radially outward from an outer cylindrical periphery of the tubular ring of filter media.

In one embodiment, the primary filter element has an outer cylindrical periphery and a radial gap is formed between the outer cylindrical periphery of the primary filter element and the inner cylindrical periphery of the tubular ring of filter media.

In one embodiment, a support grate is positioned proximate the outlet end of the fluted media pack within the internal cavity of the tubular safety filter.

Another embodiment of a filter assembly includes a filter housing, an annular seal member, a filter element and a cover. The filter housing defines an internal cavity and an open inlet end. The annular seal member is carried on the open inlet end. The filter element includes a media pack and an air swirler attached to the media pack and extending, at least partially, radially outward beyond the media pack. The air swirler engages an axial end of the annular seal member.

In more particular embodiments, the cover defines an inlet and radially seals on a radially outer periphery of the annular seal member.

In one embodiment, the air swirler includes a plurality of veins defining radially inward directed flow passages. The cover includes an outer annular skirt defining swirler inlet ports therein.

In another embodiment, a filter assembly including a filter housing, a cover, a primary filter element and secondary filter element is provided. The filter housing defines an internal cavity. The cover attaches to the housing. The primary filter element is positioned within the internal cavity and has a media pack. The secondary filter element has filter media, an upstream grate, a downstream grate, and a seal member. The upstream grate attaches to the filter media and is located proximate an upstream side of the filter media. The upstream grate is proximate a downstream end of the media pack of the primary filter element. The downstream grate attaches to the filter media and is located proximate a downstream side of the filter media. The attachment between the grates and the media need not be direct but could be provided by intervening structure of the secondary filter element. The seal member is axially compressed between the primary filter element and the filter housing providing the seal for both the primary filter element and the secondary filter element relative to the housing.

In one embodiment, the primary filter element includes an outer imperforate wrapper and includes a seal flange. The seal flange extends radially inward over a portion of the downstream end of the media pack of the primary filter element. The seal member is axially compressed between the filter housing and an axial face of the seal flange. The seal member is sealingly engaged with the grates and the filter media of the secondary filter element.

In another embodiment, a filter assembly comprising a filter housing, a cover, a primary and a secondary filter element is provided. The filter housing defines an internal cavity. The cover is attached to the housing. The primary filter element is positioned within the internal cavity and has a media pack. The secondary filter element has filter media, upstream and downstream grates, and first and second seal members. The upstream grate is attached to the filter media and located proximate an upstream side of the filter media. The upstream grate is proximate a downstream end of the media pack of the primary filter element. The downstream grate is attached to the filter media and is located proximate a downstream side of the filter media. The first seal member is axially compressed between the primary filter element and a seal support member of the secondary filter element. The second seal member is axially compressed between the seal support member and the filter housing.

In one embodiment, the filter housing includes an outer annular sidewall extending between an inlet end and an outlet end of the filter housing. The filter housing further includes an inner annular sidewall spaced radially inward from the outer annular sidewall forming an annular trough therebetween with a mouth axially facing the inlet end of the filter housing. A radially extending abutment surface extends radially between the inner and outer annular sidewalls forming a bottom of the trough. The second seal member is axially compressed against the abutment surface.

In one embodiment, the seal support member extends axially into the annular trough. In one embodiment, the downstream grate rests axially against a distal end of the inner annular sidewall proximate the mouth of the trough.

In one embodiment, the primary filter element includes a sealing flange extending radially inward over the downstream end of the media pack of the primary filter element. The sealing flange axially compresses against the first seal member.

Another embodiment of a filter assembly includes a filter housing, a cover, a primary filter element and a secondary filter element. The filter housing defines an internal cavity extending between an inlet and an outlet. The filter housing has a radially extending seal surface axially facing the inlet. The housing has a downstream support grate interposed between the inlet and the outlet. The cover is attached to the housing. The primary filter element is positioned within the internal cavity and has a media pack. A seal member is operably attached to the media pack and is axially biased against and seals with the radially extending seal surface of the filter housing. The secondary filter element has filter media positioned upstream and against the downstream support grate. A removable grate is axially interposed between the filter media of the secondary filter element and the media pack of the primary filter element proximate a downstream end of the media pack of the primary filter element.

In one embodiment, the filter housing includes an outer annular sidewall extending between the inlet end and the outlet end of the filter housing. The outer annular wall may be stepped. The filter housing further includes an inner annular sidewall spaced radially inward from the outer annular sidewall forming an annular trough therebetween with a mouth axially facing the inlet end of the filter housing. The radially extending seal surface extending radially between the inner and outer annular sidewalls forming a bottom of the trough, the seal member extending axially into the trough through the mouth.

In one embodiment, the removable grate includes an axially extending annular flange. The axially extending annular flange extending into the trough to radially locate the removable grate relative to the housing. The grate can be axially located on a distal end of the inner annular sidewall.

Another filter assembly includes a filter housing, a seal member, a tubular primary filter element, and a secondary filter element. The filter housing defines an internal cavity extending between an inlet and an outlet. The seal member is attached to the filter housing proximate the inlet defining a radially inward directed seal surface. The tubular primary filter element includes a tubular media pack extending between an inlet end and an outlet end. The tubular media pack has a generally imperforate inner periphery extending between the inlet and outlet ends. The tubular primary filter element also includes an axially extending seal flange attached to the tubular media pack proximate the inlet end. The axially extending seal flange defining a radially outward directing seal surface. The radially outward directed seal surface engages the radially inward directed seal surface of the seal member. The secondary filter element is positioned within the tubular primary filter element. The secondary filter element includes a closed end proximate the inlet end of the tubular media pack of the tubular media pack; a radially directed seal carried at the closed end radially engaging the inner periphery of the tubular media pack; and a third seal member sealing an open end of the secondary filter element to the filter housing proximate the outlet. A fluid flow path through the filter assembly flows axially through the primary filter element and then radially through the secondary filter element, and then axially out of the secondary filter element.

In one embodiment, the filter housing includes a perforate axial abutment shelf against which the primary filter element axially abuts proximate the outlet end of the tubular media pack. A radial gap is formed between the primary and secondary filter elements. The seal member is releasably mechanically secured to the filter housing.

In one embodiment, if a cover is provided, such a cover sealingly engages the seal member. The cover is located proximate the inlet of the housing. Typically, this would be by way of an axial seal or by engaging a radially outer sealing surface of the seal member. In another embodiment, a dual element media pack is provided. The dual element media pack includes an outer tubular media pack having an outer imperforate wrapper portion. The tubular media pack defines an internal cavity in which an inner cylindrical media pack is positioned. The inner cylindrical media pack includes an outer imperforate wrapper portion. Fluid flow through the media pack travels axially from an inlet end of the tubular media pack axially toward an outlet end through the filter media thereof. The fluid will then flow radially inward toward an inlet end of the cylindrical media pack. The fluid will then flow axially from the inlet end of the cylindrical media pack toward the outlet end of the cylindrical media pack. In a more particular embodiment, an inner periphery of the tubular media pack defining the internal cavity is provided by an inner imperforate wrapper portion.

Another embodiment of a filter assembly includes an upstream housing section; a downstream housing section; and a filter element axially interposed between the upstream and downstream housing sections. The filter element includes a media pack surrounded by an outer wrapper. The outer wrapper forms at least part of a flow path through the filter assembly separating the flow path from the surrounding ambient.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIGS. 1-7 illustrate a first embodiment of a filter assembly;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
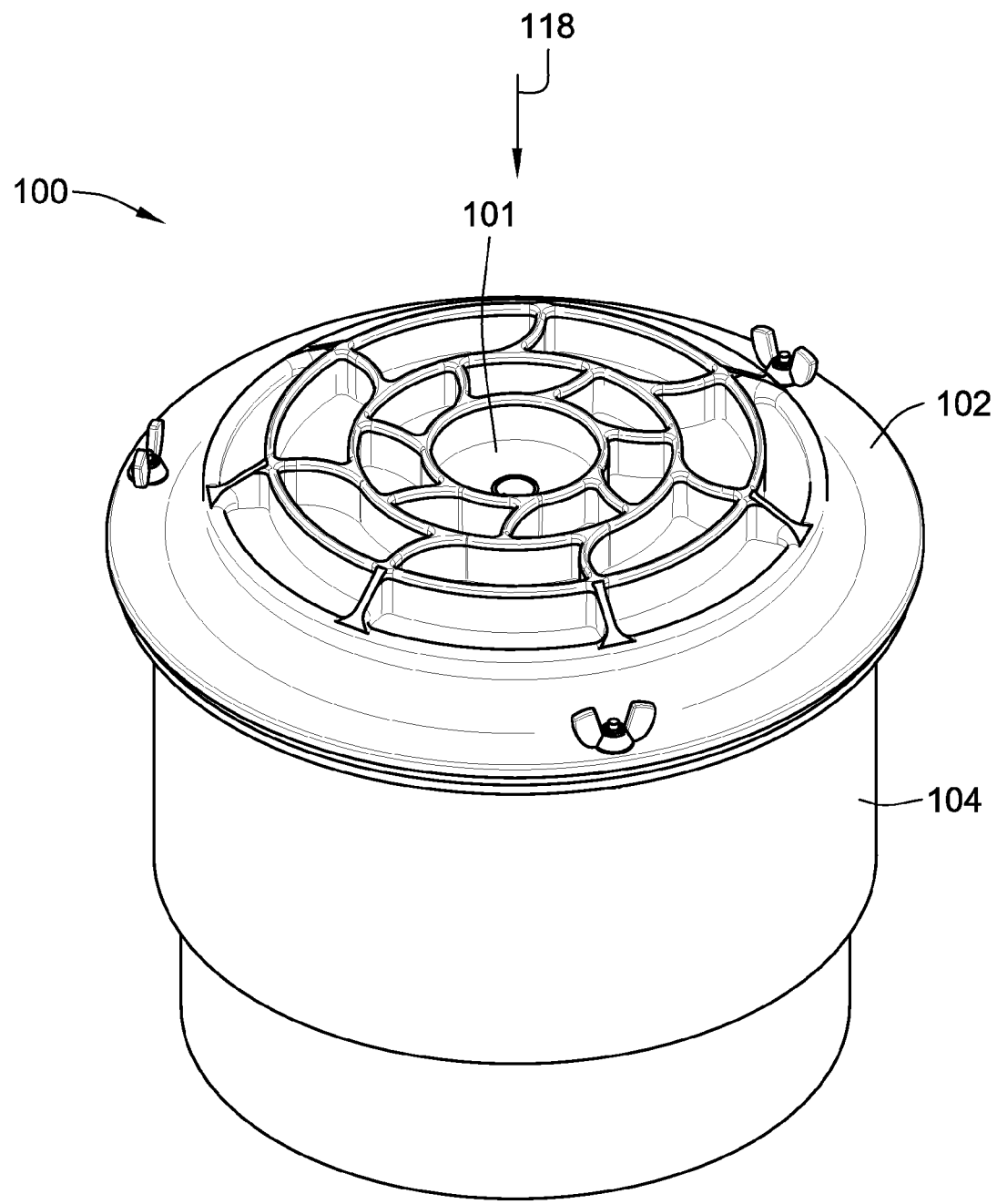

FIG. 1 illustrates a filter assembly 100 according to a first embodiment of the present invention. The filter assembly 100 is generally configured for removing contaminants and particulates within a flowing air stream. Typically, the air stream will be used for supplying air to an engine such as an internal combustion engine or turbine. However, the filter assemblies of the present invention can be used for alternative systems as well as for filter fluids such as liquids.

The filter assembly 100 includes a cover 102 (a "cover" as used herein may also be referred to as a "lid"). The filter assembly 100 also includes a filter housing 104 and a filter element 106 (see FIG. 2) positioned within the filter housing 104.

Figure 2:
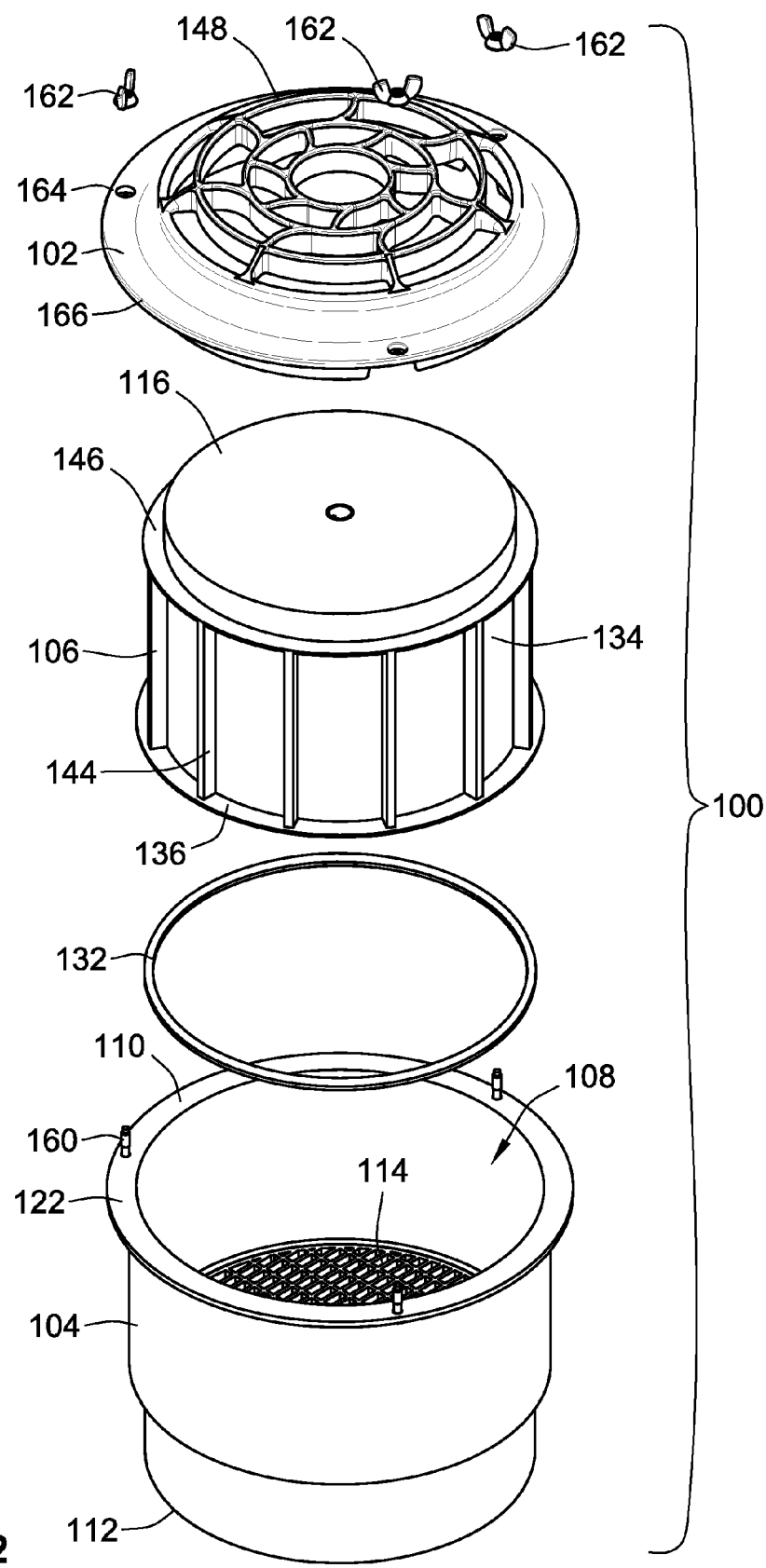
Figure 3:
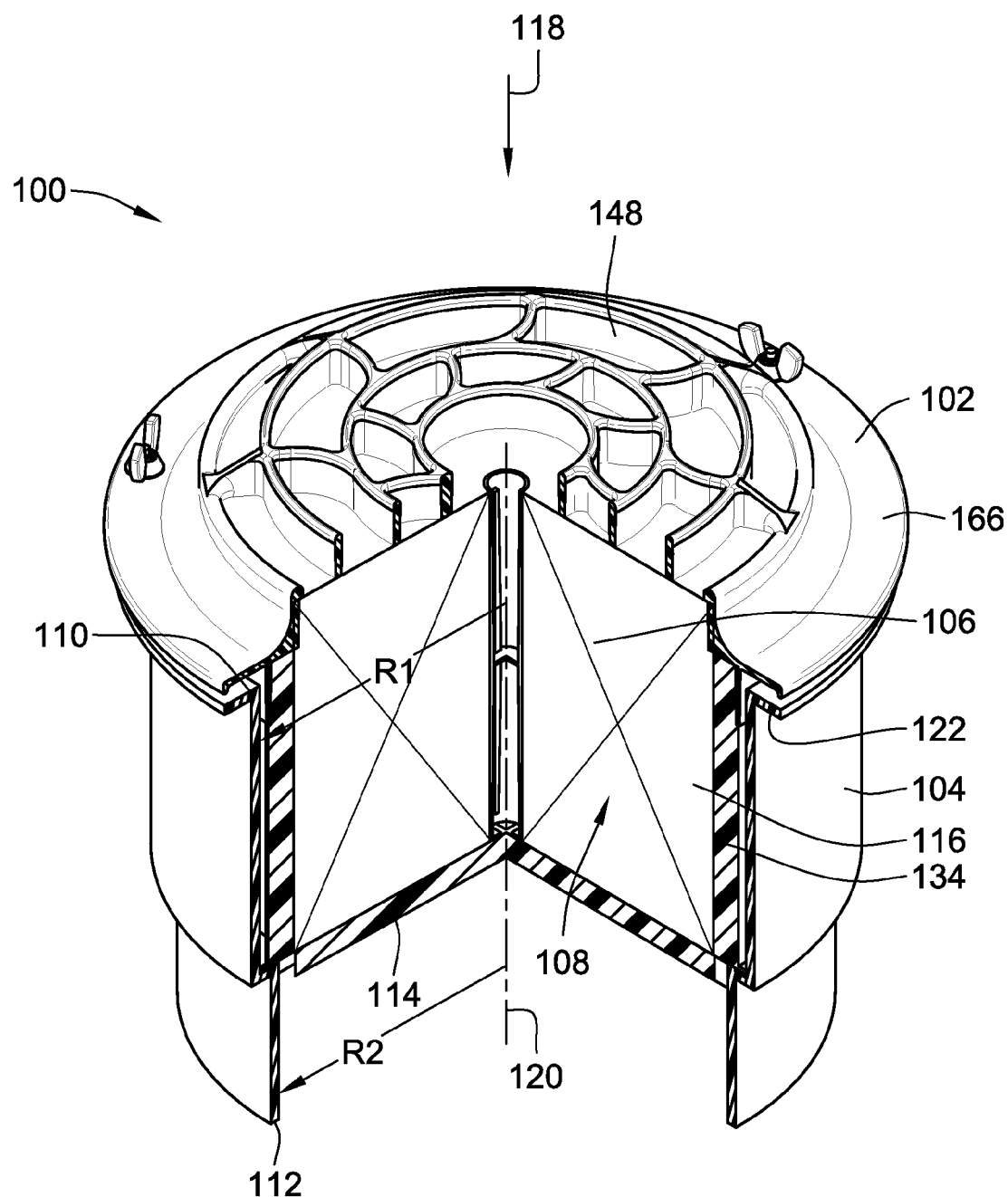
Figure 4:
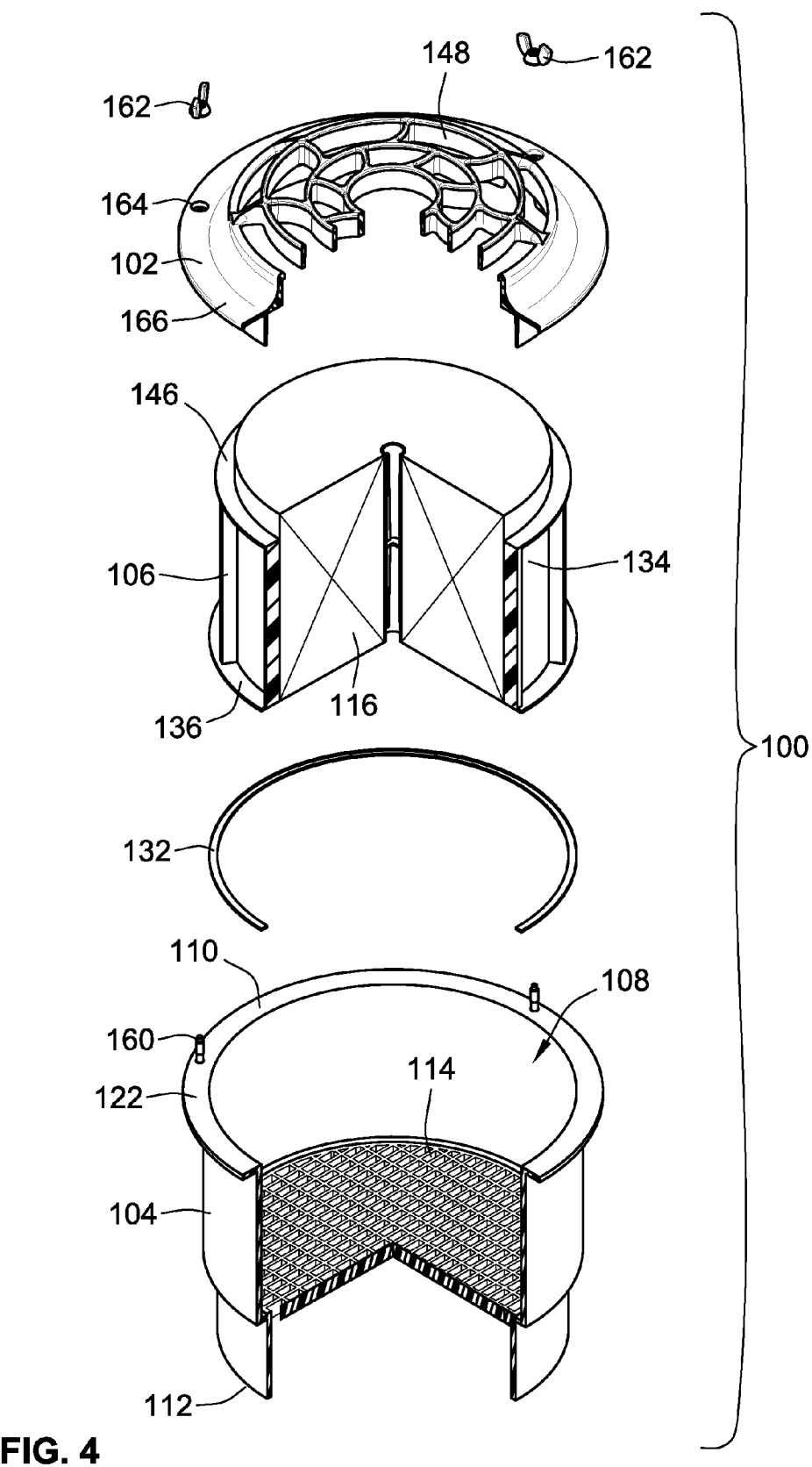
Figure 8:
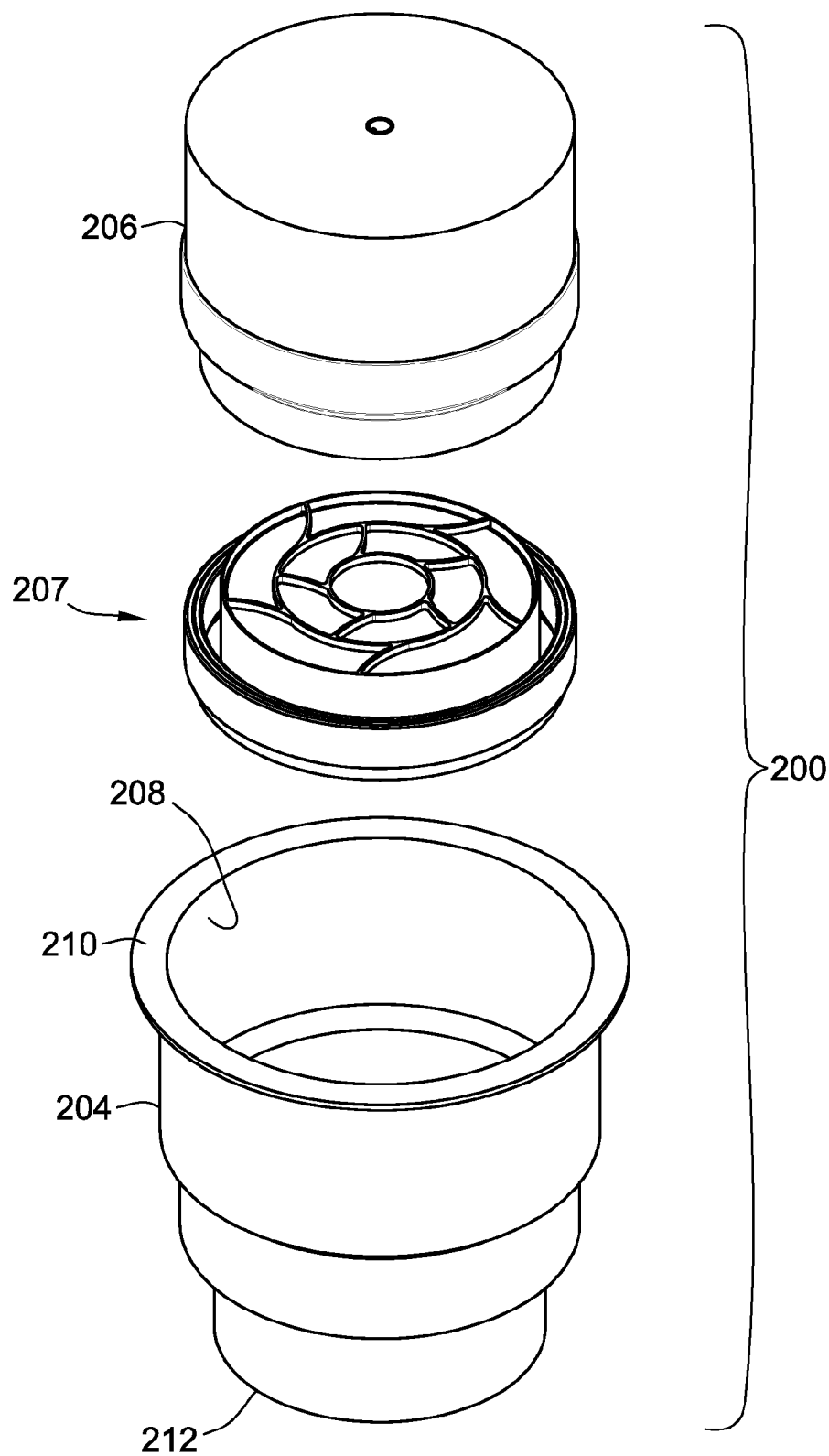
FIGS. 8-12 illustrate a second embodiment of a filter assembly.

With reference to FIGS. 2-4, the filter housing 104 generally defines an internal cavity 108 in which the filter element 106 is axially received when the filter assembly 100 is assembled. In the illustrated embodiment, the filter housing 104 and filter element 106 are generally circular in cross-section; however, alternative shapes can be used in implementing embodiments of the present invention such as oval, race-track shaped, oblong, rectangular, triangular, etc.

The filter housing 104 generally includes an upstream inlet end 110 and a downstream outlet end 112. In the illustrated embodiment, the upstream inlet stream 110 has a larger internal diameter than the downstream outlet end 112. Further, the cover 102 is operably attached proximate the upstream inlet end 110. The upstream inlet end 110 is sized to receive the filter element 106 therein for selectively locating the filter element 106 within the internal cavity 108 of the filter housing 104 as well as removing the filter element 106 therefrom.

A grate 114 is located between the upstream inlet end 110 and the downstream outlet end 112 of the filter housing 104. In the illustrated embodiment, the grate 114 is intricately molded with the rest of the filter housing 104 as a one piece construction and is positioned closer to the downstream outlet end 112. However, in alternative embodiments, the grate 114 could merely be resting in the filter housing 104, such as on an axial abutment structure (e.g. a radially inward extending step in the sidewall of the housing 104) of the housing 104, or could snap engage into the filter housing 104.

The grate 114 provides axial support for the filter element 106 as the grate 114 is positioned axially downstream from the filter element 106 when the filter element 106 is positioned within internal cavity 108 of the filter housing 104. More particularly, the grate 114 assists in preventing the filter media 116 from axially telescoping due to the pressure forces across the filter element 106 due to fluid flow through the filter media 116. This is particularly true when the filter media 116 is in the form of a wound media pack of fluted filtration media with flutes thereof extending generally parallel to the axial flow direction illustrated by arrow 118 through the filter assembly 100. Typically, such filter media packs are wound about an axis 120 that is parallel to the flow direction 118 when the filter element 106 is in operation. However, other forms of media packs could be provided such as stacked sheets.

The filter housing 104 generally includes a radially extending mounting flange 122 that extends radially outward and is positioned proximate the upstream inlet end 110. The radially extending mounting flange 122 is generally an annular flange. The radially extending mounting flange 122 will cooperate with the cover 102 for securing the cover 102 to the filter housing 104.

The filter housing 104 has a generally radially stepped profile. More particularly, the portion of the internal cavity 108 upstream from grate 114 has a larger radial dimension R1 as compared to the radial dimension R2 of the portion of the internal cavity 108 downstream from grate 114. With additional reference to FIG. 5, the stepped profile is defined, at least in part, by a radially inward positioned sidewall 124 (e.g. sidewall portion) and a radially outward positioned sidewall 126 (e.g. sidewall portion), which are positioned proximate the downstream and upstream portions of the internal cavity 108 of the filter housing 104, respectively.

A radially extending flange portion 128 is positioned radially between the inward positioned sidewall 124 and the outward positioned sidewall 126. The radially extending flange portion 128 defines a seat 130 against which an axial sealing gasket 132 is compressed. More particularly, the seat 130 is provided by an axially facing abutment surface that faces the upstream inlet end 110 of the housing. The seat 130 is provided as the bottom of a trough defined by an annular groove 131 formed in the radially extending flange portion 128. This trough radially locates the axial sealing gasket 132. The axial sealing gasket is axially compressed against the seat 130 by the filter element 106 when the filter assembly 100 is fully assembled. The sealing interface provided between the filter element 106 and the housing 104 by the sealing gasket 132 prevents undesirable bypass of dirty air through the housing 104 and around the filter media 116 of the filter element 106.

With further reference to FIGS. 2-6, the filter element 106 includes an outer wrapper portion 134 attached to the outer periphery of the media pack defined by the filter media 116. The outer wrapper portion 134 is generally formed by an impermeable generally rigid plastic material. The outer wrapper portion 134 is preferably sealingly attached to the outer periphery of the filter media 116. The outer wrapper portion 134 includes a radially outward extending sealing flange 136 that includes an axially facing sealing face 138 that faces towards the downstream outlet end 112 and engages a top sealing surface of the axial sealing gasket 132. The axially facing seal face 138 is positioned proximate a downstream outlet end 140 of the filter element 106. The downstream outlet end 140 is opposite upstream inlet end 142 of the filter element.

The wrapper portion 134 extends less than the entire axial length of the filter media 116 between the downstream outlet end 140 and the upstream inlet end 142. More particularly, the portion of the outer wrapper portion 134 proximate the upstream inlet end 142 does not extend entirely to the upstream inlet end 142.

The outer wrapper portion 134 also includes a plurality of strengthening ribs 144. As illustrated in FIG. 2, the radially outward extending sealing flange 136 extends radially outward further than the radially outer edge of the strengthening ribs 144.

With primary reference to FIG. 4, the outer wrapper portion 134 includes a radially outward extending cover abutment 146. The cover 102 axially abuts the cover abutment 146 to provide axial compressive forces to the filter element 106 to compress the radially outward extending sealing flange 136 against the axial seal gasket 132 to provide the seal for the filter assembly 100.

The downstream outlet end 140 of the filter media 116 of the filter element 106 is positioned proximate the grate 114 when assembled. This arrangement allows the grate 114 to provide support for the filter media 116 and prevent the filter media 116 from axially telescoping due to the differential pressure forces across the filter media 116 during operation.

The cover 102 of the filter assembly 100 generally includes a grate portion 148 that extends across the upstream inlet end or inlet face of the filter element 106 and particularly the filter media 116. The grate portion 148 helps protect the inlet face of the filter media 116 from large scale debris.

The cover 102 further includes an axially extending locating flange 150 (see FIG. 7). The axially extending locating flange 150 is generally annular and is located in a gap 152 formed between the outer wrapper portion 134 and the outward positioned sidewall 126 of the housing when the filter assembly 100 is fully assembled. The locating flange 150 may be tapered for easier insertion between the filter element and the housing.

The cover 102 includes an abutment portion 154 that axially abuts the cover abutment 146 of the outer wrapper portion 134. The cover also includes an axially extending portion 156 that is positioned adjacent to the filter media 116 and particularly the portion of the filter media 116 that is not surrounded by the outer wrapper portion 134.

With reference to FIG. 2, the filter assembly 100 includes a plurality of attachment mechanisms illustrated in the present embodiment as a plurality of screw studs 160 and wing nuts 162. The attachment mechanisms are used to secure the cover 102 to the filter housing 104. The screw studs 160 extend through apertures 164 formed in a mounting flange 166 that extends radially outward. In alternative embodiments, the attachment mechanisms could be provided by a plurality of latches. The latches could be affixed to the filter housing 104 and latch over center onto the mounting flange 166 of the cover or alternatively the latches could be attached to the cover 102 and latch onto the mounting flange 122 of the housing. Additional attachment mechanisms are contemplated.

FIGS. 8-12 illustrate a portion of a filter assembly 200 according to another embodiment of the present invention. With primary reference to FIG. 8, the filter assembly 200 includes a cover (not shown) substantially similar to the cover of the prior embodiment, a filter housing 204, a primary filter element 206, and a secondary filter element 207. The filter housing 204 defines an internal cavity 208 and extends between an upstream inlet end 210 and a downstream outlet end 212.

Figure 9:
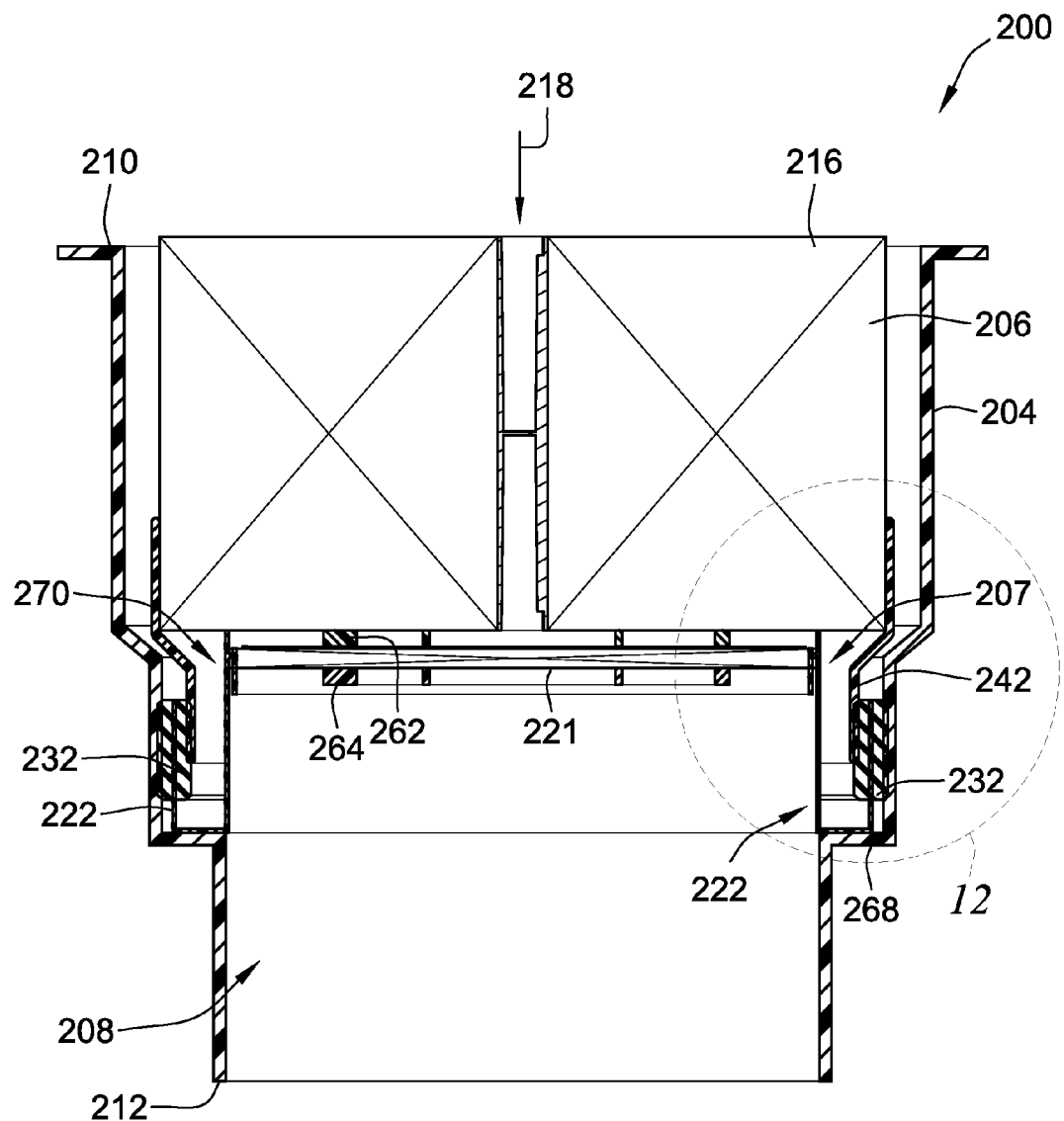
Figure 10:
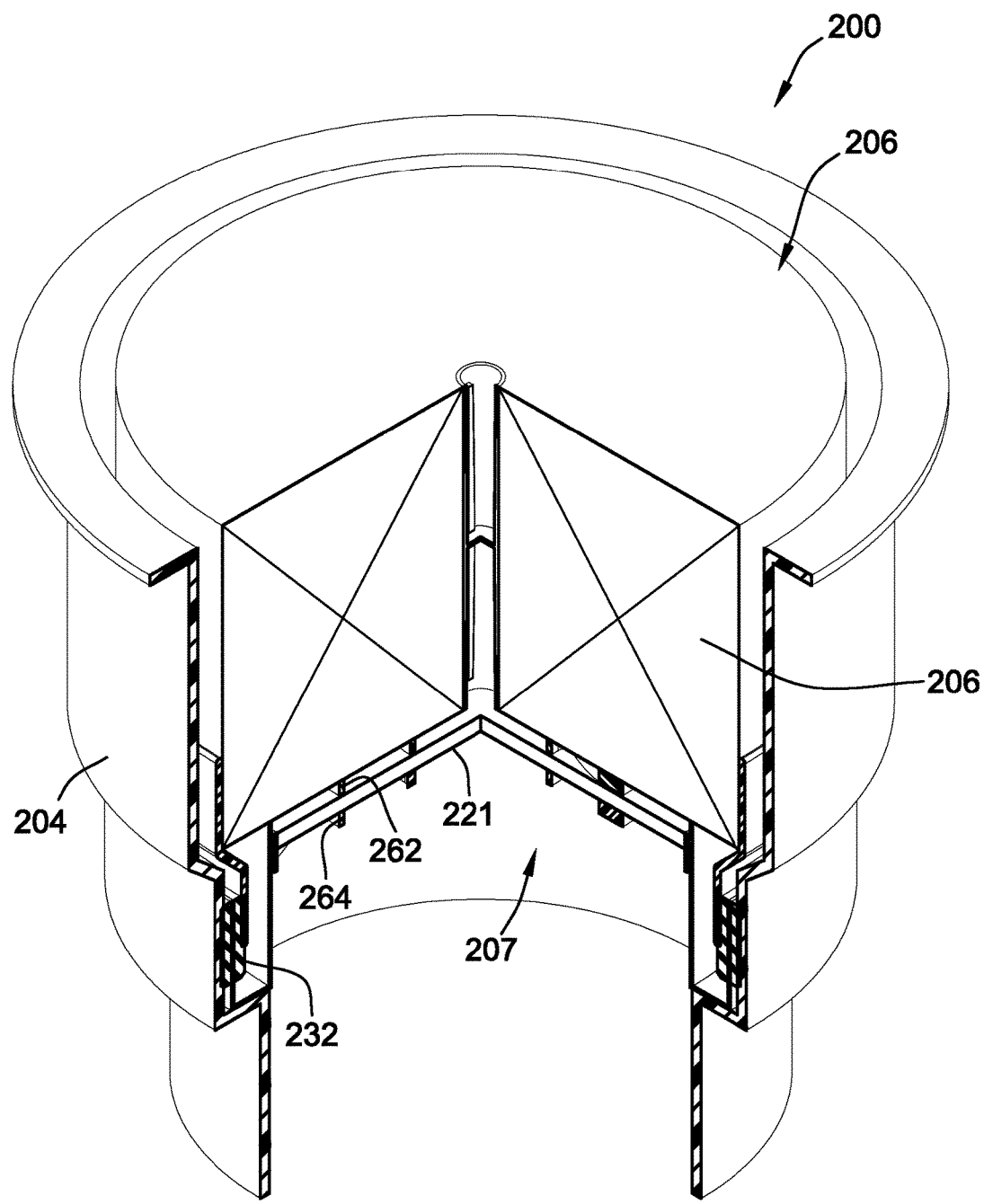
Figure 11:
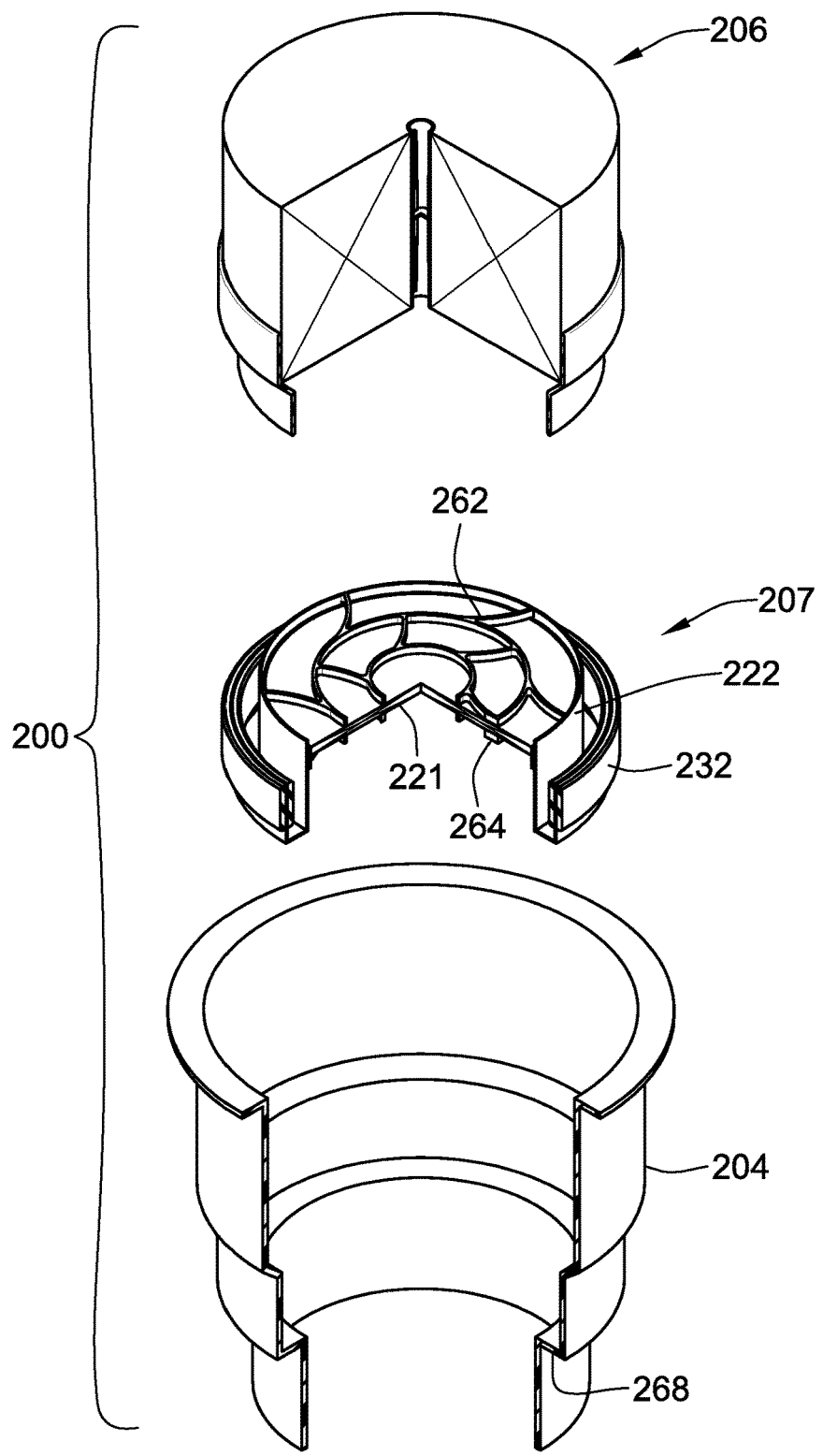

With reference to FIGS. 9-11, in this embodiment, the secondary filter element 207 is downstream from the primary filter element 206 in the flow direction 218. The secondary filter element 207 provides axial support for the filter media 216 of the primary filter element 206. Therefore, the secondary filter element 207 is located proximate a downstream end of the filter media pack 216 of the primary filter element 206.

The secondary filter element 207 can also be referred to as a safety filter element. The secondary filter element 207 includes filter media 221. The filter media 221 is operably secured to a seal support structure 222 that carries a seal member 232.

In this embodiment, the seal member 232 that is carried by the seal support structure 222 of the secondary filter element 207 is used to provide the sealing interfaces for both the primary and secondary filter elements 206, 207. With additional reference to FIG. 12, the seal member 232 includes a radially outward directed seal surface 234 and a radially inward directed seal surface 236. Both of the outward and inward directed seal surfaces 234, 236 provided by seal member 232 are operably supported by the seal support structure 222. The outward directed radial seal surface 234 radially engages and sealingly engages an inner surface 238 of a portion of the sidewall defining the filter housing 204, and particularly the radially outward positioned sidewall thereof.

The inward directed radial seal surface 236 engages a radially outward facing seal face 240 of a sealing flange 242 of the primary filter element 206. The sealing flange is operably and sealingly secured to the filter media pack 216 of the primary filter element 206. In this embodiment the seal flange 242 is axially spaced from a downstream end of the filter media 216 of the primary filter element 206, but is positioned radially inward of an outer periphery 243 of the filter media 216.

The seal member 232 provides both the outward and inward directed radially seal surfaces 234, 236 in the present embodiment. The seal member 232 is preferably provided by a molded seal member and particularly a urethane molded seal member.

The seal support structure 222 includes a seal support 244 to which the seal 232 is attached. The seal support 244 includes a plurality of apertures 246 through which a portion of the seal member 232 extends to secure the seal member 232 to the seal support 244. The seal support 244 is radially positioned between the outward and inward directed radial seal surfaces 234, 236 of the seal member 232. The apertures 246 in this embodiment could be replaced by relief portions that receive a portion of the seal member 232 therein in alternative embodiment and need not be complete apertures. Typically, the seal member 232 will be molded to the seal support 244.

The seal support structure 222 includes an intermediate section 248 extending between the seal support 244 and the filter media 221 of the secondary filter element 207. The intermediate section 248 and, in part, the inward directed radial seal surface 236 form a channel 250 (also referred to as a trough) therebetween. The channel 250 axially receives the sealing flange 242 of the primary filter element 206 therein when the radially outward facing sealing face 240 sealingly engages the inward directed radial seal surface of the seal member 232. The seal support 244 in the illustrated embodiment is generally an axially extending annular first flange and the intermediate section 248 generally includes a second generally axially extending second flange 252 (e.g. sidewall) that is spaced radially inward from the seal support 244. The intermediate section 248 further includes a radially extending flange section 254 generally coupling the seal support 244 with the second flange 252, generally forming a U-shaped cross-section.

The sealing flange 242 forms part of an annular structure that is attached to outer periphery of the filter media pack 216 of primary filter element. The structure including the sealing flange 242 has a generally stepped profile such that an attachment portion 258 formed by an axially extending flange portion is positioned radially outward from the sealing flange 242. A tapered intermediate section 259 extends axially and radially between sealing flange 242 and attachment portion 258.

Due to the configuration, the engagements between the seal member 232 and the filter housing 204 as well as between the sealing flange 242 with the seal member 232 are located downstream of the filter media pack 216 of the primary filter element. Further, in the illustrated embodiment, the engagement therebetween is also downstream from the filter media 221 of the secondary filter element 207.

Figure 12:
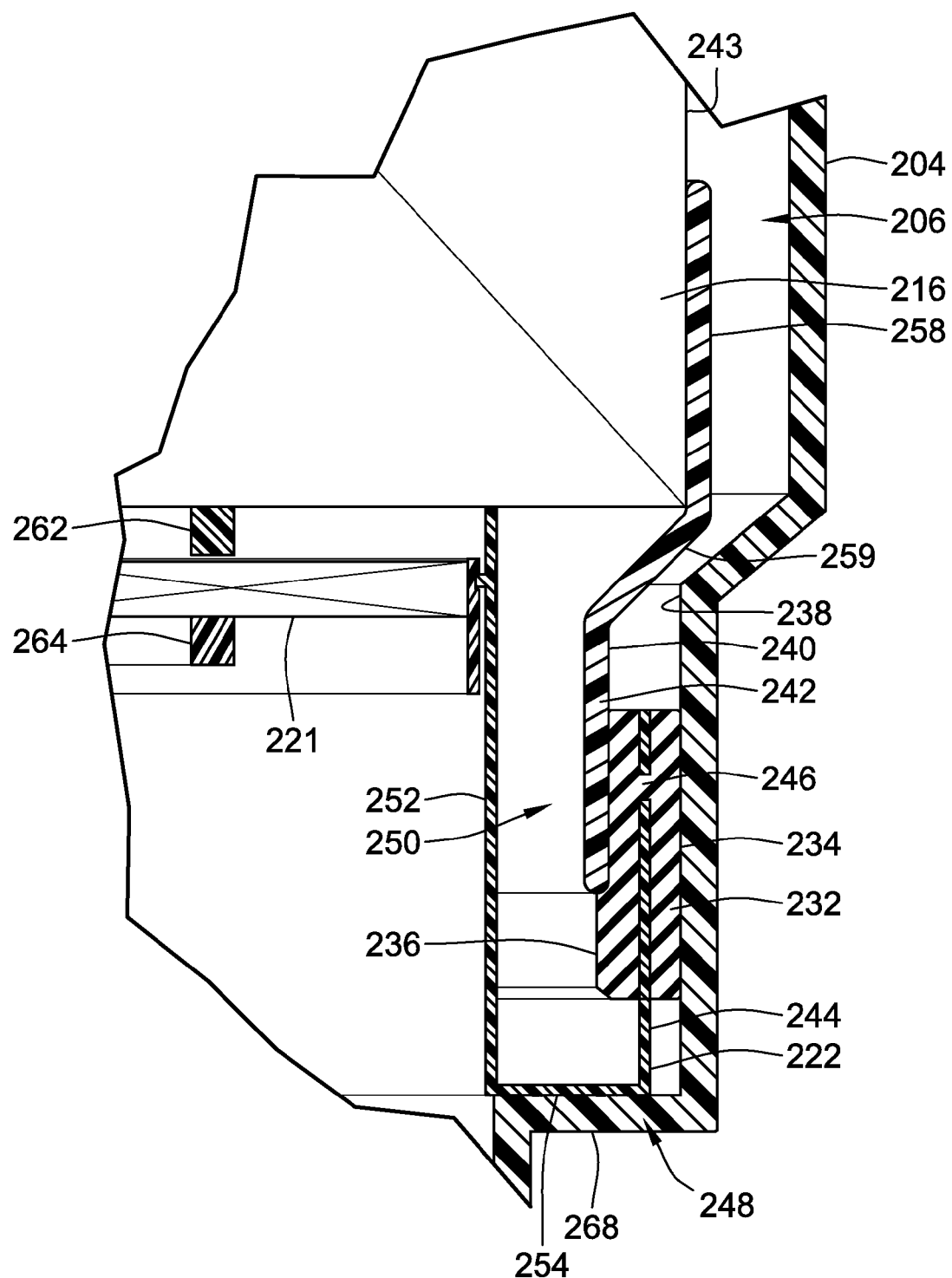
Figure 13:
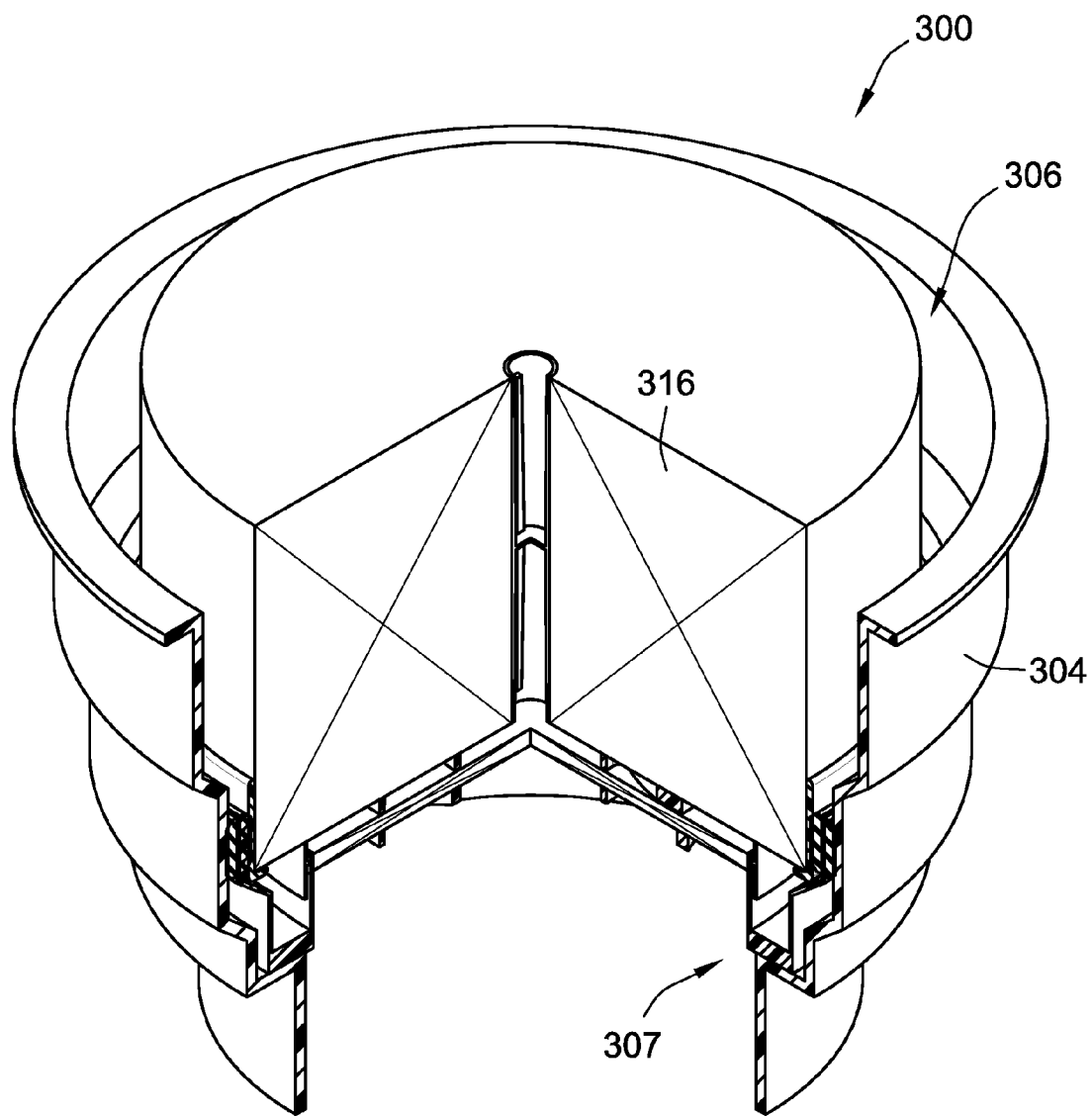
FIGS. 13-17 illustrate a third embodiment of a filter assembly.
Figure 14:
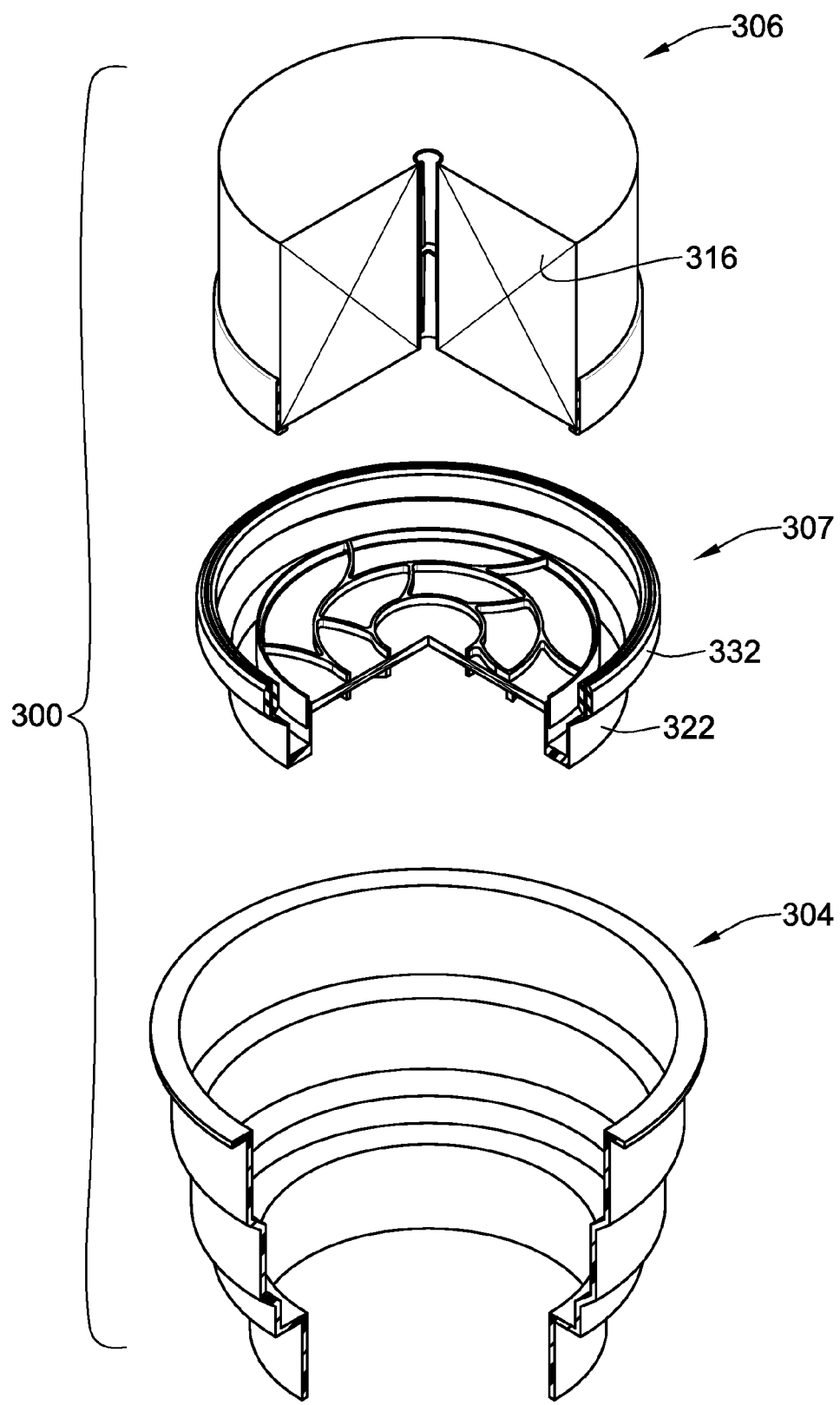
Figure 15:
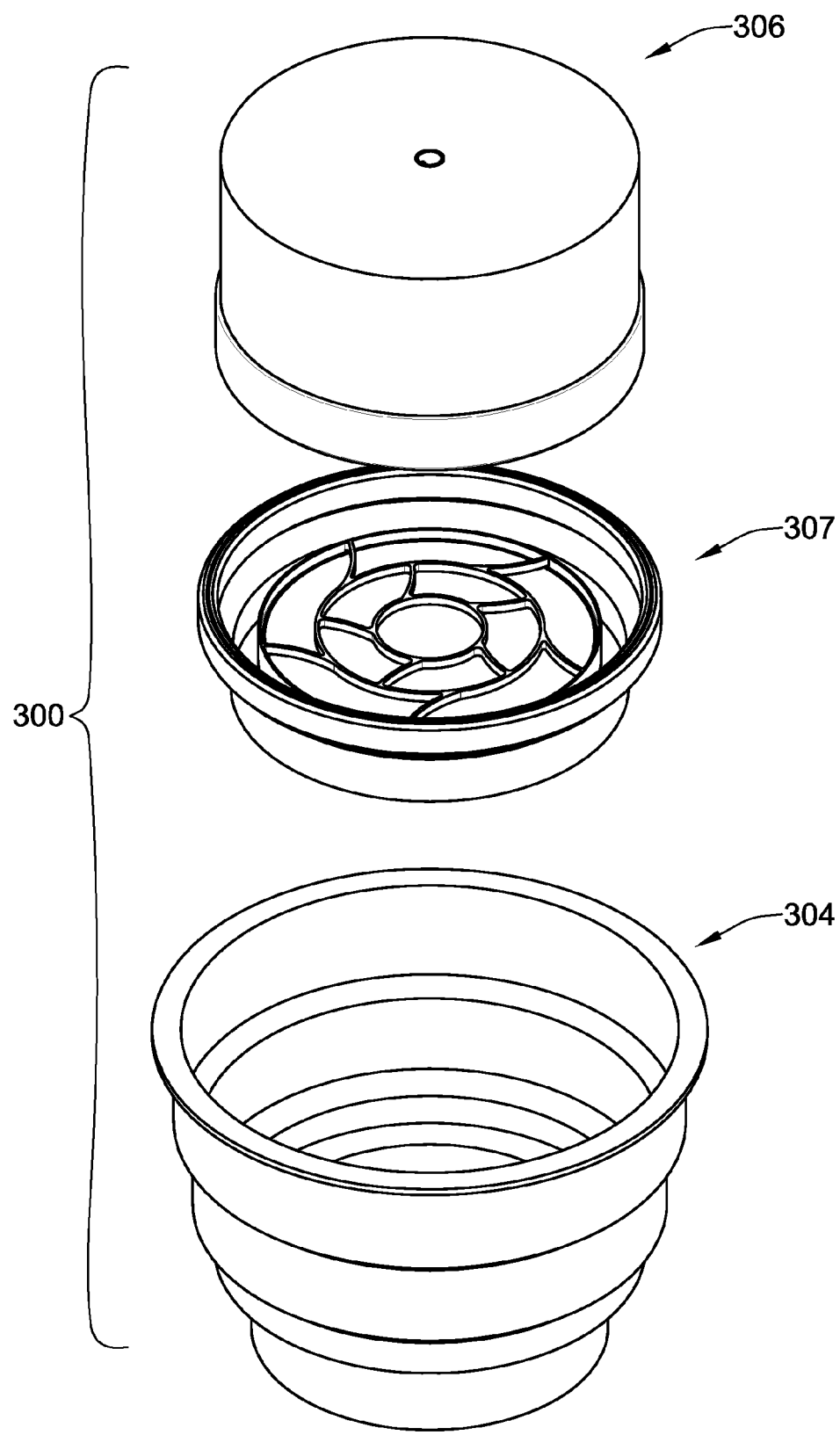

The secondary filter element 207 further includes upstream and downstream grate portions 262, 264. Upstream grate portion 262 is formed as one-piece construction with support structure 222. As illustrated in FIG. 12, the downstream grate portion 264 is snap engaged with the seal support structure 222 and particularly the second flange 252 thereof. The grate portions 262, 264 secure filter media 221 of the secondary filter element 207 axially therebetween. A tongue and groove arrangement is provided between the downstream grate portion 264 and second flange portion 252 to couple the two components.

The filter housing 204 includes an axial abutment portion 268 against which the secondary filter element 207 is axially abutted and positioned within the filter housing 204. More particularly, in the illustrated embodiment the intermediate section 248 of the seal support structure 222 axially abuts the axial abutment portion 268. The axial abutment portion 268 is provided by a radially extending flange portion.

Once the secondary filter element 207 is inserted into the filter housing 204, the primary filter element 206 can be inserted into the filter housing 204 such that the radially outward facing seal face 240 of the sealing flange 242 engages the radially inward directed radial seal surface 236 of seal member 232. Further, as the primary filter element 206 is inserted in the housing 204 it can be axially located by engagement with the upstream grate 262 of the secondary filter element 207. Alternatively, the primary and secondary filter elements 206, 207 can be attached to one another and then simultaneously inserted into housing 204.

Again, the single seal member 232 provides the sealing structure for both the primary and secondary filter elements 206, 207. Additionally, the secondary filter element 207 provides axial support for the filter media 216 of the primary filter element 207 to prevent axial telescoping of the filter media pack 216 in the flow direction 218.

As illustrated in FIG. 9, the structure defining the sealing flange 242 defines a cavity 270 downstream from the filter media pack 216. At least a portion of the secondary filter element 207 is axially received in this cavity 270.

Further, the housing 204 of the present embodiment does not require a grate itself to support the primary filter element 206 due to the inclusion of the secondary filter element 207.

A further embodiment of a filter assembly 300 is illustrated in FIGS. 13-17. The cover of the filter assembly 300 is not shown in the illustrated embodiment. However, a cover can be provided substantially similar to the cover 102 of the prior embodiments.

The filter assembly 300 also includes a stepped filter housing 304, a primary filter element 306 and a secondary filter element 307. Both of which are received in the filter housing 304. Similar to the prior embodiment, the secondary filter element 307 is used to provide the sealing arrangement for both the primary and secondary filter elements 306, 307 as well as to provide axial support for the primary filter element 306. The secondary filter element 307 axially locates the filter element 306 as well as prevents axial telescoping of the filter media 316. The secondary filter element 307 is downstream from the primary filter element 306.

Figure 16:
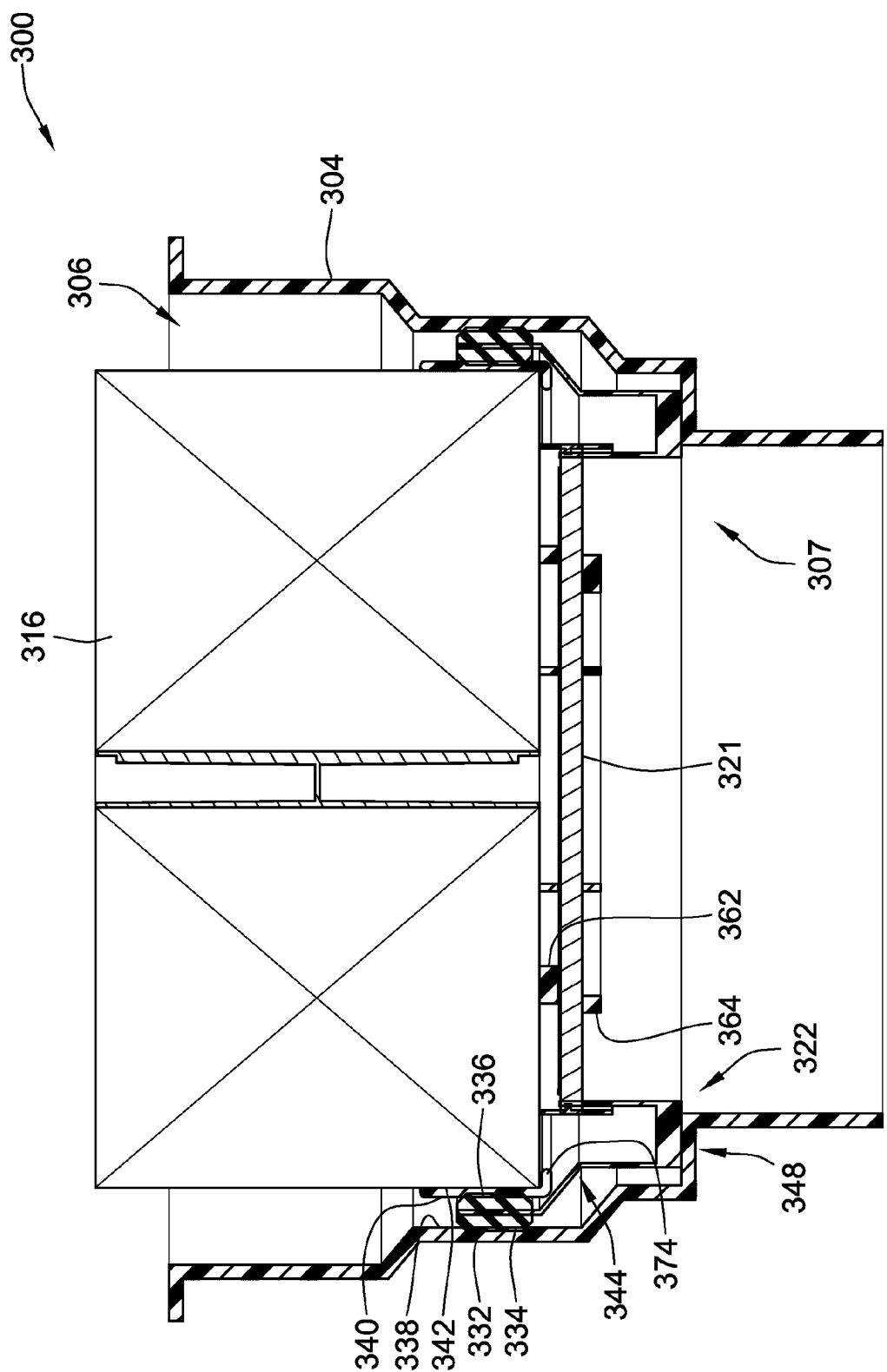
Figure 17:
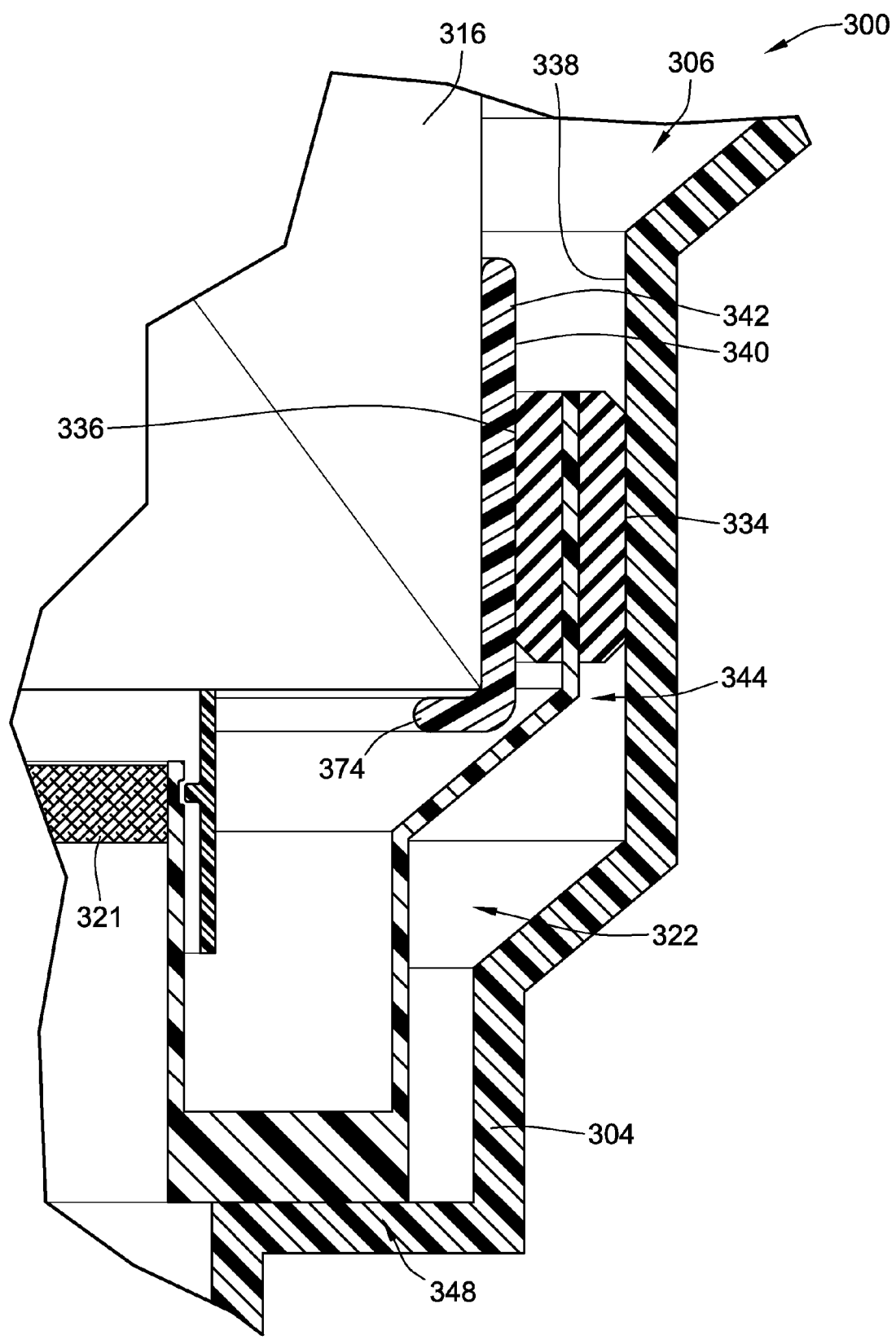

With primary reference to FIGS. 16 and 17, the secondary filter element 307 includes upstream and downstream grates 362, 364. Filter media 321 is axially positioned therebetween.

The secondary filter element 307 also includes a seal support structure 322 supporting the seal member 332 that provides the sealing functions for both the primary and secondary filter elements 306, 307. Again, the seal member 332 includes an outward directed radial seal surface 334 and an inward directed seal surface 336. The outward directed radial seal surface 334 seal against an inner surface 338 of the sidewall of the filter housing 304. Additionally, the inward directed radial seal surface 336 engages a radially outward facing surface 340 of sealing flange 342 of the filter element 306.

In this embodiment, at least a portion, of the sealing flange 342 axially overlaps with the filter media 316 such that the filter media 316 is axially positioned within the channel bounded by the sealing flange 342. In other words, at least a portion of the radially outward facing seal face 340 is axially positioned between the upstream inlet end and the downstream outlet end of the filter media pack 316.

Further, the engagement between the seal member 332 and the sealing flange 342 is axially positioned between the upstream inlet end and the downstream outlet end of the filter media pack 316. The seal flange 342 is sealingly engaged with or attached to the outer periphery of the filter media pack 316. The seal flange 342 includes a radially inward directed flange portion 374 that extends radially over the outlet end of the filter media pack 316 and is downstream thereof.

The seal support 344 has a generally axially extending portion and a canted portion that extends radially inward along the flow direction 318. This portion may also be considered part of the intermediate section 348 that extends between the filter media 321 and the seal member 332 and particularly the seal support 344.

In this embodiment, the upstream grate portion 362 is snap engaged to the rest of the seal support structure 322 while the downstream grate portion 364 is integrally formed with the rest of the seal support structure 322.

Figure 18:
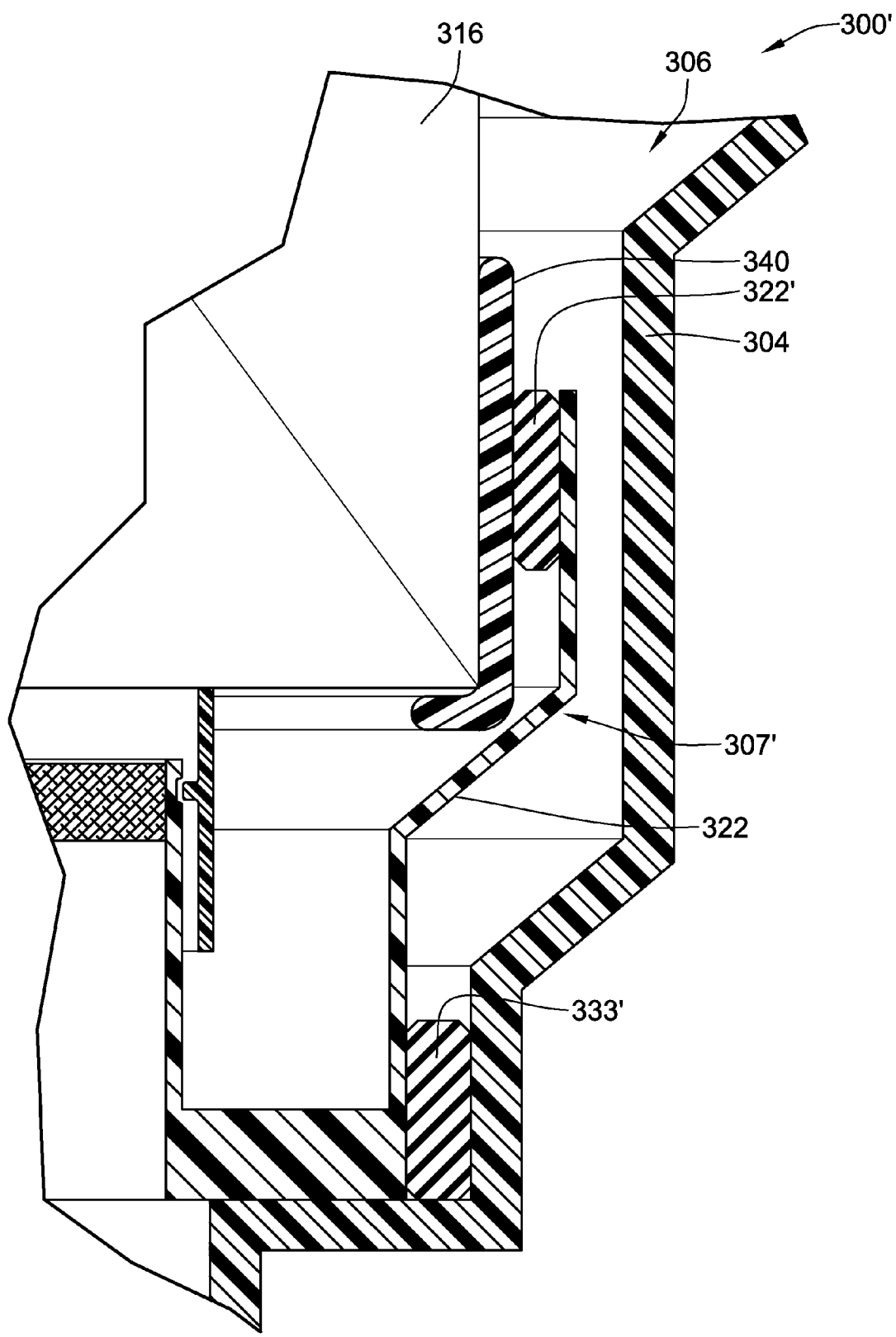
FIG. 18 illustrates a modified version of the filter assembly of FIGS. 13-17.
Figure 19:
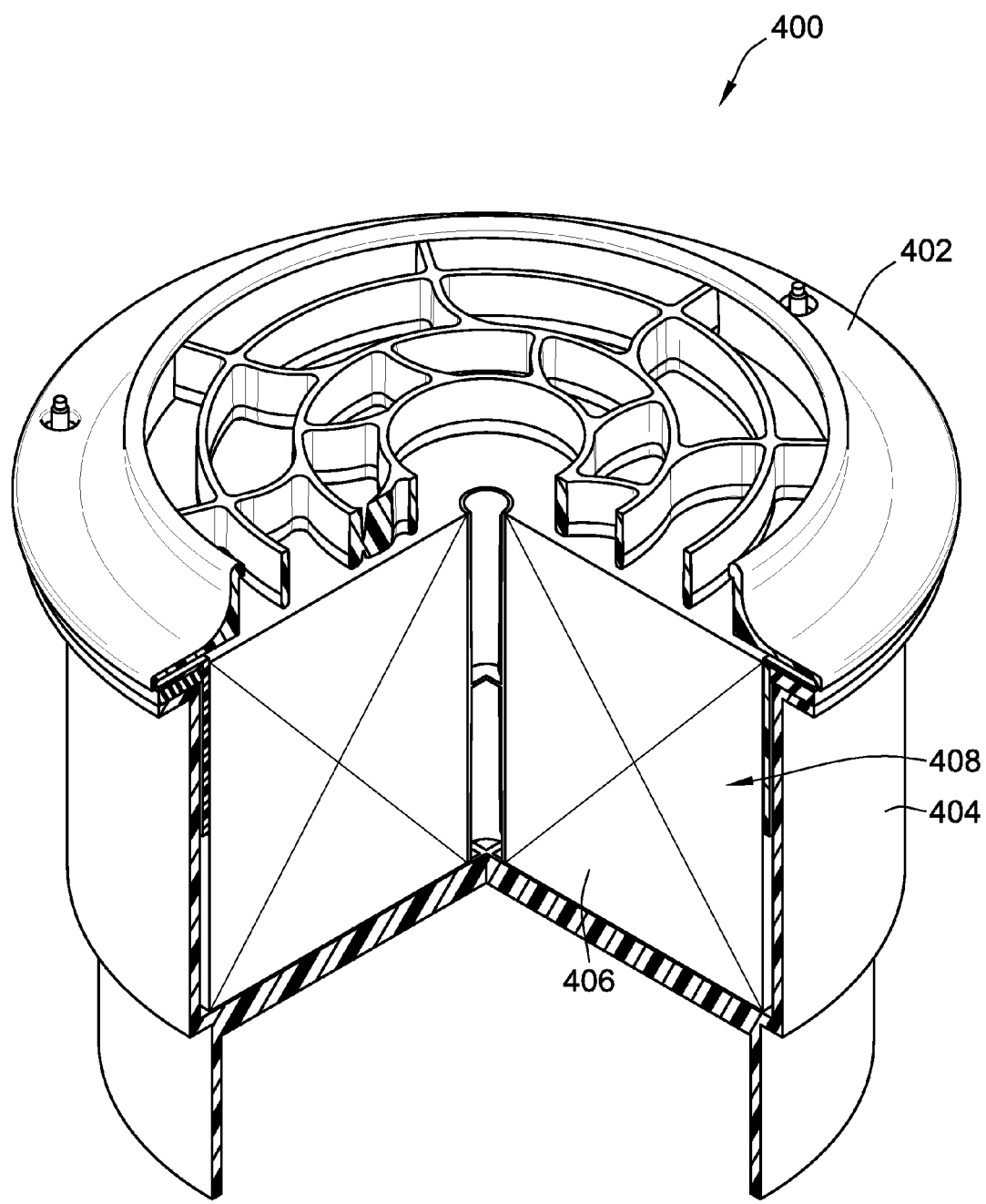
FIGS. 19-22 illustrate a fourth embodiment of a filter assembly.
Figure 20:
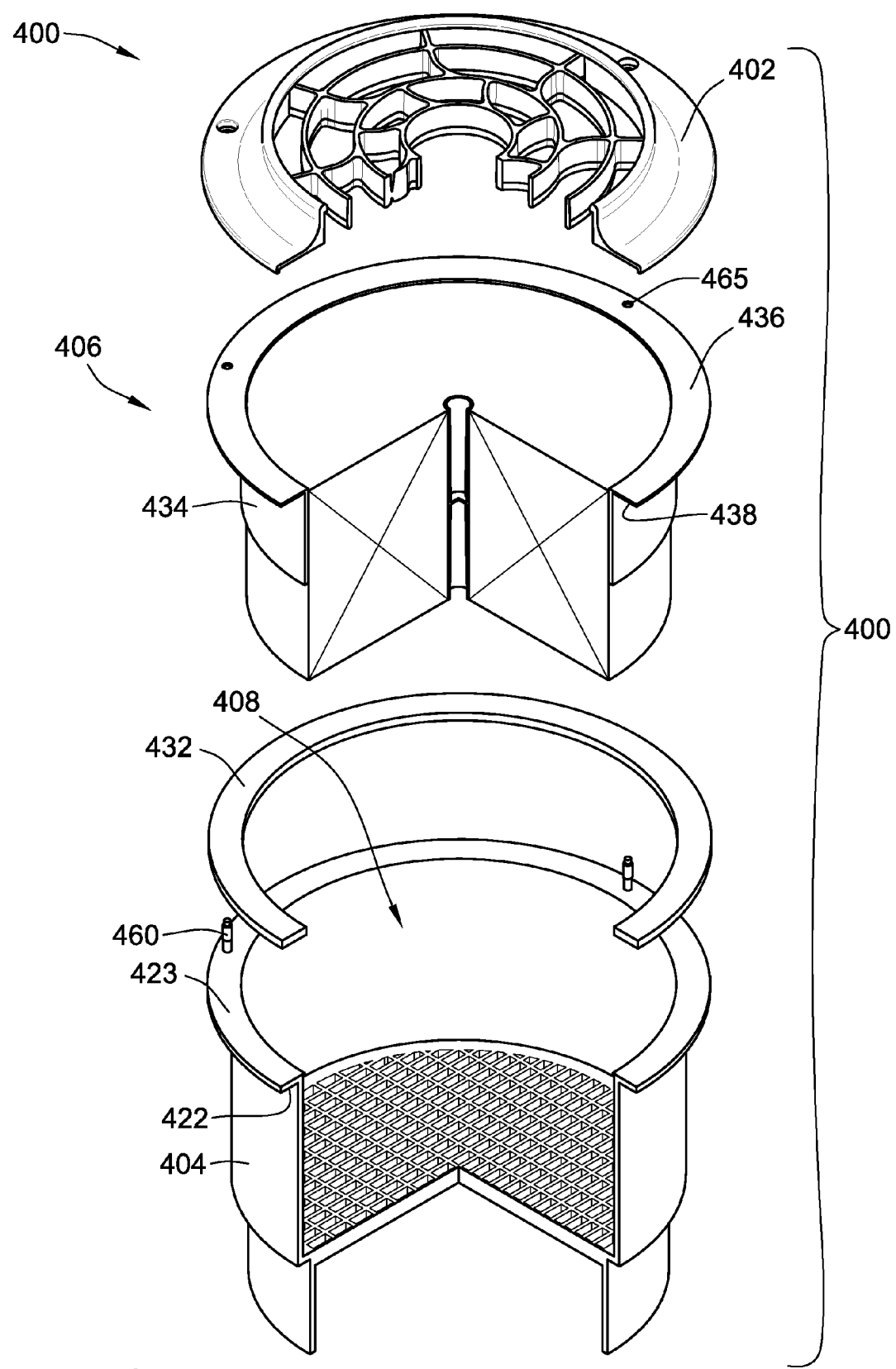
Figure 21:
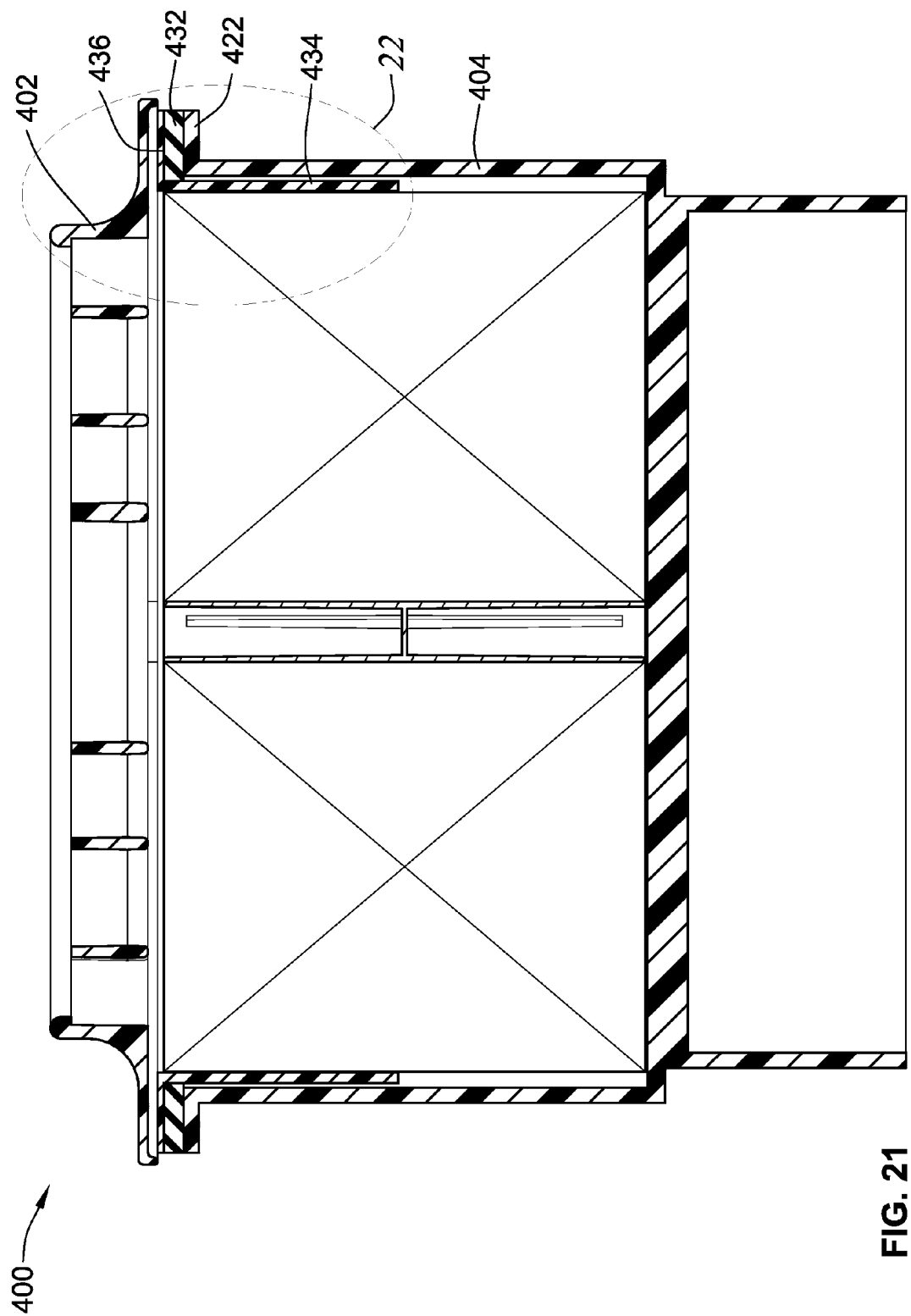
Figure 22:
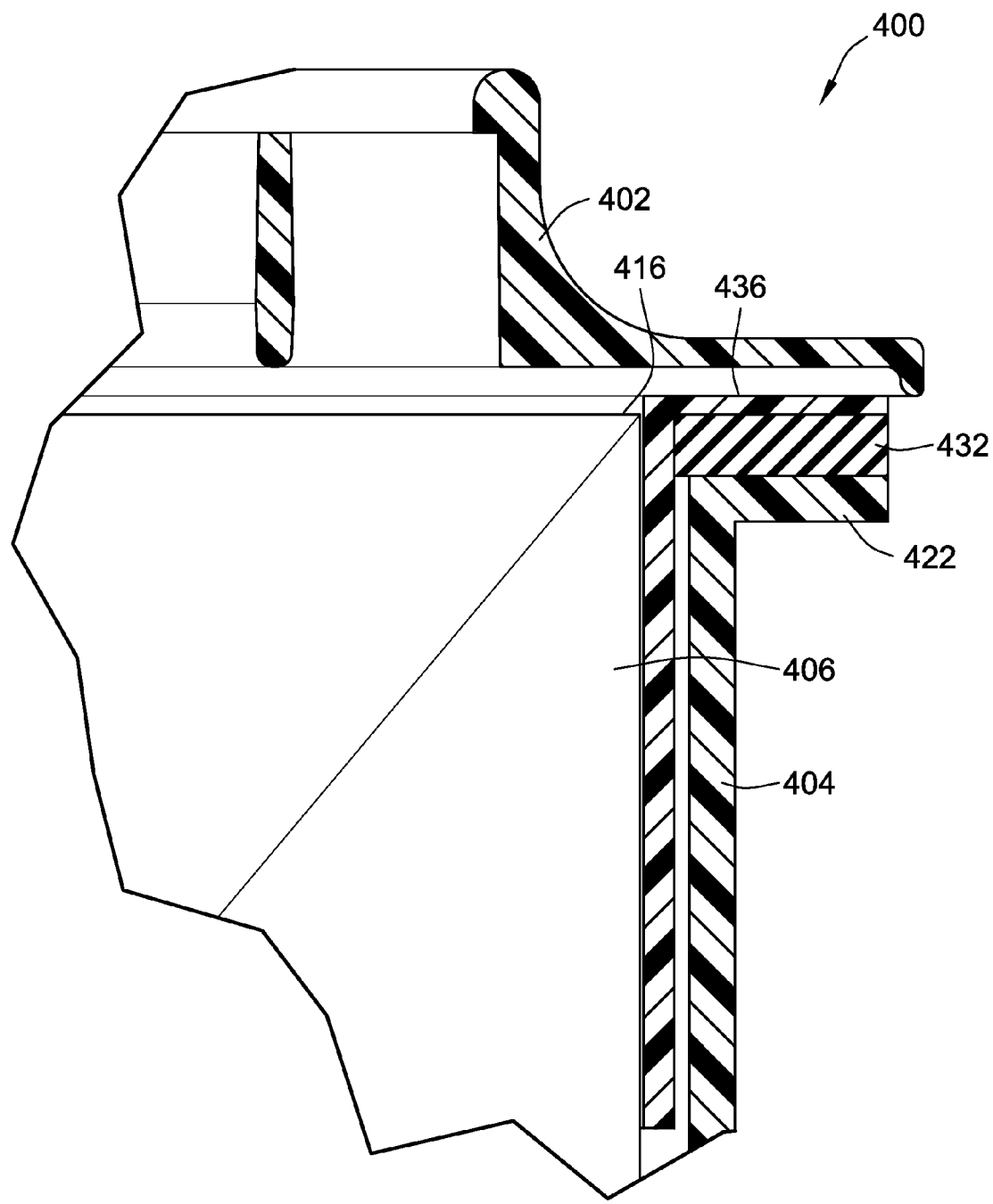

A further embodiment of a secondary filter element 307' is illustrated in FIG. 18. In this embodiment, the seal arrangement is provided by a pair of seal members 332', 333'. The first seal member 332' provides a radial seal between the seal support structure 322 and the seal flange 340 of the filter element. While the second seal member 333' provides a seal between the seal support structure 322 and the filter housing 304. Both of these seal members 332' and 333' provide radially directed seal arrangements. Further, both seal members 332' and 333' are carried by the secondary filter element 307'. This embodiment can use the same primary filter element as the prior embodiment.

FIGS. 19-22 illustrate a further embodiment of a filter assembly 400 according to a further embodiment of the invention. The filter assembly 400 includes a cover 402, a filter housing 404 and a filter element 406 positioned within an internal cavity 408 of the filter housing 404.

In this embodiment, the filter element 406 includes a wrapper portion 434. The wrapper portion 434 includes a radially outward extending sealing flange 436 (e.g. a seal support flange) that includes axially facing sealing face 438.

An axial sealing gasket 432 is axially compressed between the radially outward extending sealing flange 436 and a radially outward extending mounting flange 422 (e.g. a seal support flange). The radially outward extending mounting flange 422 includes an axially facing sealing face 423.

In this embodiment, the seal between the filter element 406 and the filter housing 404 is provided by axial sealing gasket 432. More particularly, an axial seal is provided by gasket 432 being axially sandwiched between sealing flange 436 of the filter element and the mounting flange 422 of the filter housing 404.

In general, the filter housing 404 is substantially similar to filter housing 104 discussed above. In some embodiments, the filter housing 104 could be used in practicing this embodiment. However, in the illustrated embodiment, filter housing 404 does not include the groove for locating axial sealing gasket 132 of the previous embodiment.

The filter assembly 400 includes locating structure for radially positioning the axial sealing gasket 432 relative to the mounting flange 422 and sealing flange 436. In this embodiment, the locating structure is provided by screw studs 460 which pass through apertures in the sealing gasket 432 (the apertures not shown in the FIGS). However, alternative locating structures could be provided to maintain proper location of the axial sealing gasket 432 while assembling the filter assembly 400. For instance, grooves or ribs could be provided by the filter housing 404, and particularly, mounting flange 422. Further, the sealing gasket 432 could be axially secured to the sealing flange 436 such as by an adhesive. However, preferably, gasket 432 is a loose gasket.

In this embodiment, the sealing flange 436 includes mounting apertures 465 that receive screw studs 460 when the filter element 406 is axially inserted into the filter housing 404. However, alternative embodiments could have the outer diameter of sealing flange 436 smaller than the inner diameter generally defined by screw studs 460 such that the screw studs need not extend through sealing flange 436.

Wing nuts, such as in embodiment 100 discussed above, will secure the cover 402 to the filter housing 404. The securement of cover 402 to housing 404 will axially compress sealing flange 436 against gasket 432, which is consequently compressed against mounting flange 422. This will compress the gasket 432 between the two flanges creating the seal for the filter assembly 400.

Further, other means for securing the cover 402 to the filter housing 404 could be used such as discussed above.

Figure 23:
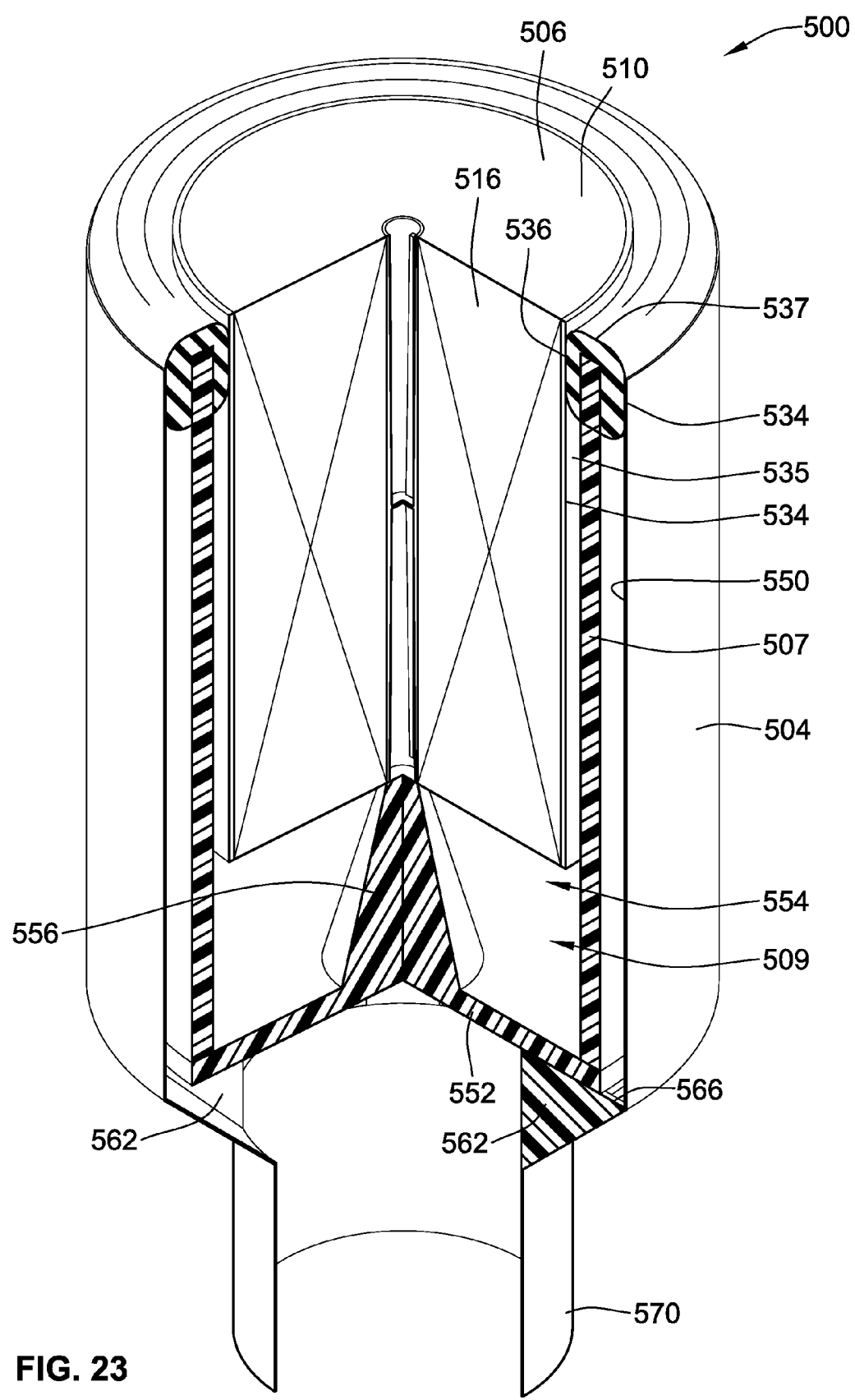
FIGS. 23-25 illustrate a fifth embodiment of a filter assembly.

FIG. 23 illustrates a further embodiment of a filter assembly 500 including a filter housing 504, a primary filter element 506, and a secondary filter element 507. A cover (not shown) would be attached proximate inlet end 510 of the primary filter element 506.

Figure 24:
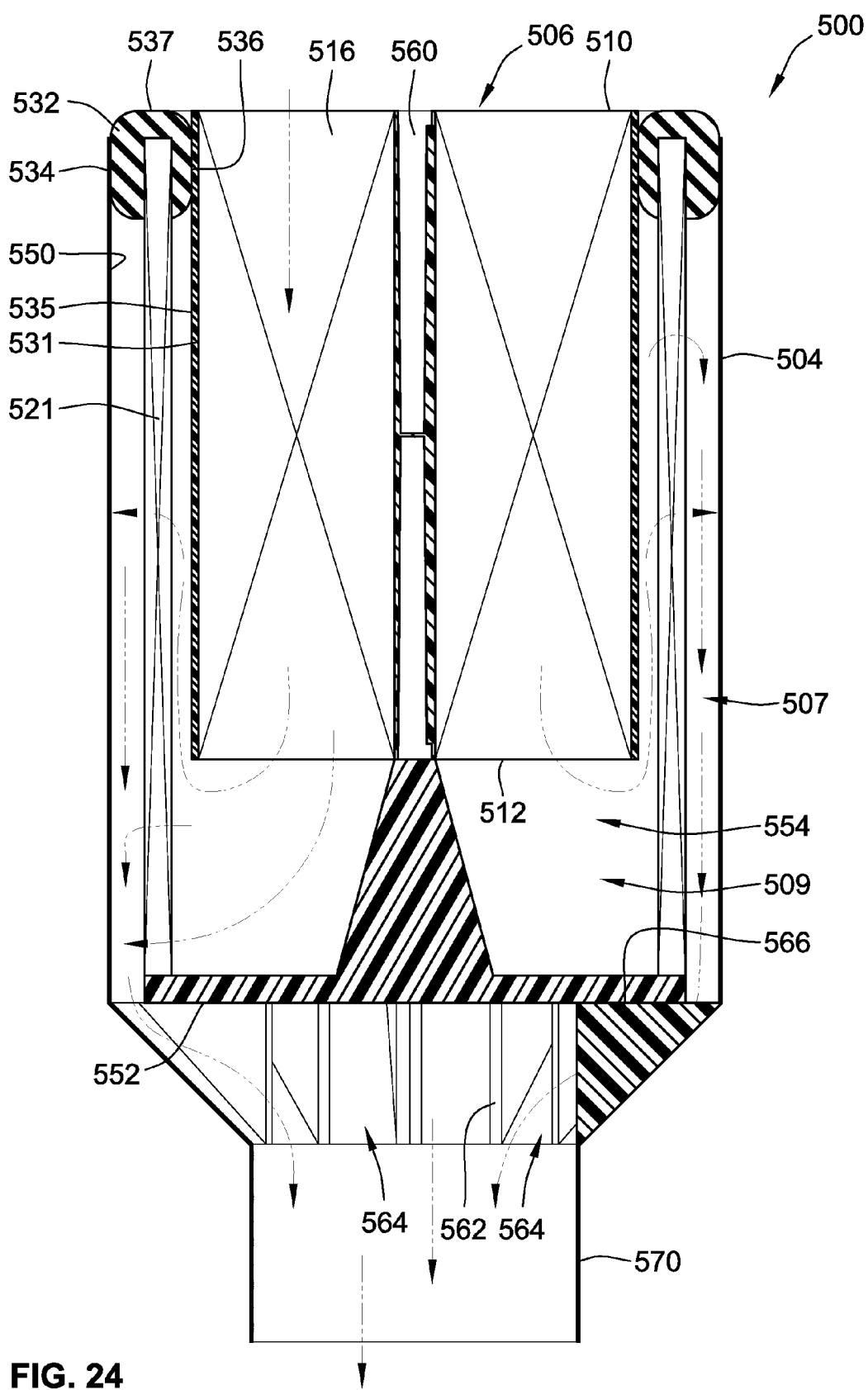
Figure 25:
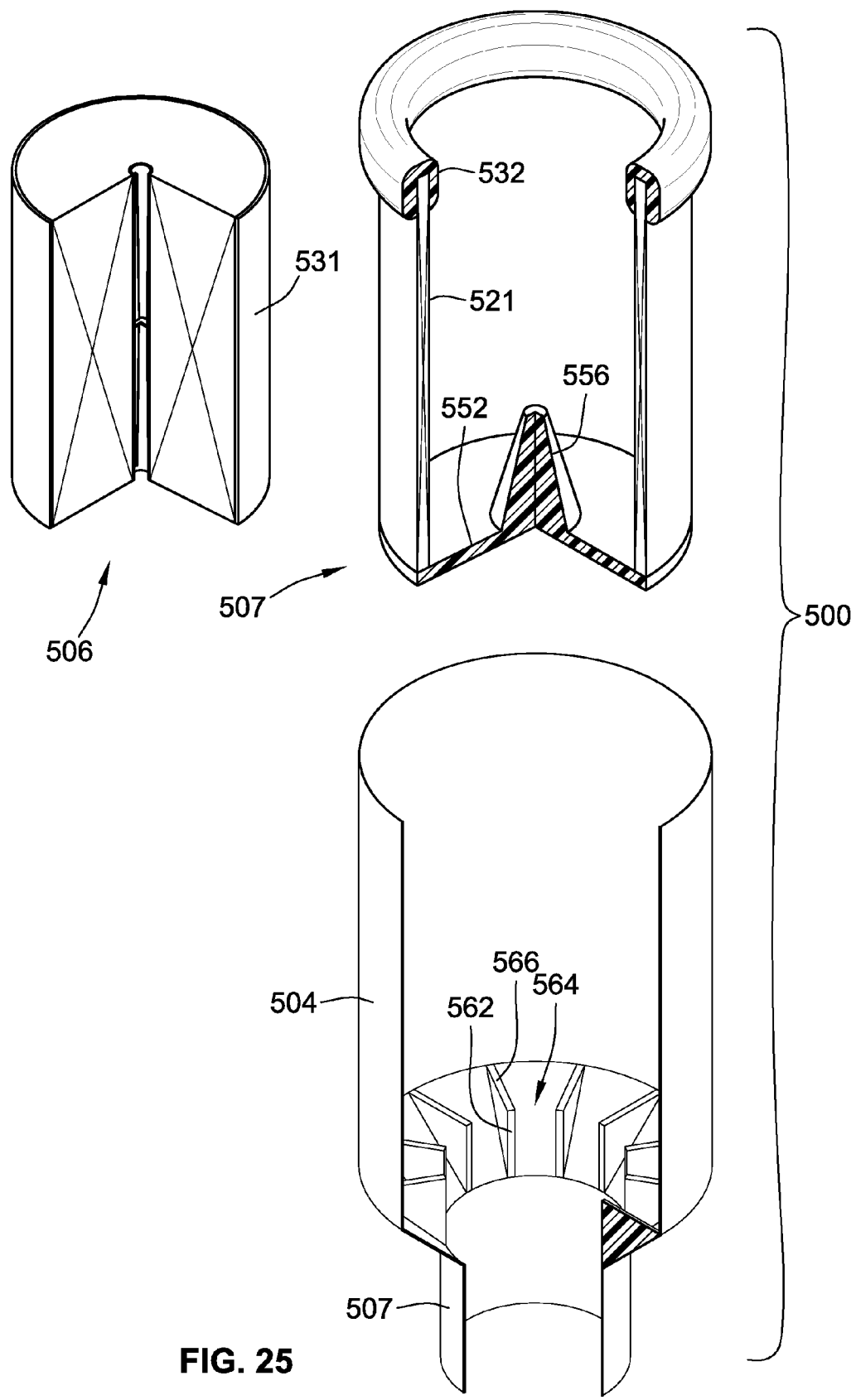

The primary filter element 506 includes a cylindrical pack of filter media 516 positioned within a tubular wrapper portion 531 that is sealingly attached to a radially outer surface of the pack of filter media 516. An outer surface of the wrapper portion 531 defines a radially outer sealing surface 535. Preferably, the filter media 516 is fluted media. The outer wrapper portion 531 of the primary filter element 506 is generally impervious forcing fluid flow through the primary filter element 506 to extend generally axially from the inlet end toward the outlet end 512, such as illustrated by arrows in FIG. 24.

The secondary filter element 507 is generally tubular and defines an internal cavity 509 in which the primary filter element 506 is positioned. Filter media 521 of the secondary filter element 507 generally surrounds the primary filter element 506. The secondary filter element 507 is generally configured for radially directed fluid flow, and particularly, radially outward directed fluid flow as illustrated by arrows in FIG. 24.

The secondary filter element 507 carries a seal member 532 that includes a radially outward directed sealing surface 534, a radially inward directed seal surface 536, and an axially directed seal surface 537.

The radially inward directed seal surface 536 cooperates with the radially outer surface 535 of the wrapper portion 531 to seal the primary filter element 506 within the filter housing 504. The radially outward directed seal surface 534 cooperates with an inner surface 550 of a sidewall of the filter housing. The axially directed seal surface 537 can cooperate with a cover or lid of the filter assembly 500.

In the illustrated embodiment, the seal member 532 is directly molded to an inlet end portion of the tubular filter media 521 of the secondary filter element 507. Preferably, the filter media 521 of the secondary filter element 507 is a pleated filter media. However, other filter media could be used.

The secondary filter element 507 further includes a closed end cap 552 proximate the outlet end of the filter media 521. The closed end cap 552 prevents fluid from escaping from filter media 521 of the secondary filter element 507 prior to passing through filter media 521. The closed end cap 552 may be plastic, urethane or other materials. The filter media 521 may be embedded in the closed end cap 552 or sealingly attached thereto. The closed end cap 552 may be foamed or molded to the filter media 521, such as using a free-rise technique.

When the primary filter element 506 is inserted into the secondary filter element 507, the internal cavity 509 forms an intermediate zone 554 fluidly interposed between the outlet end of the primary filter element 506 and the filter media 521 of the secondary filter element 507. As such, fluid exiting the primary filter element 506 will enter this intermediate zone prior to passing through filter media 521.

A standoff 556 axially spaces the primary filter element 506, and particularly the outlet end thereof, axially away from the closed end of the secondary filter element 507 to provide a space for the fluid to exit the primary filter element 506. In this embodiment, the standoff 556 is formed with the closed end cap 552 as a one-piece construction, but could be provided by the primary filter element 506 or as a separate component in alternative embodiments. In the illustrated embodiment, the standoff 556 is frusto-conical in shape and the small end thereof axially abuts a core 560 of the primary filter element 506 such that any axially reaction forces between the standoff 556 and the primary filter element 506 due to pressure drop across the primary filter element 506 due to fluid flow therethrough are not entirely applied to the filter media 516. This reduces the potential for the filter media 516 from telescoping. A support grate could be provided by the standoff 556 or against the standoff 556 to further prevent telescoping of the primary filter element 506.

The filter housing 504 includes a plurality of angularly spaced apart support vanes 562 that define flow channels 564 therebetween. The support vanes 562 define axial abutments 566 that face axially towards the inlet end of the filter housing 504. The secondary filter element 507, and particularly the closed end cap 552, axially abut the axial abutments 566 of the support vanes 562 to axially locate the secondary filter element 507 within the filter housing 504. After filtered fluid passes through the filter media 521 of the secondary filter element 507, the fluid will pass radially inward and axially through the flow channels 564 toward an outlet 570 of housing 504. Fluid flow through the filter assembly 500 is illustrated by arrows in FIG. 24.

Figure 26:
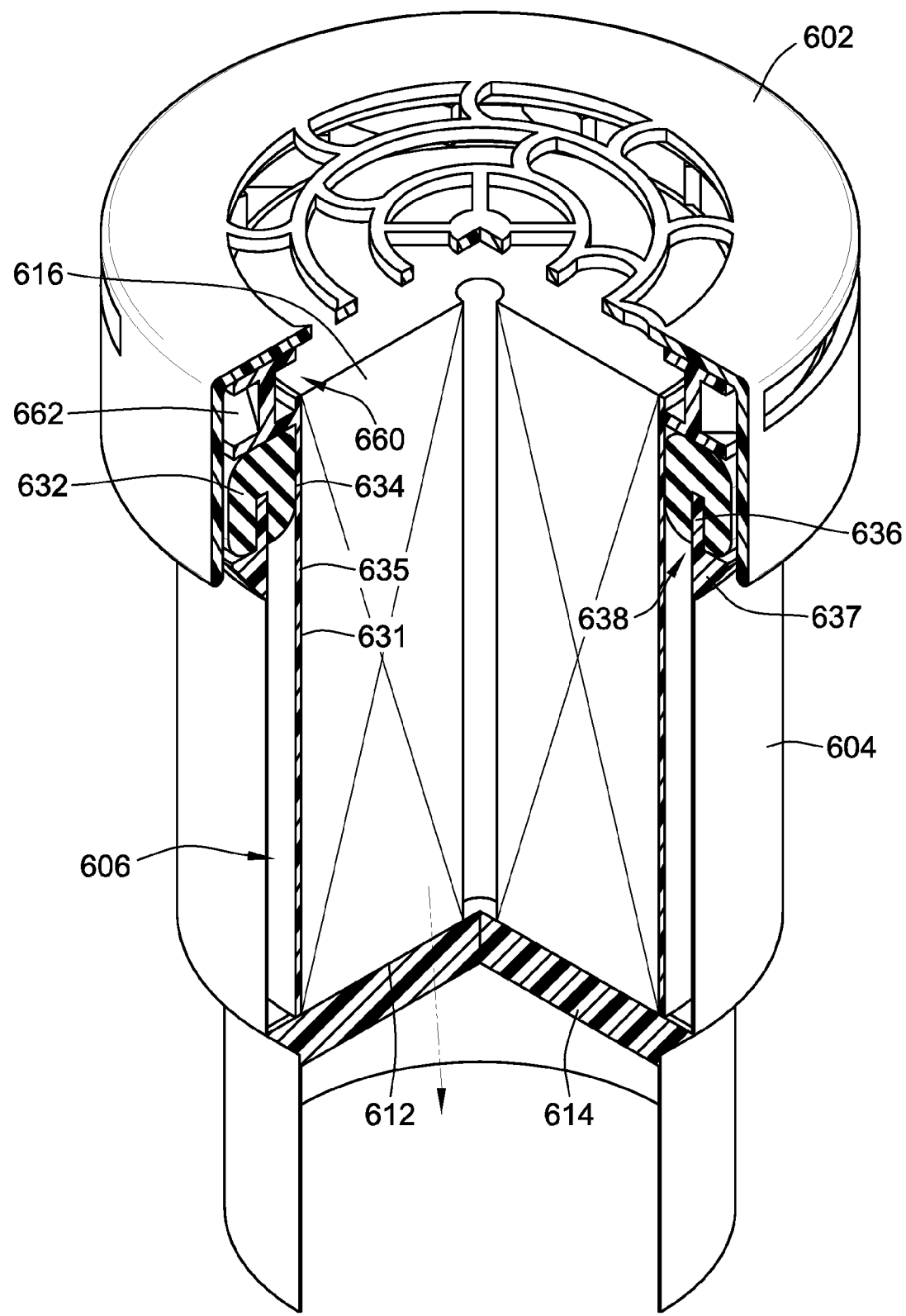
FIGS. 26-28 illustrate a sixth embodiment of a filter assembly.

FIG. 26 illustrates a further embodiment of a filter assembly 600 according to an embodiment of the present invention. The filter assembly 600 generally includes a cover or lid 602, a filter housing 604, a filter element 606, and a seal member 632.

The filter element 606 is positioned within filter housing 604. The filter housing 604 includes a downstream grate 614 that supports the filter element 606. The filter housing includes an axially extending seal support member 636 that carries seal member 632. A radially outward extending support flange 637 extends radially outward and is axially offset from a distal end of the seal support member 636.

The seal member 632 includes a groove 638 that axially receives the seal support member 636. A radially outer portion of the seal member 632 radially outward from the groove 638 axially rests against the support flange 637.

The seal member 632 includes a radially inward portion radially inward of the groove 638 that defines a radially inward directed seal surface 634 that seals with a radially outer surface 635 of a wrapper portion 631 of the filter element 606.

The filter element 606 includes a cylinder of filter media 616 extending axially between an inlet end 610 and an outlet end 612. The outlet end 612 is positioned proximate downstream grate 614. The outer wrapper portion 631 surrounds the filter media 616 and is sealingly attached thereto.

Figure 27:
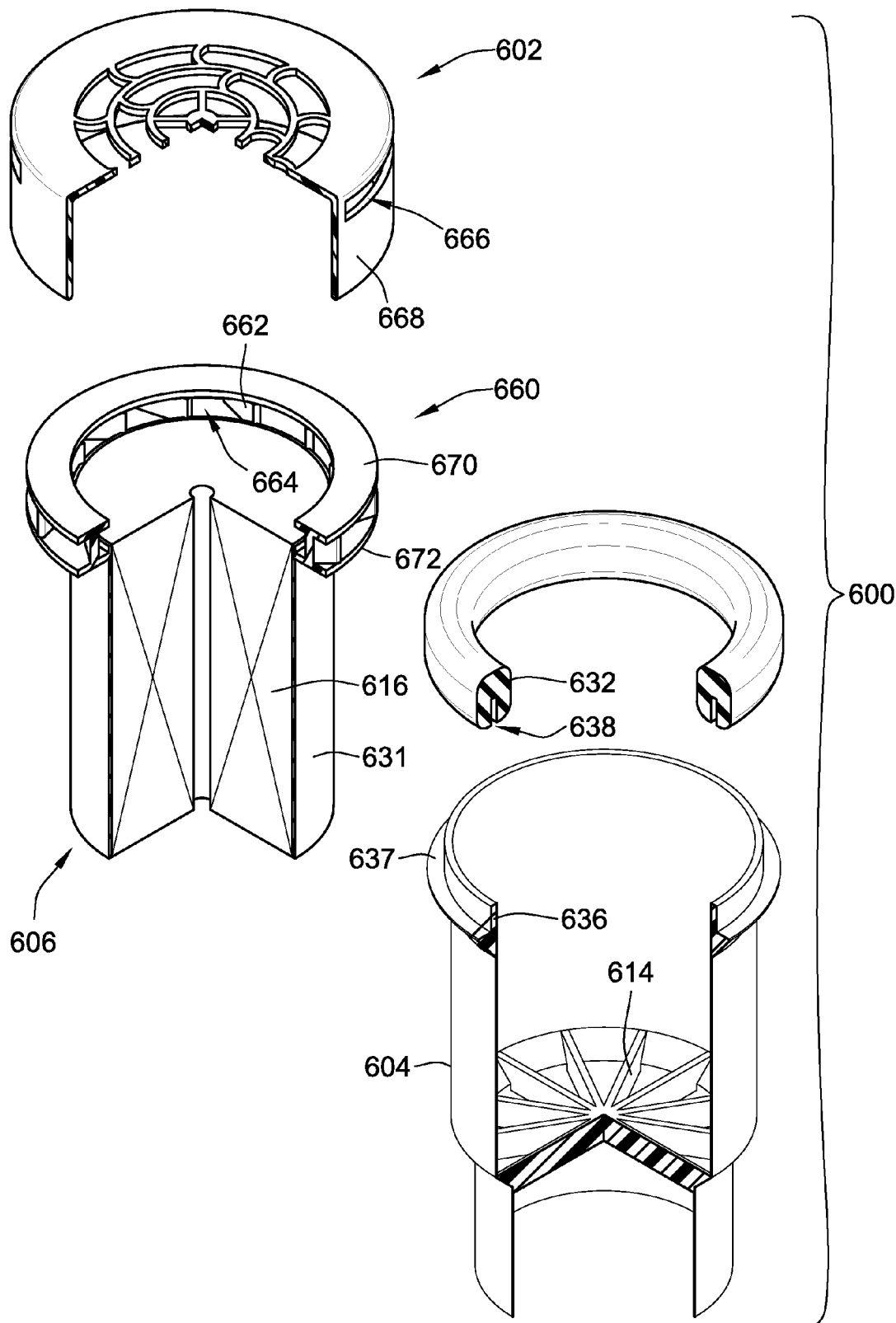

With additional reference to FIG. 27, the filter assembly 600 includes a pre-cleaner 660 in the form of an air swirler that angularly swirls incoming fluid proximate the inlet end 610 of the filter element 606. The pre-cleaner 660, in this embodiment, is formed as a one-piece construction with wrapper portion 631 of the filter element 606. The pre-cleaner includes a plurality of angled vanes 662 that spin the fluid as it passes through flow passages 664 between adjacent vanes 662. The cover 602 includes inlet ports or slots 666 formed in a downward depending skirt portion 668 thereof that aligns with the radially outer inlets of the flow passages 664.

The pre-cleaner 660 in this embodiment is positioned radially outward from the filter media 616 in cantilevered fashion. The vanes 662 are axially positioned between radially extending flanges 670, 672.

Figure 28:
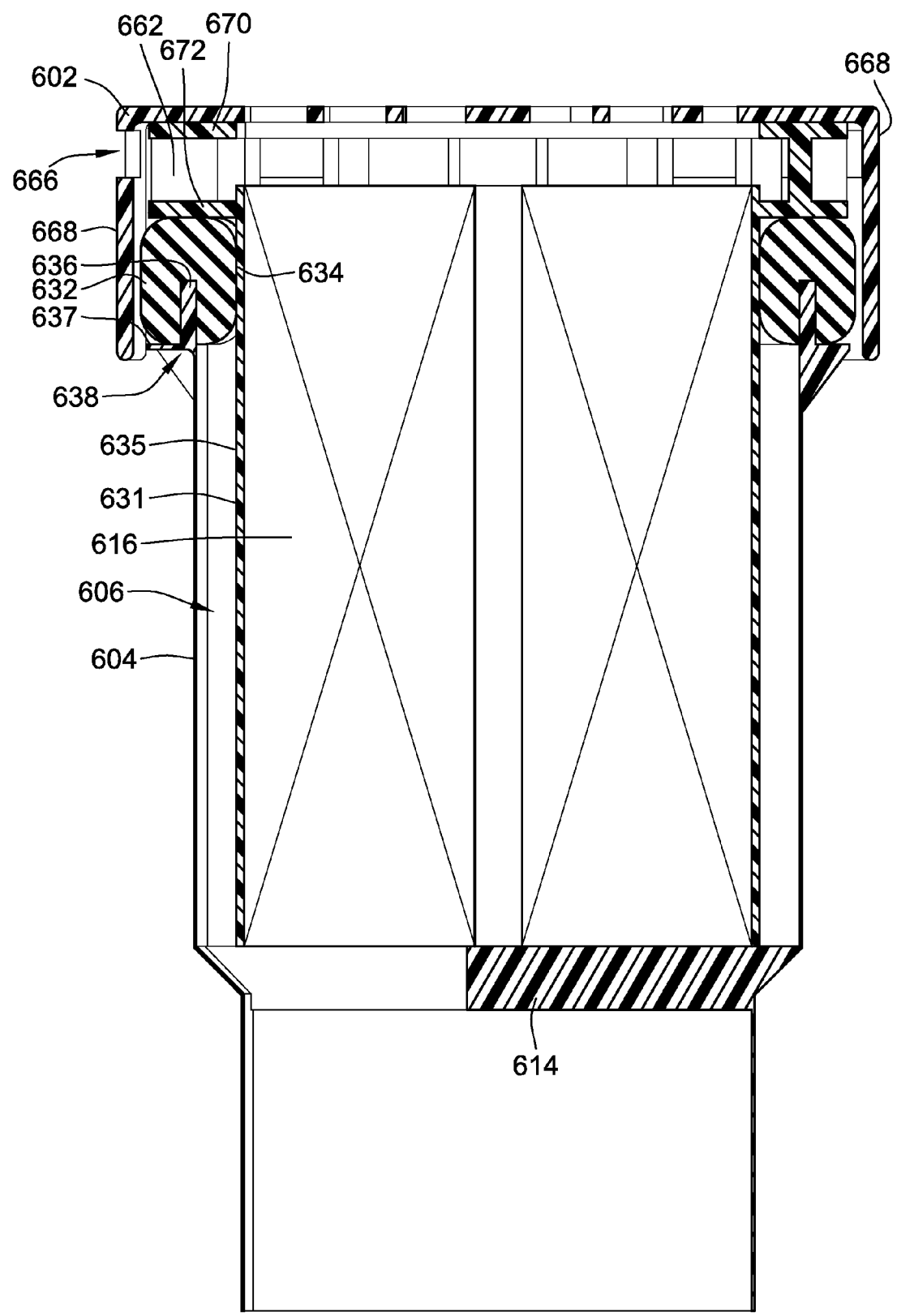

With reference to FIGS. 26 and 28, the seal member 632 is axially compressed between flange 672 and support flange 673 as well as radially interposed between seal support member 636 and outer sealing surface 635 to provide the seal between the housing 604 and the filter element 606.

Figure 29:
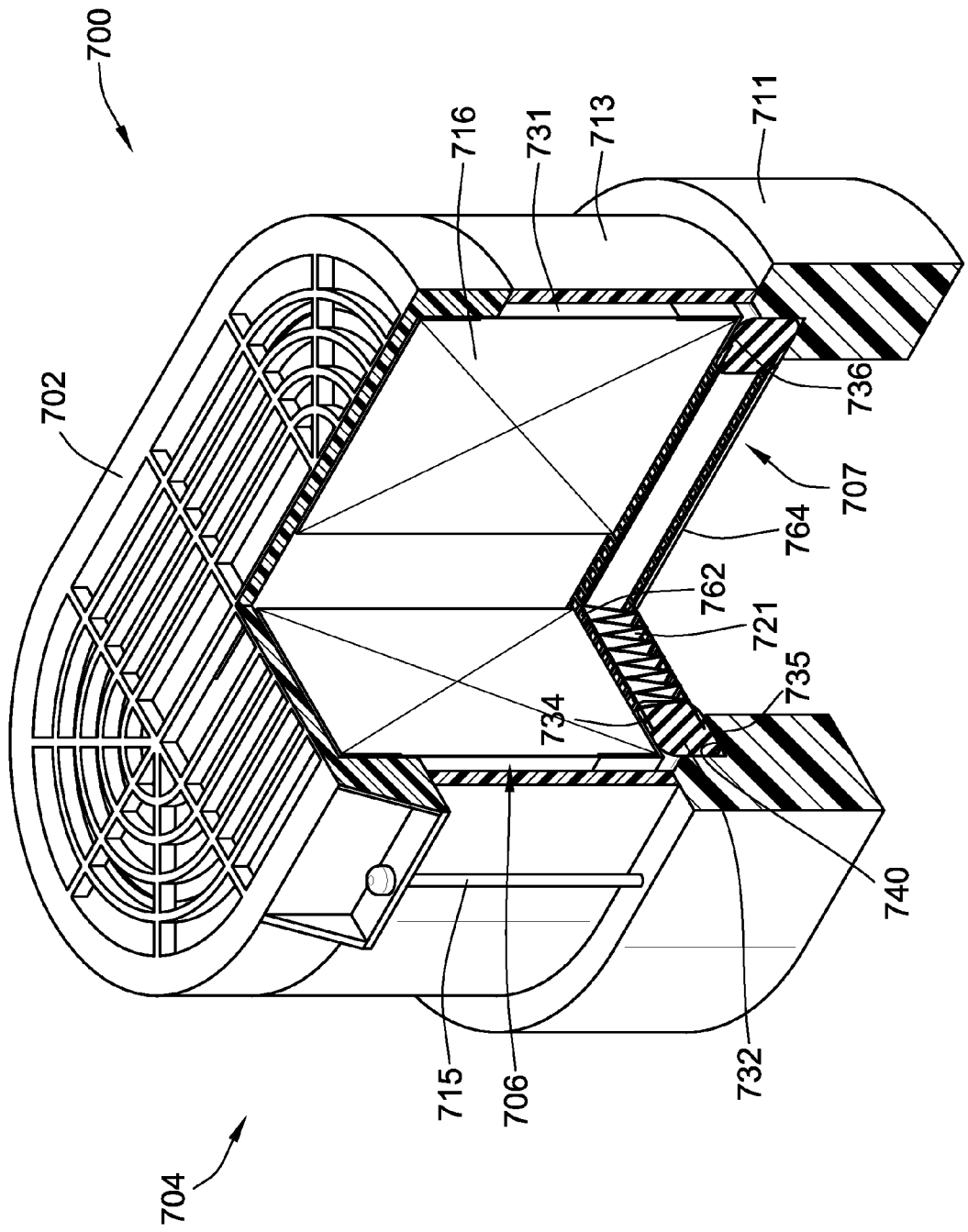
FIGS. 29-31 illustrate a seventh embodiment of a filter assembly.
Figure 30:
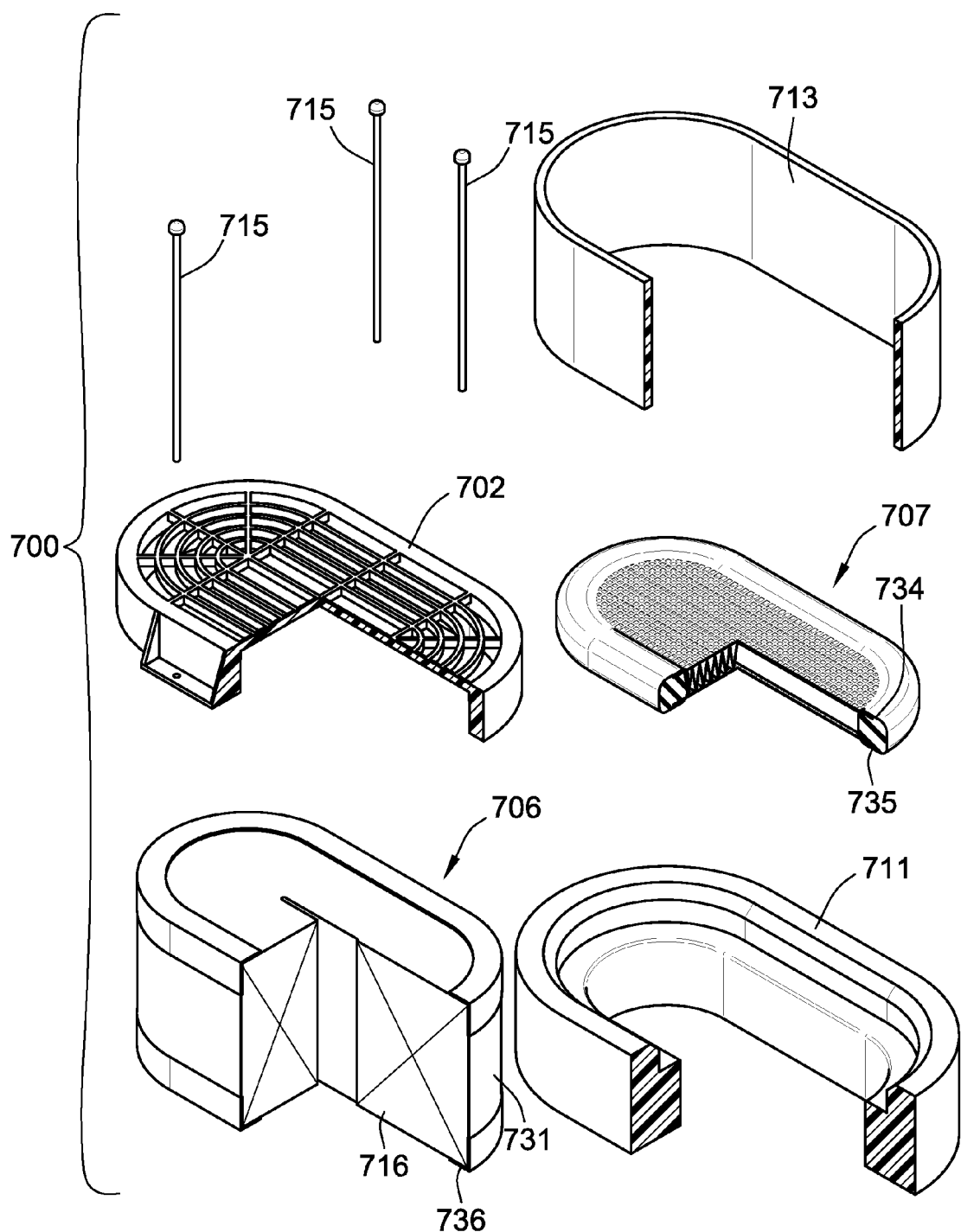
Figure 31:
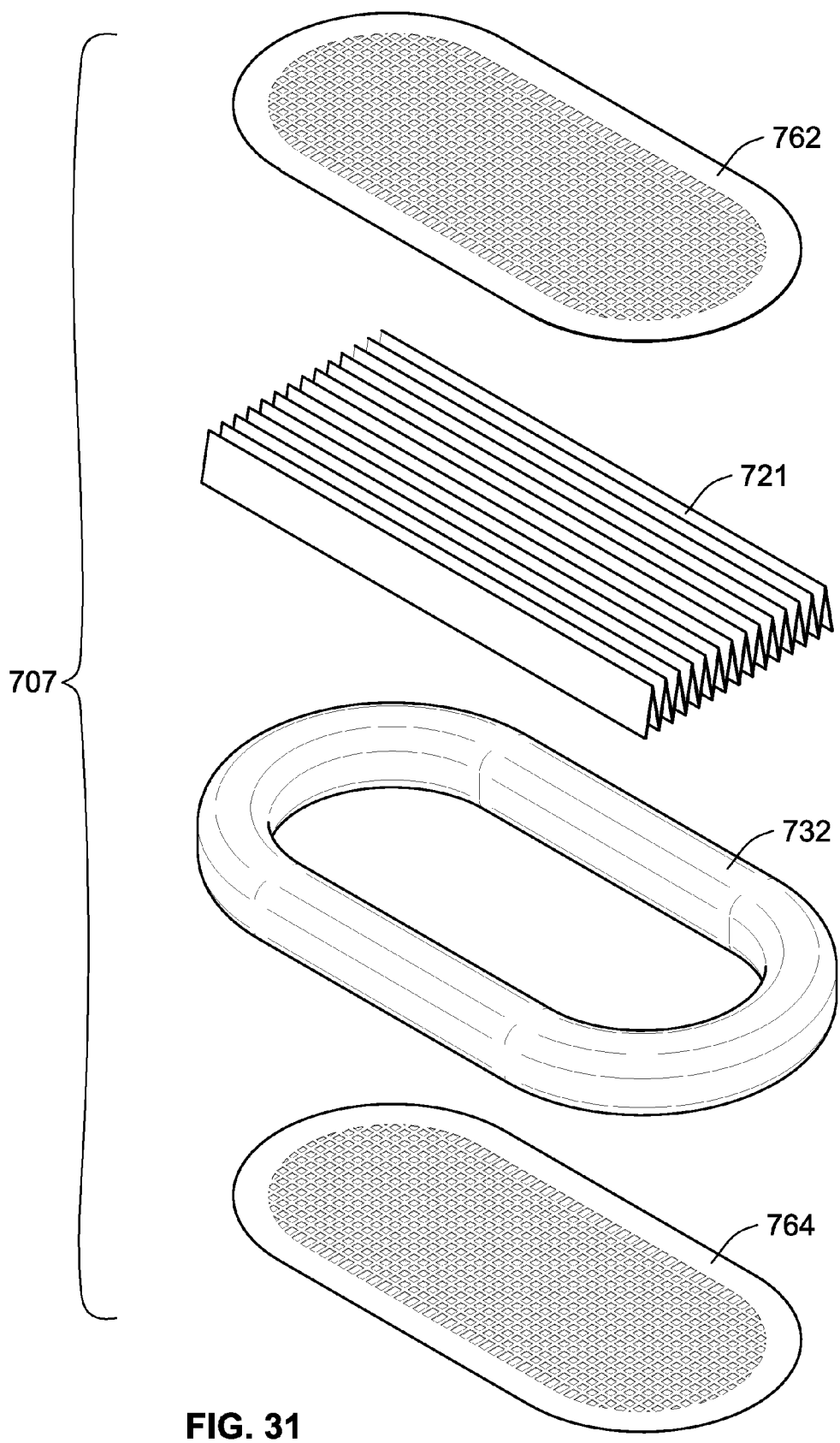

FIGS. 29-31 illustrate a further embodiment of a filter assembly 700 according to an embodiment of the present invention. The filter assembly 700 includes a cover or lid 702, a filter housing 704, a primary filter element 706 and a secondary filter element 707.

In this embodiment, the filter housing 704 is formed from a plurality of components including a base portion 711 and a sidewall portion 713. When assembled, the sidewall portion 713 is axially sandwiched between the cover 702 and the base portion 711. In this embodiment, the filter assembly 700 includes bolts 715 that can be used to tighten the cover 702 down against one end of the sidewall portion 713. The bolts 715 thread into base portion 711. Alternative embodiments could use buckles or snap arrangements that snap over-center rather than bolts 715.

The secondary filter element 707 includes a seal member 732 that is axially sandwiched between the primary filter element 706 and an abutment face 740 of the base portion 711. The abutment face 740 axially faces an inlet end of the filter assembly 700. The seal member 732 provides the seal for both the primary and secondary filter elements 706, 707 relative to filter housing 704. The seal member 732 includes opposed axially facing sealing surfaces 734, 735 to provide the desired axial sealing of the primary and secondary filter elements 706, 707 relative to one another as well as with filter housing 704.

The secondary filter element 707 includes pleated filter media 721 and upstream and downstream grates 762, 764 all of which are embedded within seal member 732 to prevent fluid bypass.

The primary filter element 706 includes an outer imperforate wrapper portion 731 and at least one seal member including a radially inward extending seal flange 736 that is axially compressed against a sealing face of the seal member 732. The seal flange 736 extends radially inward and extends over at least a portion of the downstream outlet end of the filter media pack 716. When assembled, the filter media pack 716 is axially supported by the secondary filter element 707 and particularly grates 762, 764 to prevent telescoping thereof.

The primary filter element 706 is axially symmetrical such that the inlet and outlet ends thereof are identical such that the filter element 706 can be inserted into the housing 704 with either axial face proximate the inlet or outlet ends of the filter housing 704.

FIGS. 32-36 illustrate a further embodiment of a filter assembly 800 according to the teachings of the present invention. The filter assembly 800 generally includes a lid or cover (not shown), filter housing 804, primary filter element 806 and a secondary filter element 807.

The filter housing 804 generally has a stepped profile having an upstream portion that has a larger diameter than a downstream portion thereof. The filter housing 804 has a mounting flange 822 for securing the cover or lid like discussed in prior embodiments.

Figure 36:
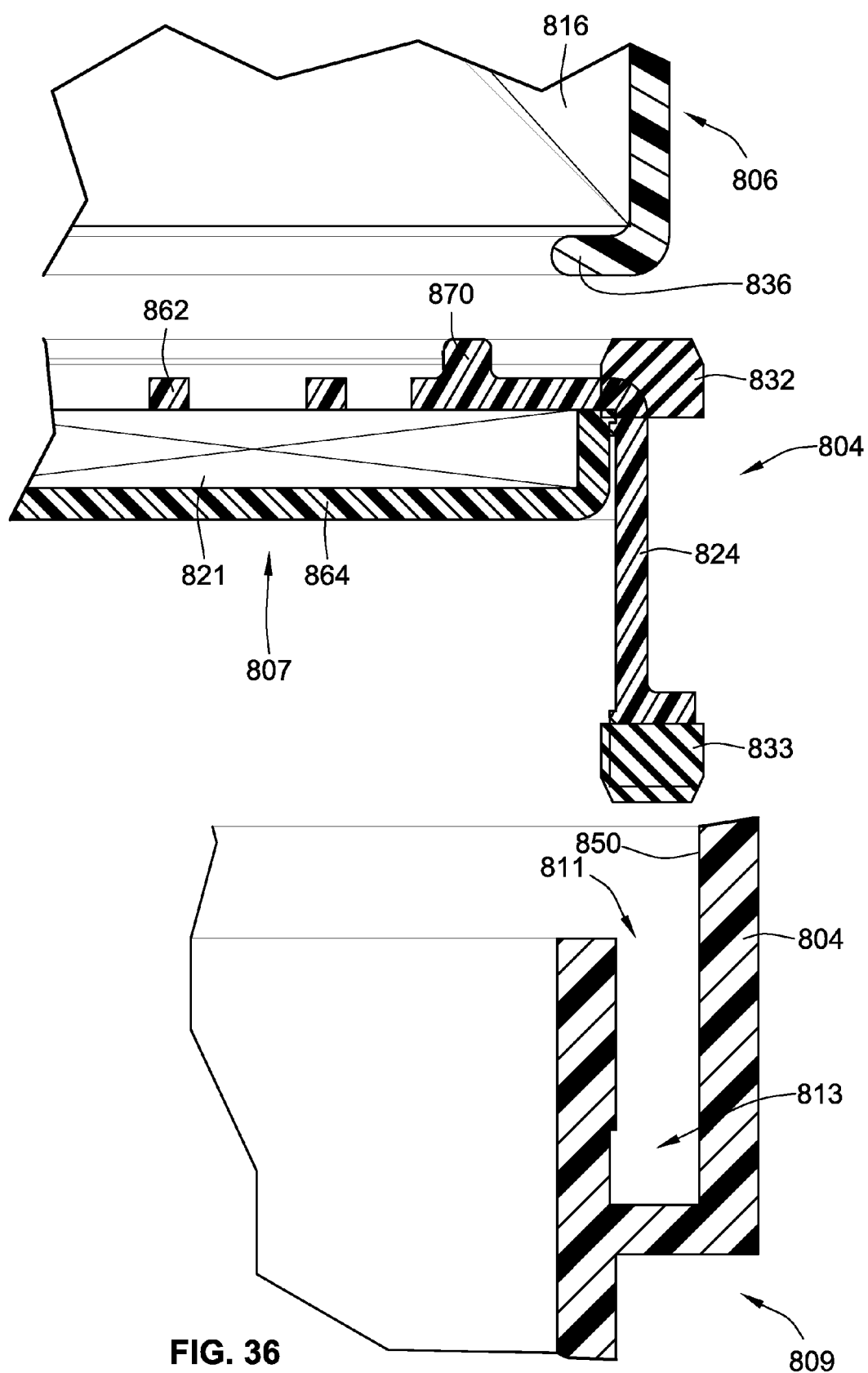
Figure 37:
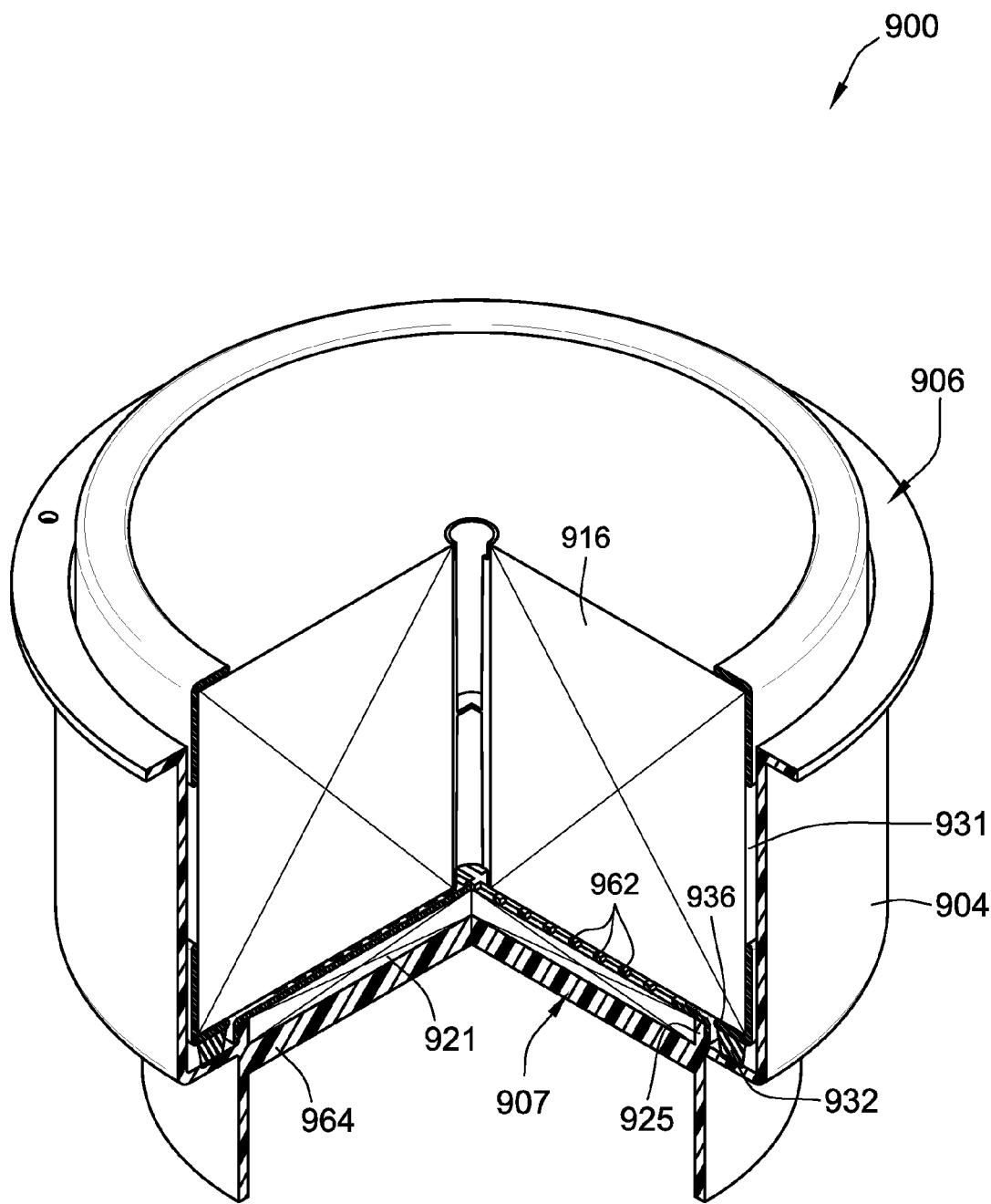
FIGS. 37-40 illustrate a ninth embodiment of a filter assembly.
Figure 38:
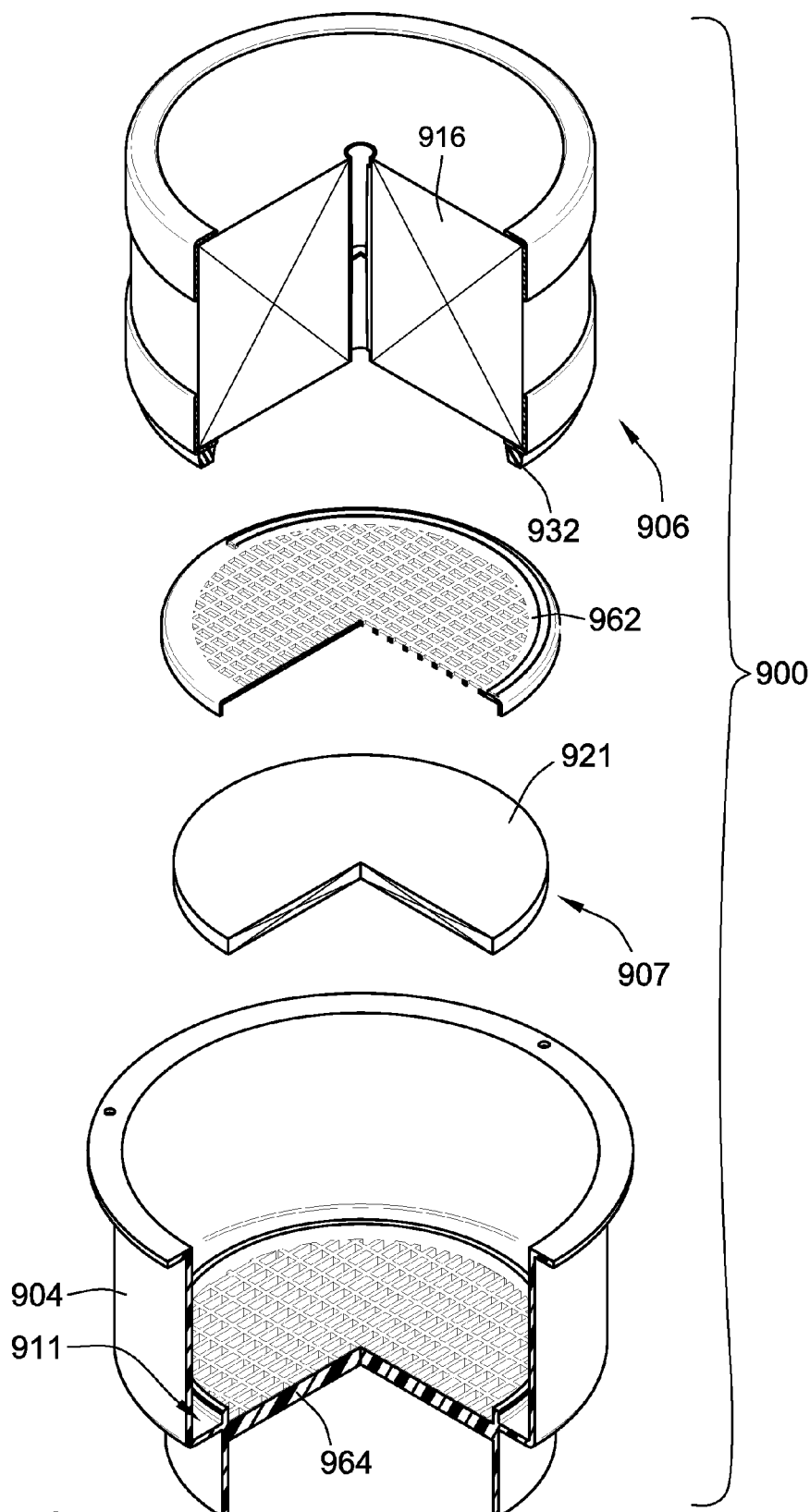
Figure 39:
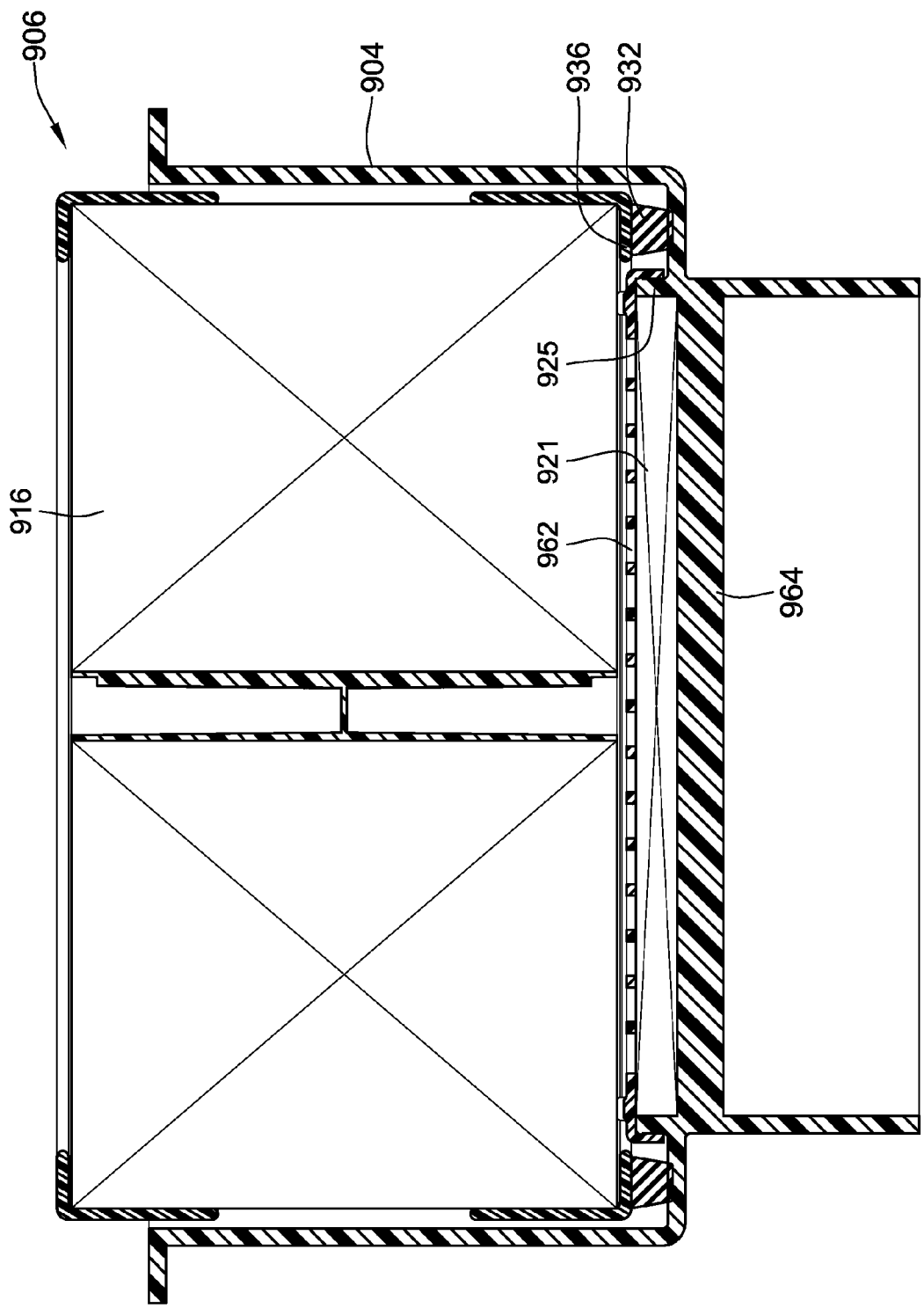
Figure 40:
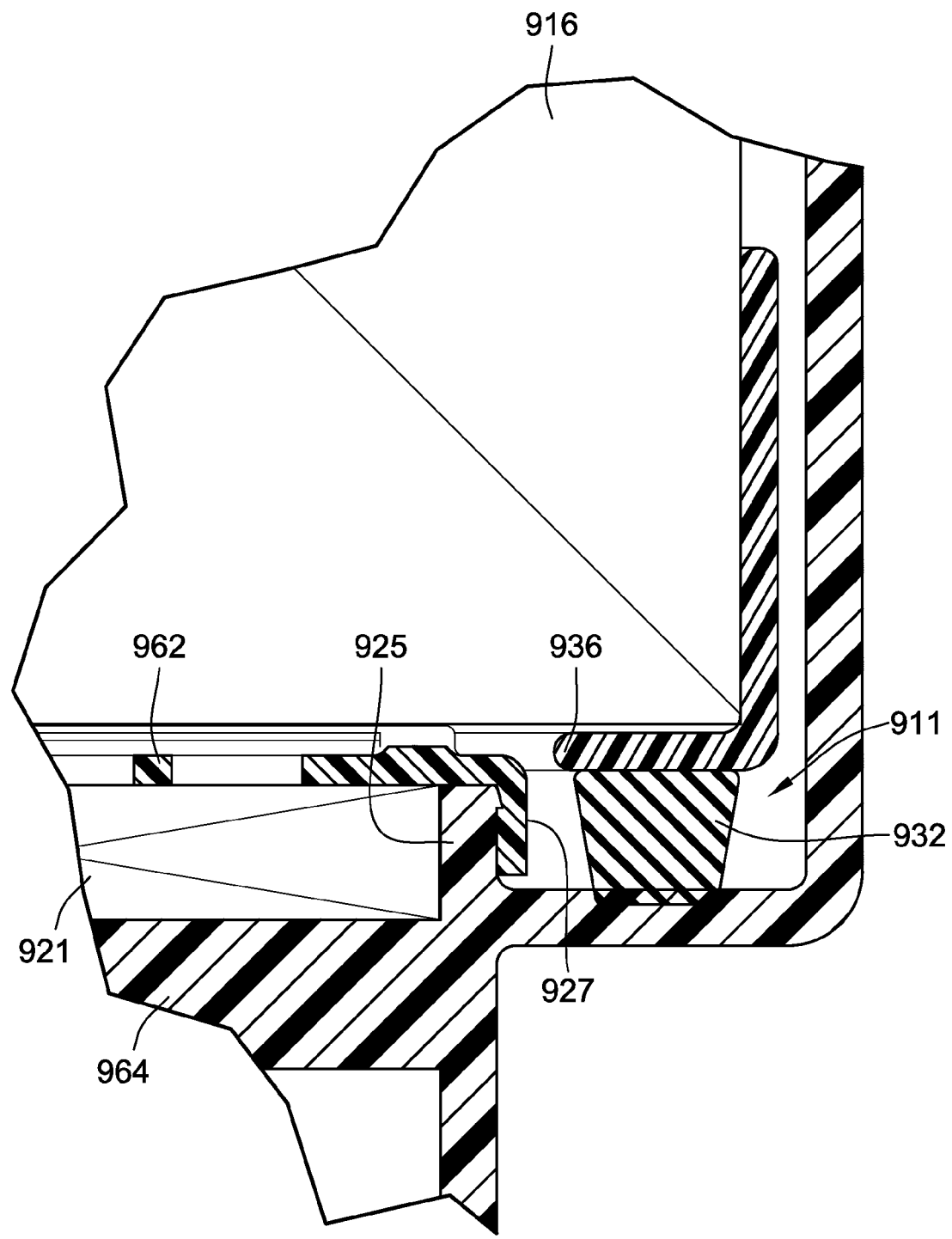

With reference to FIG. 36, the filter housing 804 includes a stepped region 809 and a groove 811 proximate the stepped region 809 for locating the secondary filter element 807 as well as for assisting in sealing of the primary and secondary filter elements 806, 807 relative to the filter housing 804.

Figure 32:
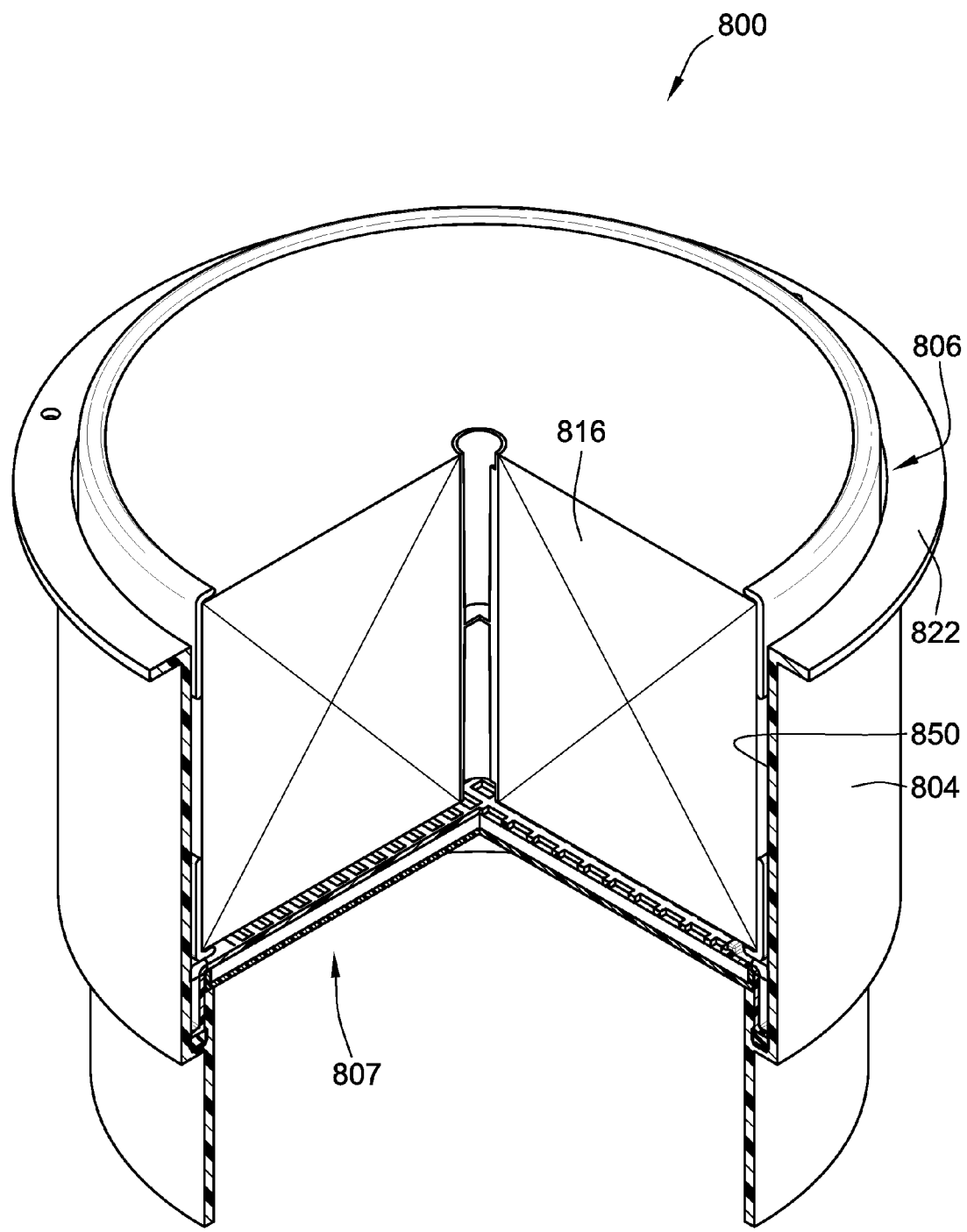
FIGS. 32-36 illustrate an eighth embodiment of a filter assembly.
Figure 33:
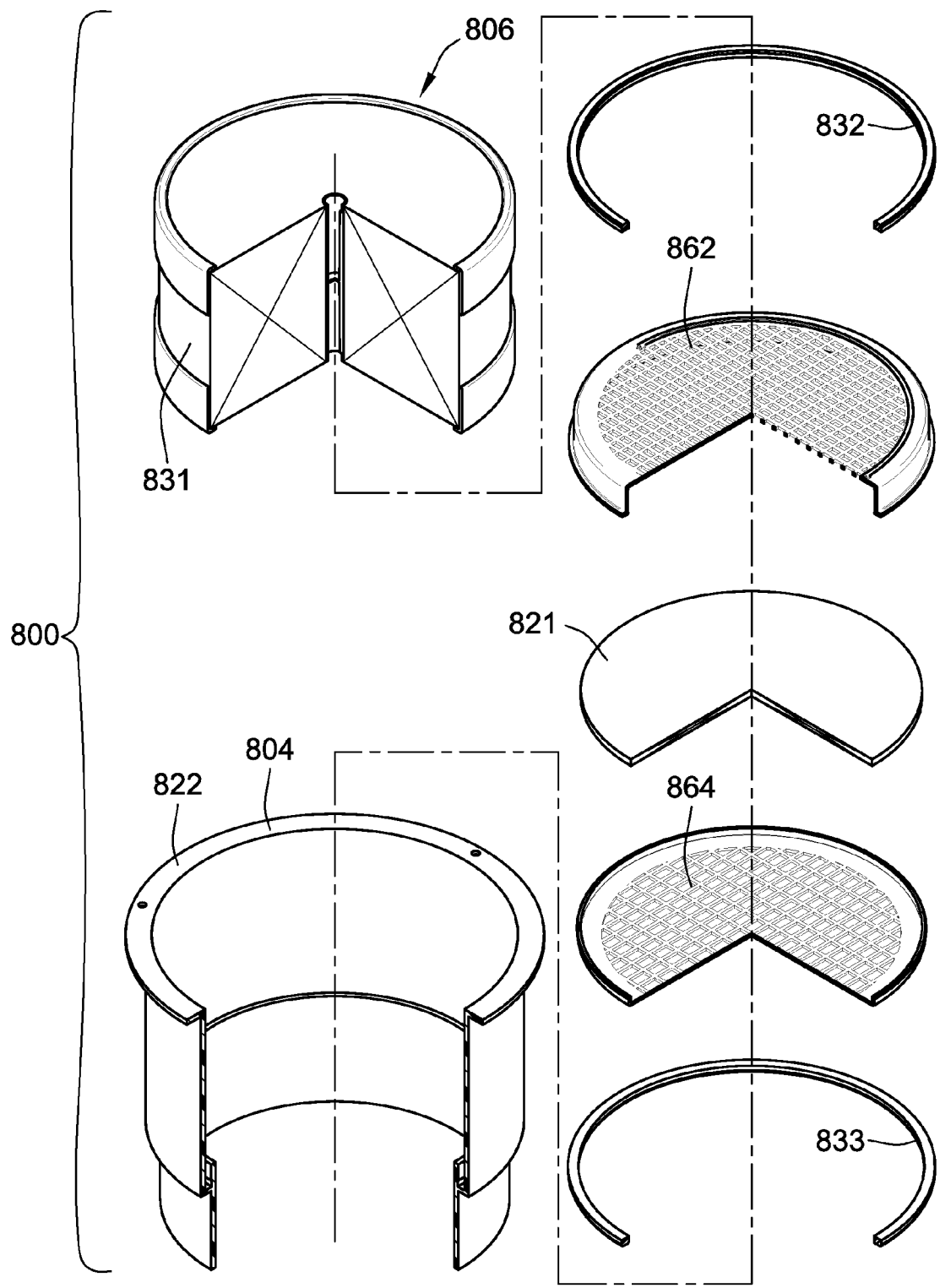
Figure 34:
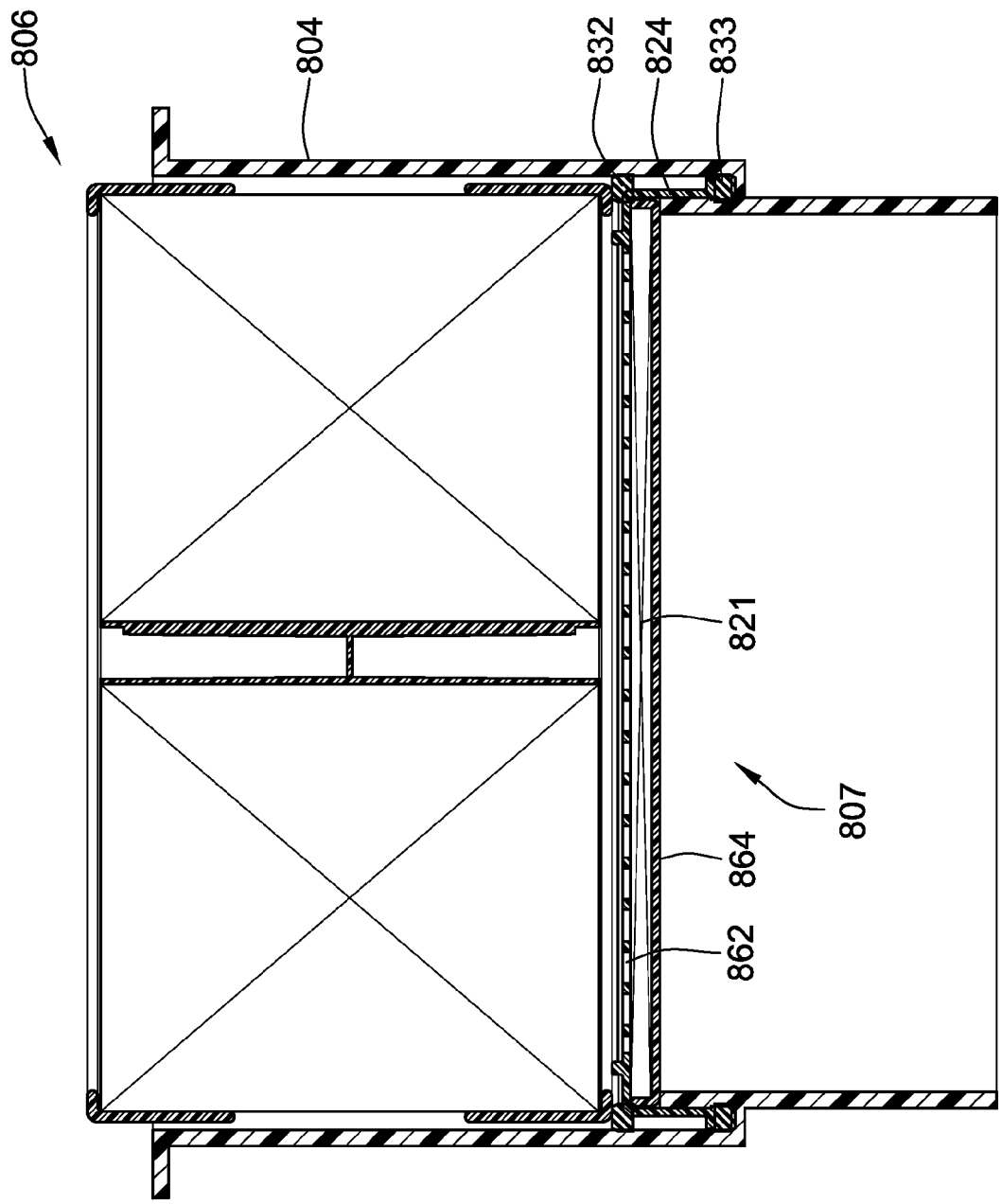
Figure 35:
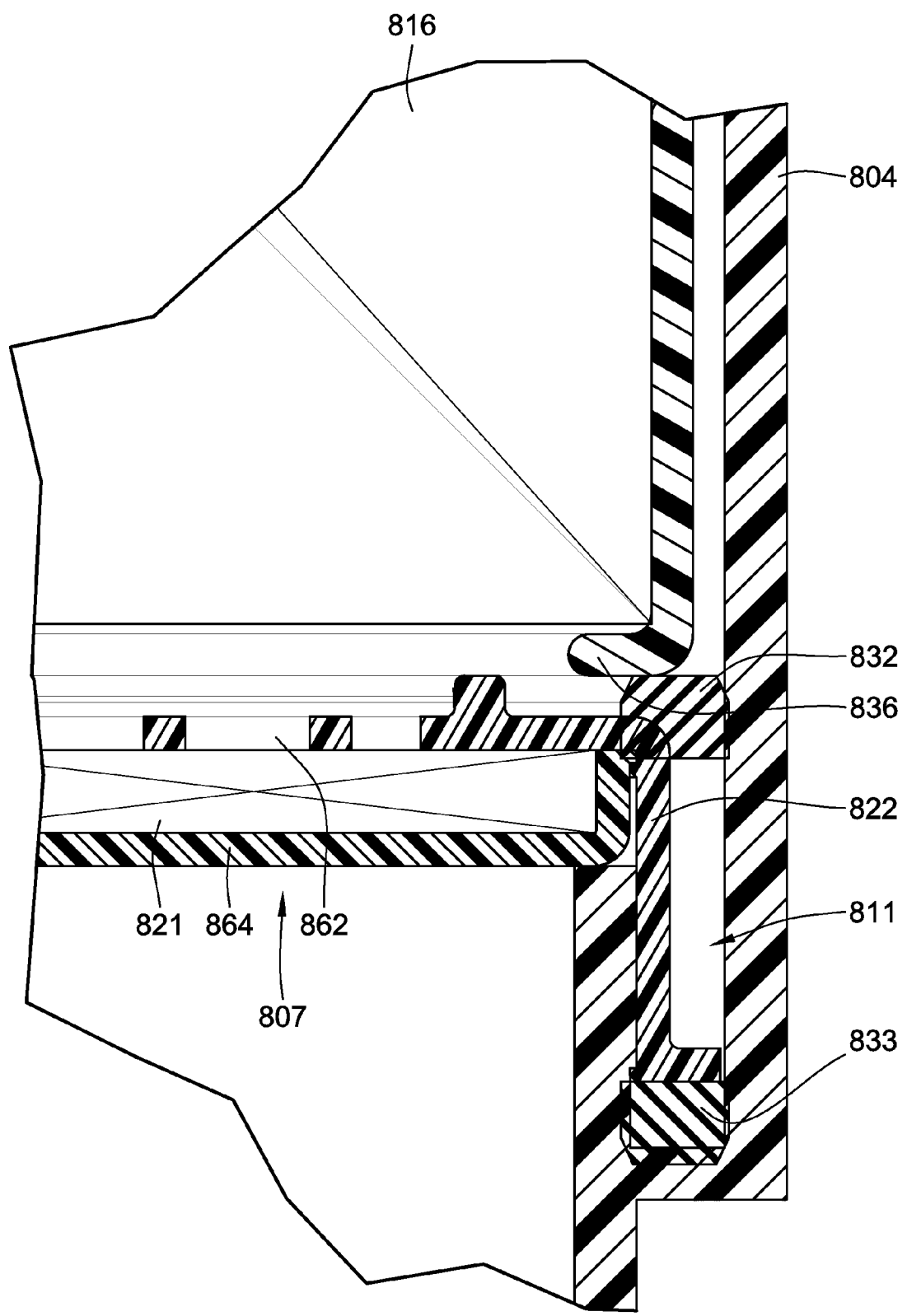

With reference to FIGS. 32, 33 and 36, the secondary filter element includes a pair of seal members 832, 833. Seal member 832 axially engages a sealing flange 836 of the primary filter element 806. Sealing flange 836 is sealingly attached to an outer imperforate wrapper 831 of the primary filter element 806. Seal member 832 can also, but not necessarily, radially engage the inner surface 850 of the upstream portion of the filter housing 804 to further assist in sealing of the filter elements 806, 807 to the filter housing. In a preferred embodiment, seal member 832 is a foamed urethane gasket molded to a seal support structure 824 of the secondary filter element 807.

The secondary filter element 807 also includes upstream and downstream grates 862, 864 with filter media 821 sandwiched therebetween. The upstream grate 862 is formed with the seal support structure 824 as a single molded component. Again, the grates 862, 864 assist in preventing telescoping of the filter media 816. The downstream grate 864 in this embodiment is snap engaged to the seal support structure 824.

The second seal member 833 can be molded urethane attached to an end of the seal support structure 824 or a free floating gasket. Preferably, it is attached to the seal support structure 824 to assist in removing it from groove 811 during maintenance intervals. Preferably, seal member 833 provides an axial compression seal between the seal support structure 824 of the secondary filter element 807 and the bottom of the groove 811 formed by the filter housing 804. However, in some embodiments, the second seal member 833 will provide one or more radial sealing interfaces between itself and the housing 804.

The groove 811 includes a radially inward directed recess 813 that assists in locating the second seal member 833. However, a radially outward directed or no recess could be provided in groove 811.

The upstream grate 862 includes an axially extending support rib 870.

FIGS. 37-40 illustrate a further embodiment of a filter assembly 900 according to the teachings of the present invention. The filter assembly includes a cover or lid (not shown), a filter housing 904, a primary filter element 906, and a secondary filter element 907.

In this embodiment, the primary filter element 906 includes an axial seal member 932 molded to a sealing flange 936 that extends radially over an outlet end of the filter media 916 of the filter element 906. Preferably, the seal member 932 is urethane. Alternatively, the seal member 932 could be adhesively or mechanically secured to seal flange 936. The primary filter element 906 includes an imperforate outer wrapper 931. The seal member 932 preferably tapers and narrows in the direct of flow through the filter element 906.

The filter housing 904 includes a stepped region such that the inlet end of the filter housing has a larger radial diameter than the outlet end. The stepped region defines a groove 911. The seal member 932 axially seals against a bottom of the groove 911 that defines an axially facing seal surface that faces towards the inlet end of the filter housing 904.

The filter housing 904 includes a downstream grate 964 integrally formed with the rest of the housing to form a one-piece construction.

The downstream grate 964 axially supports the secondary filter element 907. The secondary filter element 907, and particularly the filter media 921 thereof, is located within an axially extending annular sidewall 925 that forms the radially inner boundary of groove 911.

A removable upstream grate 962 extends across the secondary filter element 907 and rests axially against an upstream distal end of sidewall 925. The upstream grate 962 includes an axially extending flange or sidewall 927 that has an inner diameter that is sized large enough to receive sidewall 925 of the filter housing 904 axially therein.

The upstream grate 962 assists in supporting the filter media 916 of the primary filter element 906 and prevent telescoping thereof.

Figure 41:
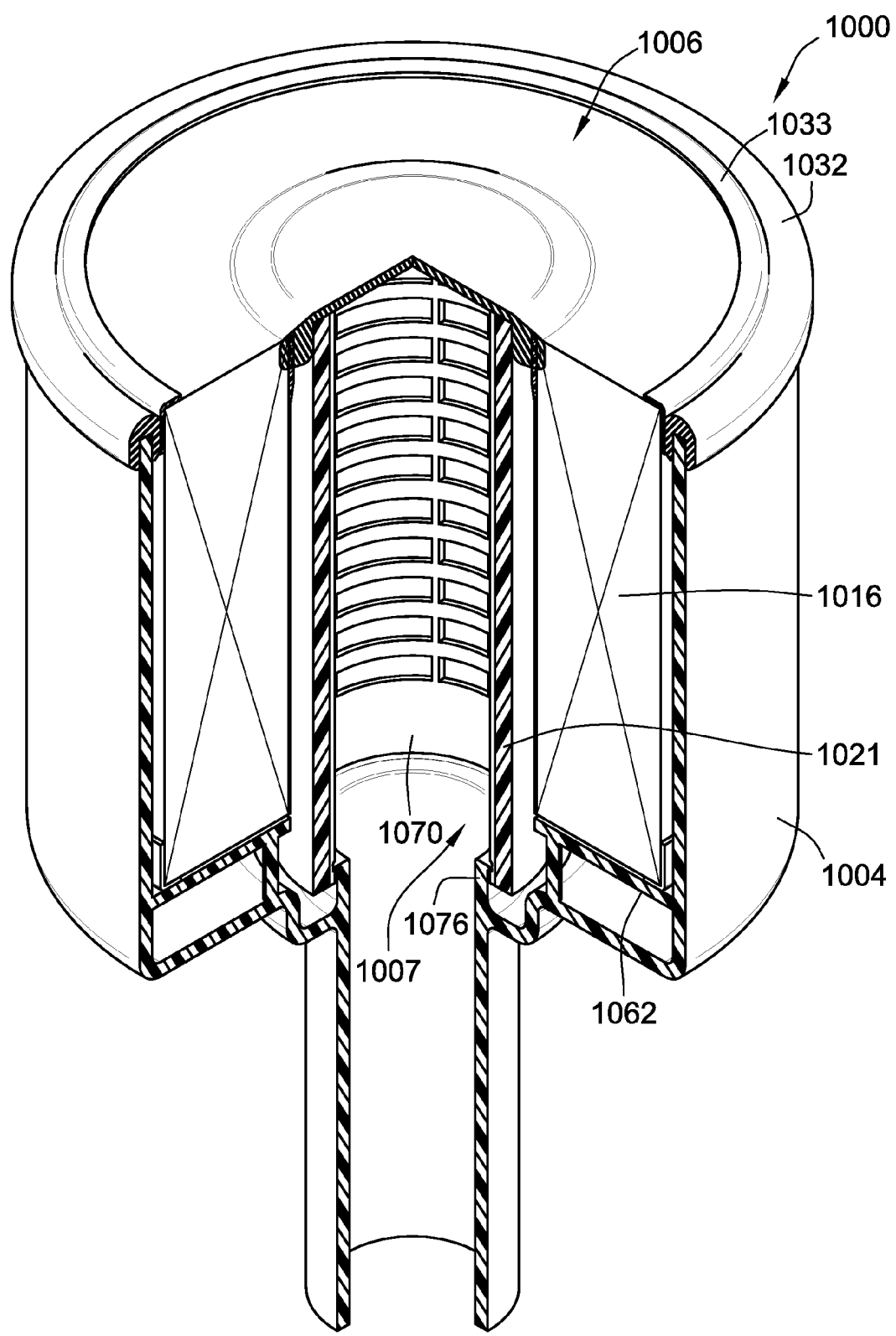
FIGS. 41-43 illustrate a tenth embodiment of a filter assembly.
Figure 42:
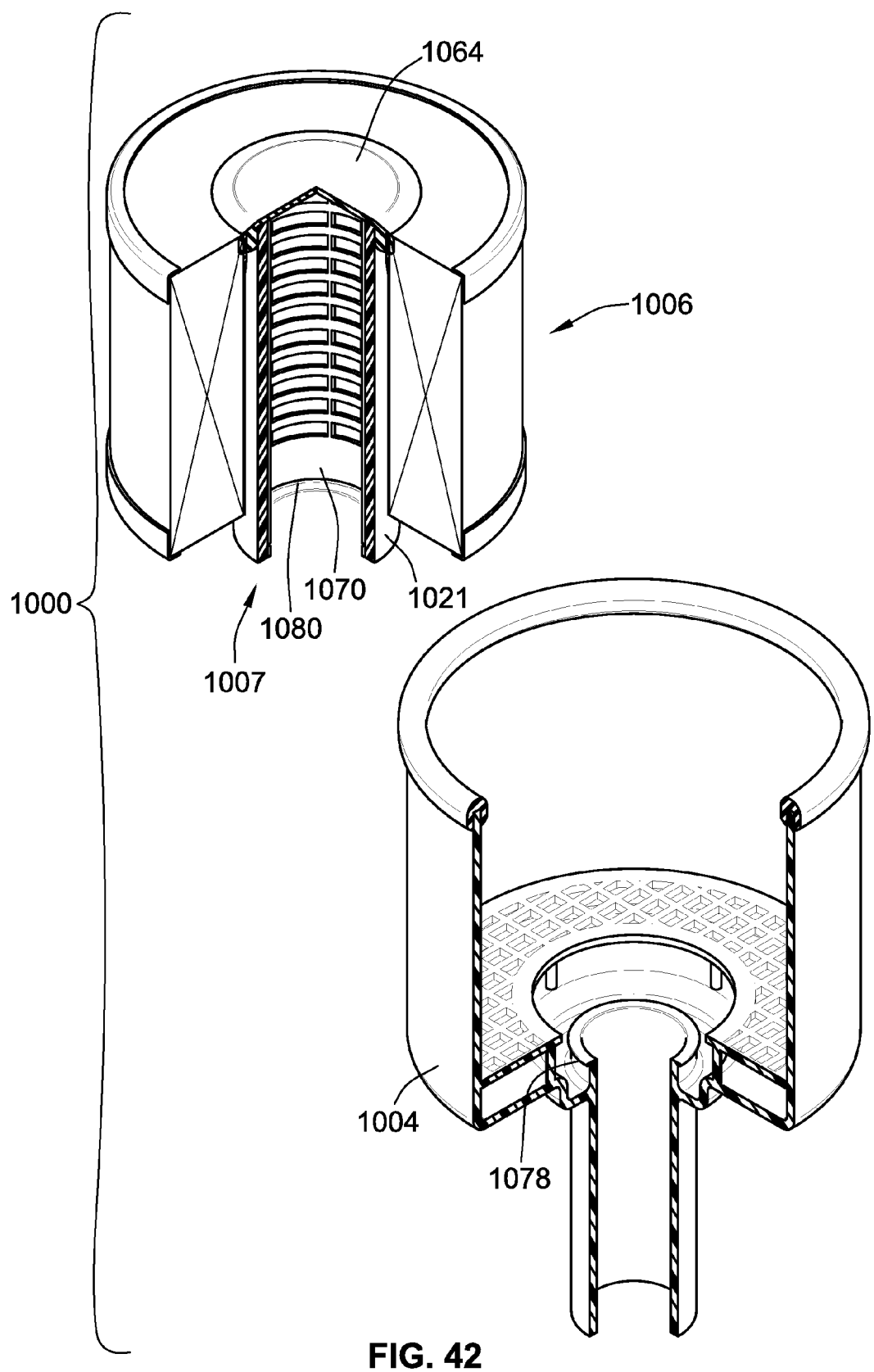
Figure 43:
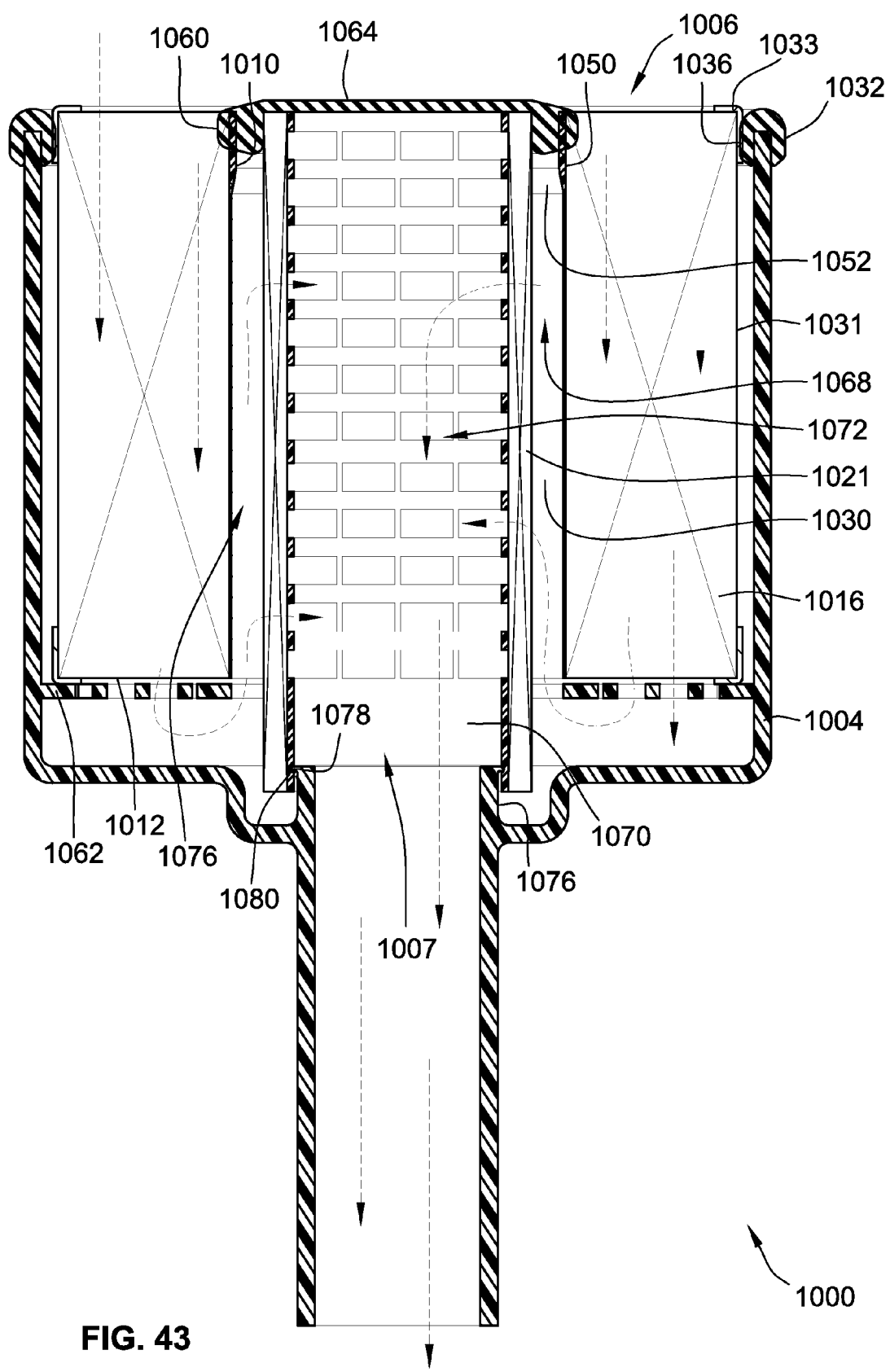

FIGS. 41-43 illustrate a further embodiment of a filter assembly 1000 according to the present invention. The filter assembly generally includes a cover or lid, a filter housing 1004, a primary filter element 1006 and a secondary filter element 1007.

The primary filter element 1006 is generally tubular and includes an inner imperforate wrapper portion 1030. The primary filter element 1006 also includes an outer imperforate wrapper portion 1031. Fluid flow through the primary filter element 1006 is preferably axial from inlet end 1010 toward outlet end 1012. The primary filter element includes a seal member 1033 attached proximate the inlet end 1010. The seal member includes a radially inward extending flange as well as an axially extending flange. The axially extending flange defines a radially outward facing sealing surface that seals with a radially inner facing sealing surface 1036 of seal member 1032. Seal member 1032 may be permanently attached to filter housing 1004 or could be replaceable.

The radially inner wrapper portion 1030 includes a seal portion 1050 that has a reduced inner diameter and a ramp section 1052. This seal portion 1050 will cooperate with a seal surface 1060 of a closed end cap 1064 of the secondary filter element 1007.

The secondary filter element 1007 is positioned within an internal cavity 1068 defined by the tubular primary filter element 1006 when the filter assembly 1000 is fully assembled.

The secondary filter element 1007 includes a plastic centertube 1070 that supports a tubular pack of media 1021. Media 1021 may be a standard pleated media pack or could be provided by other media. The secondary filter element 1007 is configured for radially directed flow. (Fluid flow through the primary and secondary filter elements 1006, 1007 is illustrated by arrows).

Closed end cap 1064 closes off the internal cavity 1072 of the secondary filter element 1007 as well as provides the seal between the primary and secondary filter elements 1006, 1007. In one embodiment, the closed end cap is a foamed urethane that is permanently attached to the secondary filter element 1007.

The filter housing 1004, proximate an outlet end thereof, includes an axially extending hub 1076 that includes a radially outward extending projection 1078 that engages a groove 1080 formed in an inner surface of the centertube 1070. A seal member can be positioned in the groove 1080 or on projection 1078 to promote sealing therebetween and prevent fluid bypass around the filter media 1021 of the secondary filter element 1007. The end of the secondary filter element 1007 proximate groove 1080 is an open end and is opposite the closed end including closed end cap 1064.

The primary filter element 1006 axially abuts an annular imperforate grate 1062 of the filter housing 1004. The annular grate 1062 extends radially inward from the outer sidewall portion of the filter housing 1004. The annular grate 1062 axially offsets the outlet end of the filter element 1006 from a stepped region of the filter housing 1004 to allow fluid to exit the primary filter element 1006.

A radial gap 1076 is formed between the primary and secondary filter elements 1006, 1007 to allow fluid flow therebetween after the fluid exits the primary filter element 1006.

Figure 44:
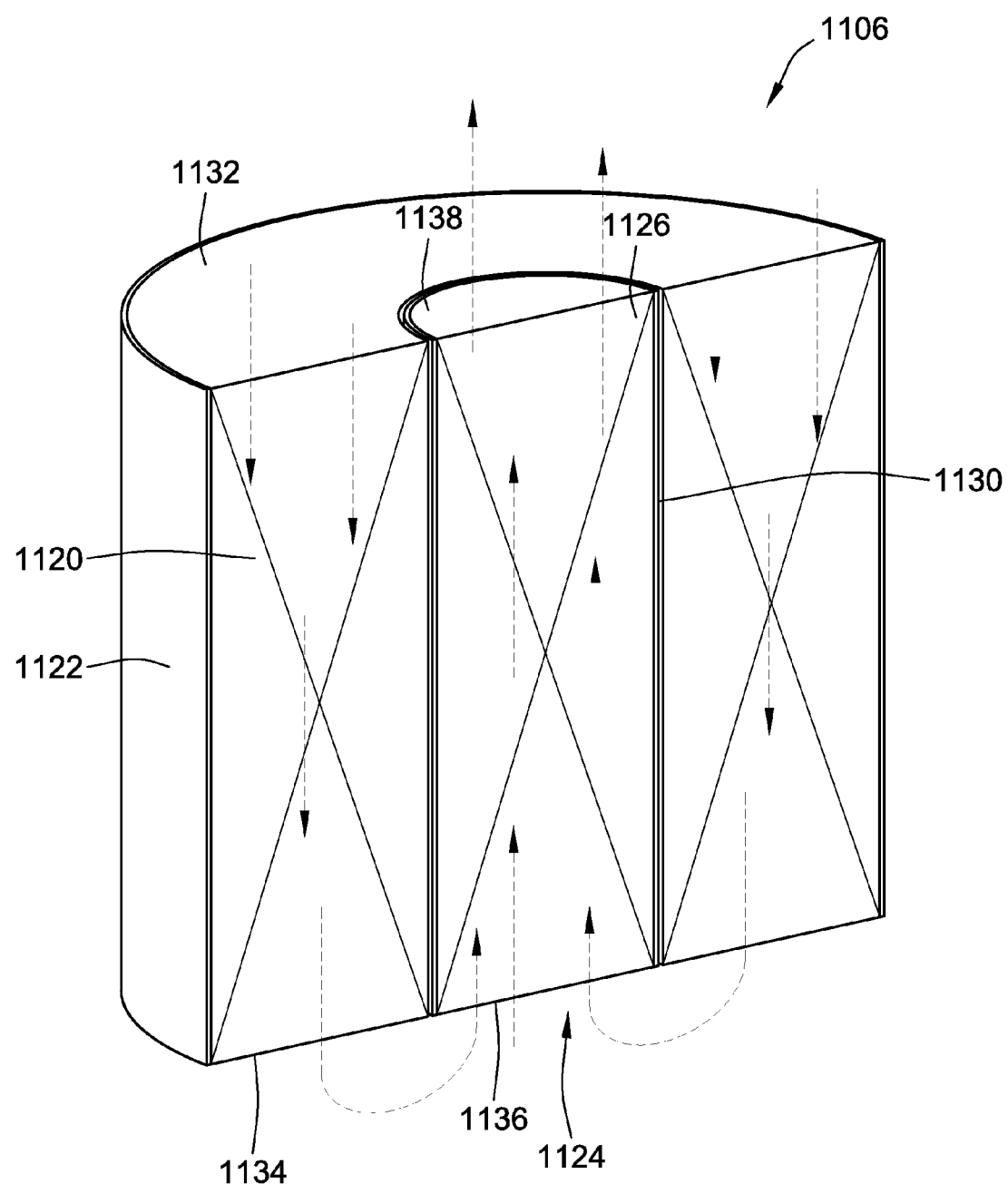
FIG. 44 illustrates a dual flow media pack.

FIG. 44 illustrates an embodiment of a dual element media pack 1106. The dual element media pack includes an outer tubular media pack 1120 having an outer imperforate wrapper portion 1122. The tubular media pack 1120 defines an internal cavity 1124 in which an inner cylindrical media pack 1126 is positioned. The inner cylindrical media pack 1126 includes an outer imperforate wrapper portion 1130.

Fluid flow through the media pack 1106 travels axially from an inlet end 1132 of the tubular media pack 1120 axially toward an outlet end 1134 through the filter media thereof. The fluid will then flow radially inward toward an inlet end 1136 of the cylindrical media pack 1126. The fluid will then flow axially from the inlet end 1136 of the cylindrical media pack 1126 toward the outlet end 1138 of the cylindrical media pack 1126.

The outlet end 1134 of the outer media pack 1120 and inlet end 1136 of the cylindrical media pack 1126 will be positioned within a closed end of a filter housing.

In a preferred embodiment, the media of the two different media packs 1120, 1126 will have different filtering characteristics.

Figure 45:
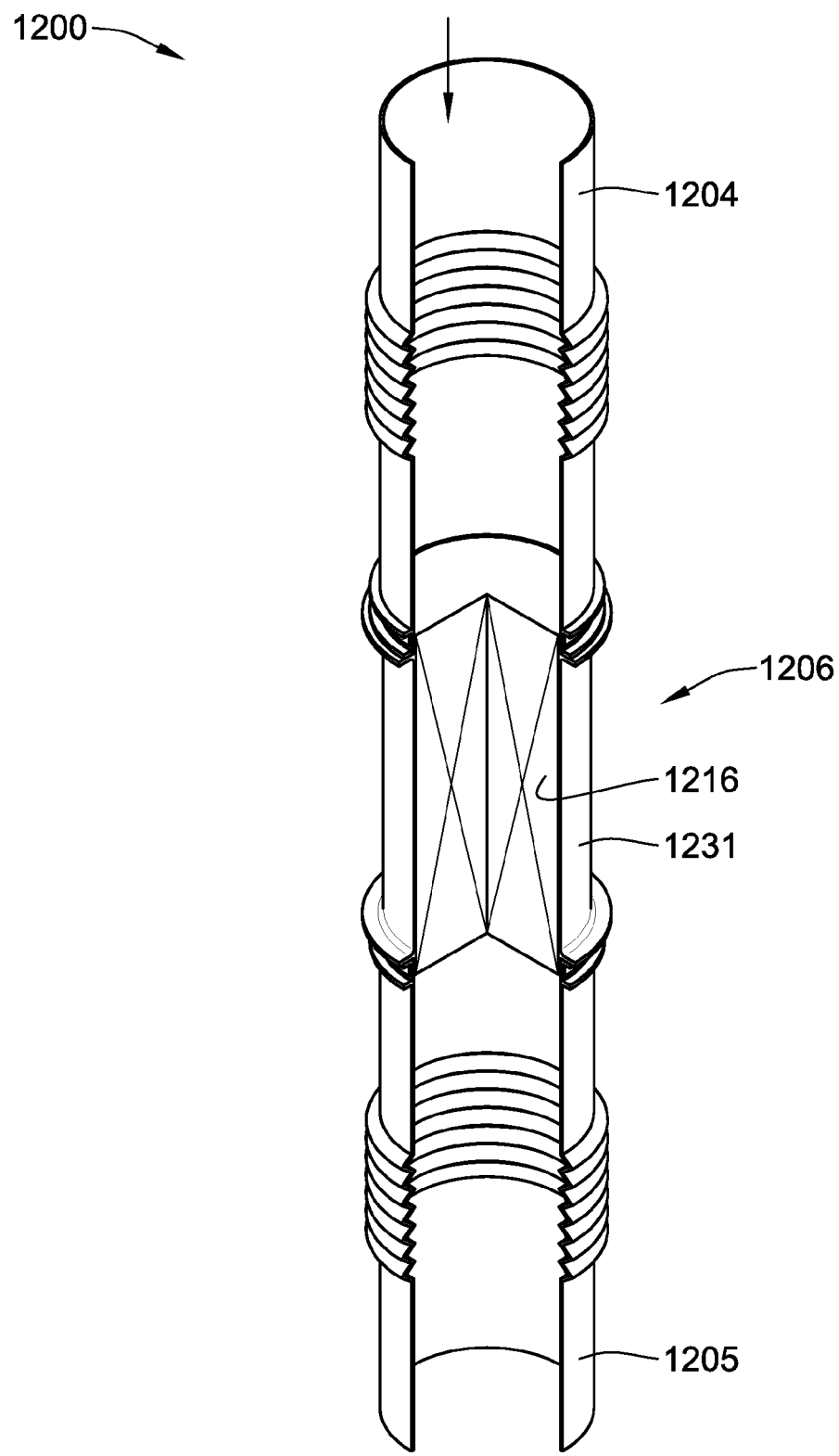
FIGS. 45-47 illustrate an eleventh embodiment of a filter assembly.
Figure 46:
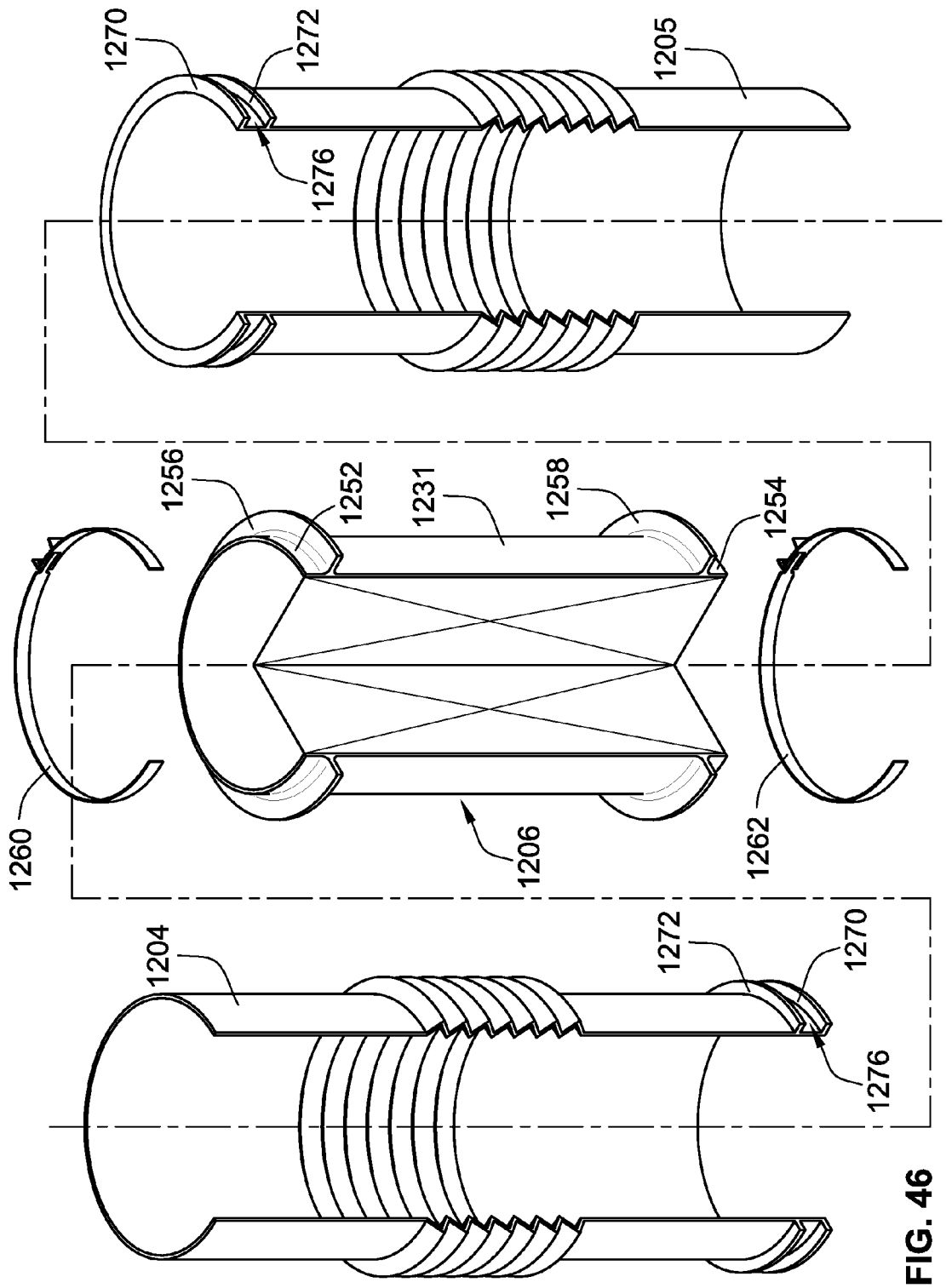
Figure 47:
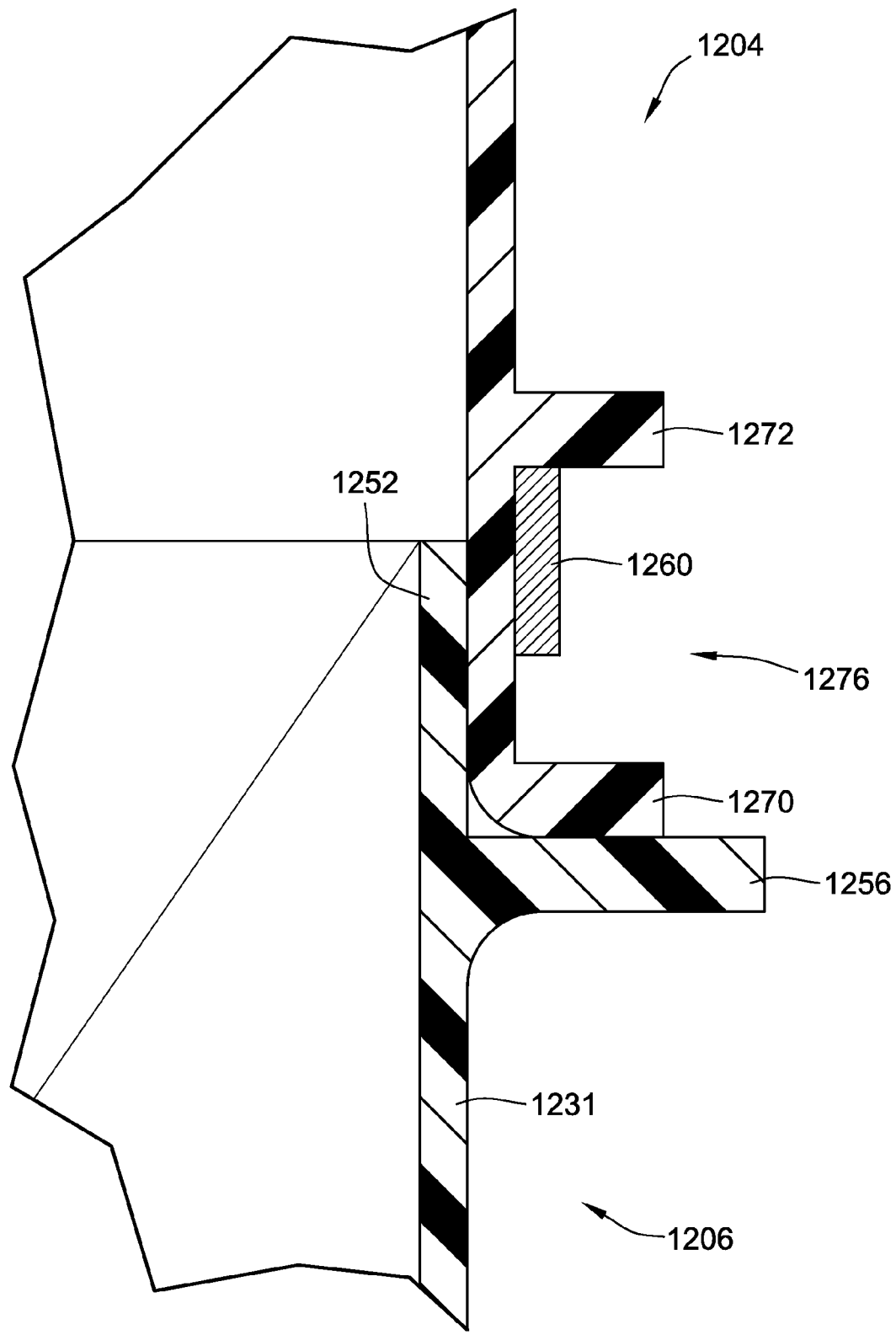
Figure 48:
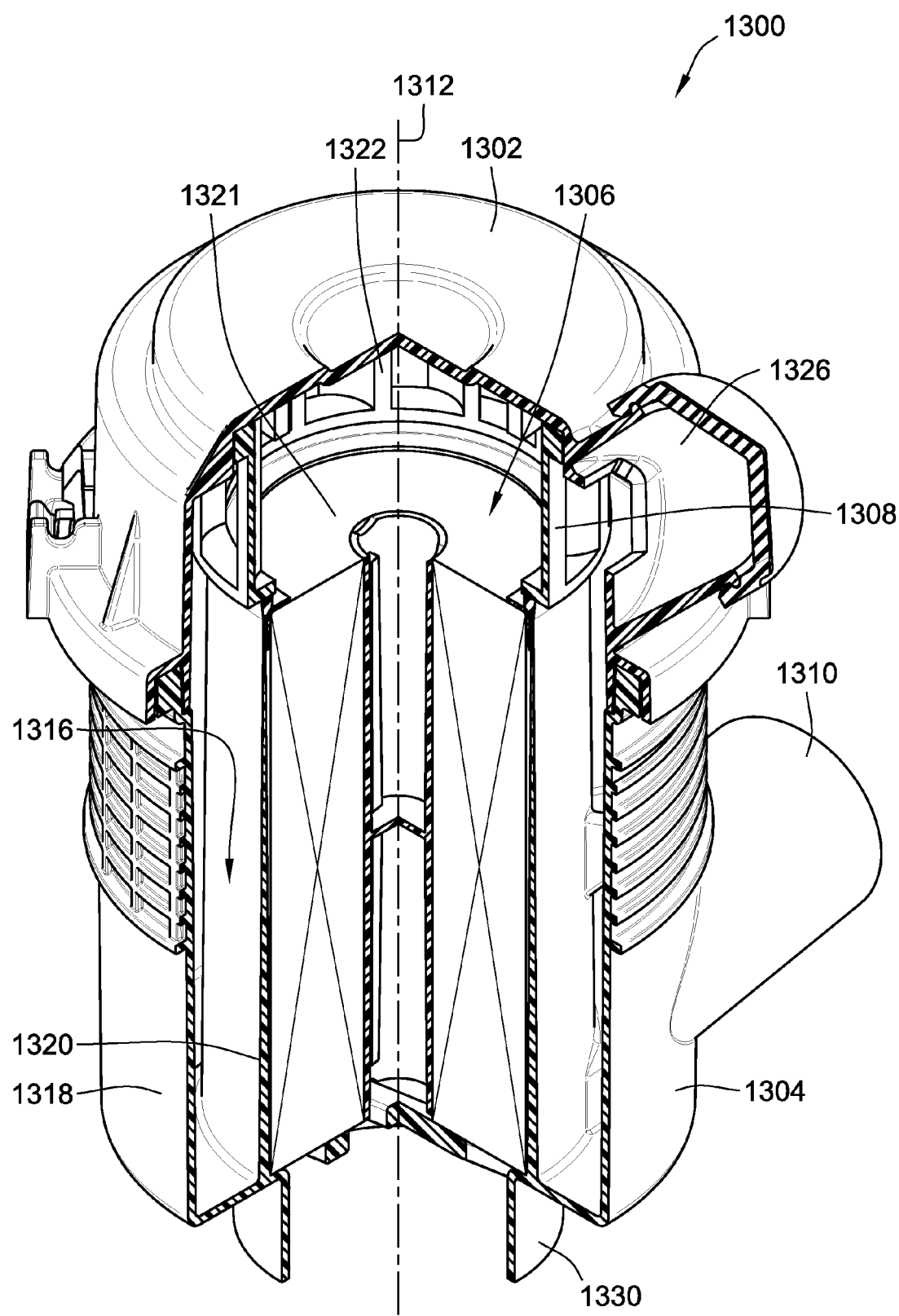
FIGS. 48-51 illustrate a twelfth embodiment of a filter assembly.

FIGS. 45-47 illustrate a further embodiment of a filter assembly 1200 according to the teachings of the present invention. Filter assembly 1200 includes upstream and downstream housing sections 1204, 1205 and a filter element 1206 interposed therebetween. In this embodiment, the filter element 1206 is inline with the upstream and downstream housing sections 1204, 1205.

The filter element 1206 generally includes a cylindrical pack of filter media 1216 within an imperforate wrapper portion 1231. The wrapper portion 1231 is preferably plastic. The filter media 1216 is preferably fluted media.

The filter element 1206 is generally replaced by removing the filter element 1206 in a direction that is generally perpendicular to the flow of fluid through the system.

The wrapper portion 1231 generally forms part of a flow path defined by the upstream and downstream housing sections 1204, 1205 and the wrapper portion 1231. The filter element is substantially identical at each end and can preferably be used with either end upstream or downstream. With primary reference to FIGS. 46 and 47, the filter element 1206 and particularly the wrapper portion 1231 includes axial insertion portions 1252, 1254 at opposite ends thereof. These portions 1252, 1254 are received in ends of housing portions 1204, 1205 when the filter assembly 1200 is fully assembled. Preferably, the outer diameter of these insertion portions 1252, 1254 of the outer wrapper portion 1231 are sized equal to or only slightly larger or smaller than an in outer diameter of the free ends of the housing portions 1204, 1205. The wrapper portion 1231 includes radially outward extending flange portions 1256, 1258 that act as axial stops for axially locating the filter element 1206 within the upstream and downstream housing portions 1204, 1205.

Metal clamps, such as hose clamps 1260, 1262, are used to secure the ends of the housing portions 1204, 1205 around the insertion portions 1252, 1254 when fully assembled.

The free ends of the housing portions 1204, 1205 include pairs of radially projecting flanges 1270, 1272. The radially projecting flanges 1270, 1272 are axially spaced apart forming an annular groove 1276 therebetween. The clamps 1260 are positioned within the grooves 1276 and tighten the housing portions 1204, 1205 around the filter element 1206.

FIGS. 48-51 illustrate a further embodiment of a filter assembly 1300. The filter assembly generally includes a cover or lid 1302, a housing 1304, a filter element 1306, and a fin cage 1308.

Fluid to be filter enters the filter assembly 1300 through an inlet 1310 at an angle and offset from a central axis 1312 of the filter assembly 1300. The fluid will spin angularly within the housing within a cavity 1316 formed between an outer wall portion 1318 and an inner wall portion 1320 as it travels axially towards an inlet end 1321 of the filter element 1306.

The fin cage 1308 includes a plurality of fins or veins 1322 that help separate any particulate entrained in the flowing fluid from the flowing fluid as the flowing fluid flows radially inward toward the filter element 1306.

The cover 1302 includes an outlet 1326 where the particulates removed from the flowing fluid can be exhausted from the filter assembly. The filter housing 1304 includes an outlet 1330 through which the cleaned fluid exits the filter assembly 1300 and progresses on to a downstream system, such as an internal combustion engine.

The filter element 1306 includes a sealing flange 1336 that extends axially and that defines a radially outward directed sealing surface. The sealing flange 1336 includes a radially inward extending portion that extends over an axial end face of the inlet end 1321 of the filter media 1340.

Figure 49:
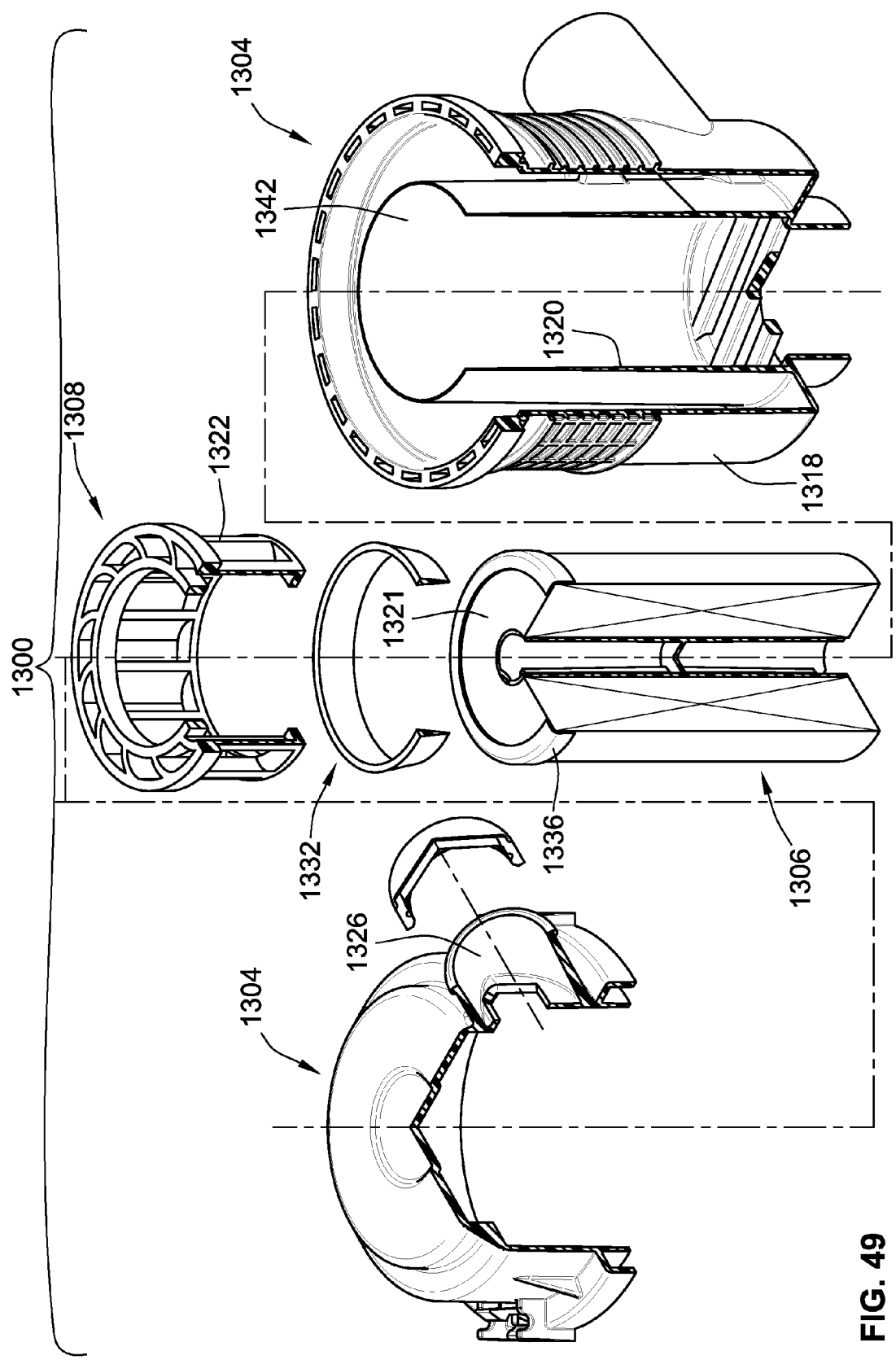
Figure 50:
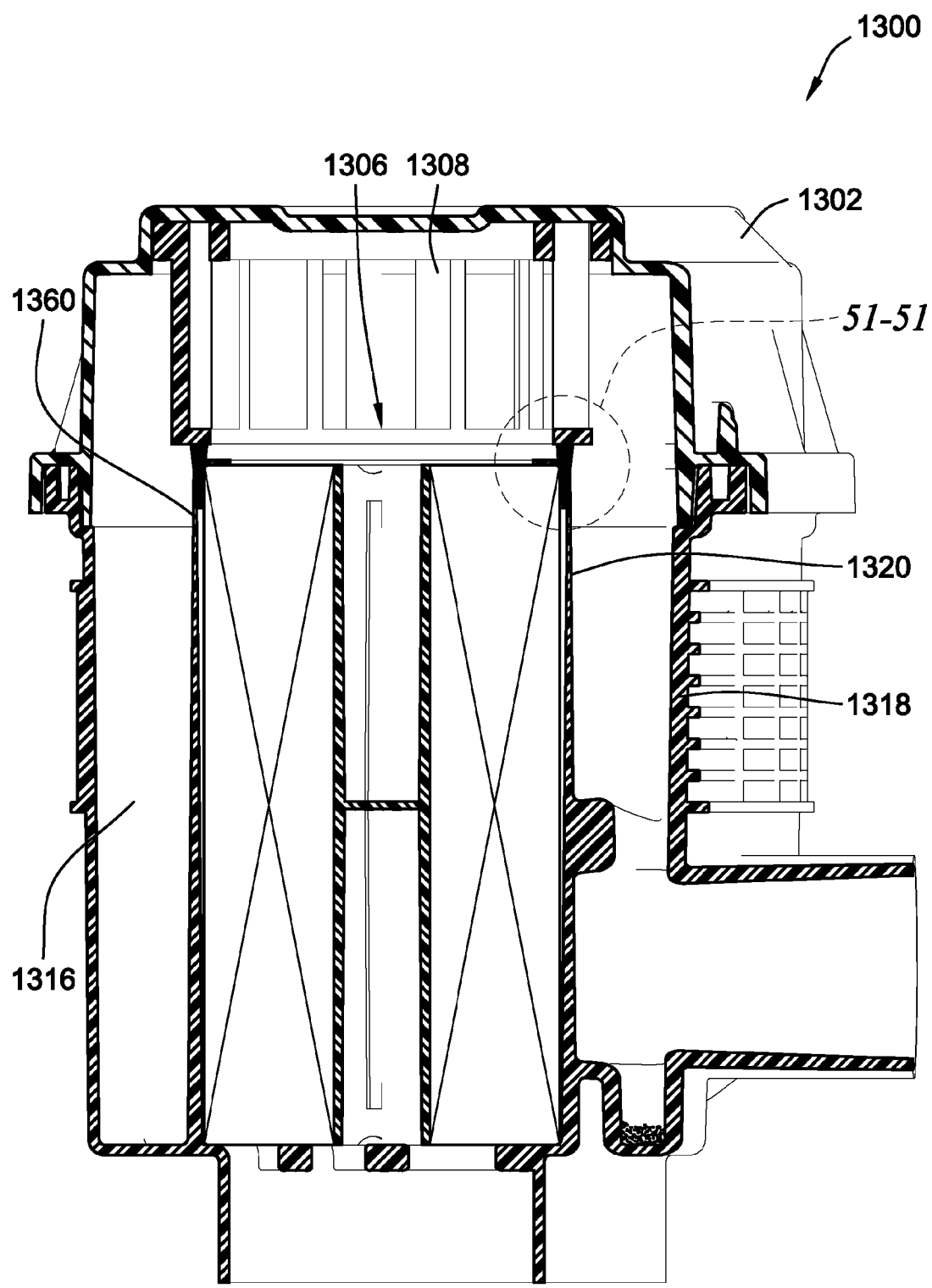
Figure 51:
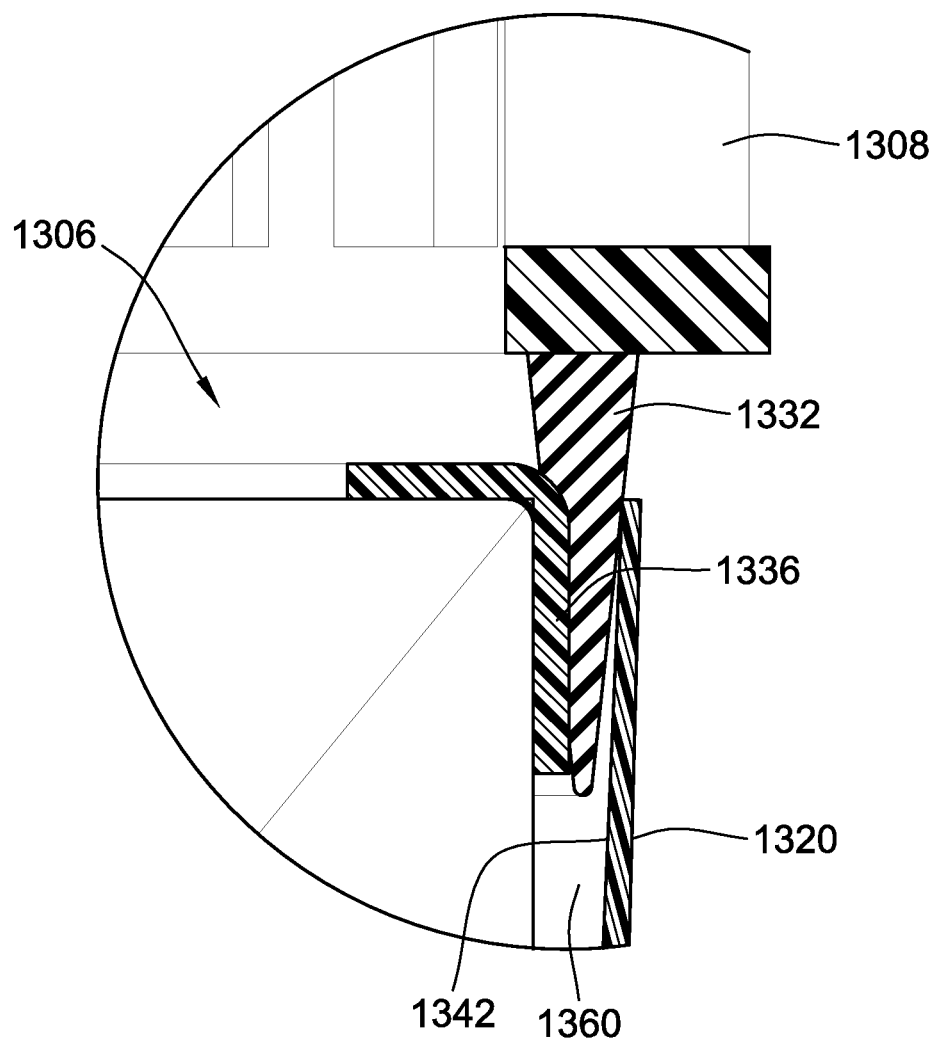

With additional reference to FIG. 49, the filter assembly includes a seal member 1332 that is wedge shaped in cross-section that is positioned radially between the sealing surface of the sealing flange 1336 and an inner surface 1342 of the inner wall portion 1320.

The cover 1302 will press axially on the fin cage 1308 and bias the fin cage 1308 axially towards filter element 1306. The opposite side of the fin cage 1308 will press axially against the seal member 1332 and axially press the seal member 1332 into a groove 1360 formed between the filter element 1306 and the inner wall portion 1320. In this configuration, the seal member 1332 will provide radial seals with the sealing flange 1336 and the inner surface 1342 of the inner wall portion 1320. The tapered shape of the seal member 1332 assists in wedging the seal member 1332 between seal flange 1336 and inner wall portion 1320.

The inner wall portion 1320 is radially inward of an outer annular sidewall of the housing through which the inlet 1310 of the filter housing extends at an angle relative to the central axis 1312 of the filter assembly. The inner wall portion 1320 is an annular wall portion that is tapered such that it gets thicker when moving in a downstream direction. The inner diameter of the inner wall portion 1320 is greater proximate an upstream end where the seal member 1332 seals than at a downstream end proximate outlet 1330. This taper provides for the groove or gap 1360 in which the wedge shaped seal member 1332 can be inserted while using a filter element that has a substantially cylindrical outer periphery. Further, the downstream end of the filter element can be radially located by the smaller diameter of the inner surface of the inner wall portion 1320 to promote better sealing at the inlet end of the filter element.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter assembly comprising:
a filter housing defining an internal cavity, an inlet and an outlet;
a first grate interposed between the inlet and the outlet;
a cover axially spaced from the first grate;
a seal;
a filter element having filter media, the filter element axially interposed between the first grate and the cover and positioned, at least in part, within the internal cavity, the seal acting between the filter element and the filter housing preventing bypass around the filter media from the inlet to the outlet;
wherein the filter element includes an outer wrapper, the filter media being positioned within the outer wrapper and being circumscribed by the outer wrapper;
wherein the filter media has a first axial length between an inlet face of the filter media and an outlet face of the filter media, the outer wrapper having a second axial length, the second axial length being less than the first axial length such that an exposed portion of the filter media extends axially out of the outer wrapper; and
wherein the cover includes an annular axially extending first flange portion that circumscribes the exposed portion of the filter media when the filter assembly is assembled.

2. The filter assembly of claim 1, wherein the outer wrapper is positioned axially between the inlet and outlet faces of the filter media.

3. The filter assembly of claim 1, wherein the exposed portion of the filter media is positioned axially between the inlet and outlet faces of the filter media.

4. The filter assembly of claim 1, wherein the filter media defines an outer periphery extending axially between the inlet and outlet faces of the filter media, the outer wrapper circumscribing the outer periphery of the filter media with the exposed portion of the filter media being provided by the outer periphery extending between the inlet and outlet faces of the filter media.

5. A filter assembly comprising:
a filter housing defining an internal cavity, an inlet and an outlet;
a first grate interposed between the inlet and the outlet;
a cover axially spaced from the first grate;
a seal;
a filter element having filter media, the filter element axially interposed between the first grate and the cover and positioned, at least in part, within the internal cavity, the seal acting between the filter element and the filter housing preventing bypass around the filter media from the inlet to the outlet;
wherein the filter element includes an outer wrapper, the filter media being positioned within the outer wrapper and being circumscribed by the outer wrapper;
wherein the filter media has a first axial length between an inlet face of the filter element and an outlet face of the filter element, the outer wrapper having a second axial length, the second axial length being less than the first axial length such that an exposed portion of the filter media extends axially out of the outer wrapper;
wherein the cover includes an annular axially extending first flange portion that circumscribes the exposed portion of the filter media when the filter assembly is assembled;
wherein the cover includes an annular axially extending second flange portion, the second flange portion extending axially into the internal cavity of the filter housing and being radially interposed between the filter element and the filter housing, the second flange portion being radially spaced from the first flange portion; and
wherein the cover includes a radially outward extending annular mounting flange and the filter housing includes a radially outward extending mounting flange, the mounting flanges of the cover and the filter housing axially abutting when the filter assembly is assembled.

6. The filter assembly of claim 5, wherein the first grate extends across and axially adjacent the outlet face and the cover extending across and axially adjacent the inlet face, the first grate adjacent the outlet face substantially inhibiting telescoping of the filter media in a direction of through the filter assembly.

7. The filter assembly of claim 5, wherein the first grate is integrally formed as part of the filter housing as a one-piece construction.

8. The filter assembly of claim 5, wherein the first grate is an independent component part from the filter housing, the seal and the filter element.

9. The filter assembly of claim 5, wherein the seal is compressed axially between the filter housing and the filter element forming an axial seal.

10. The filter assembly of claim 5, wherein the seal is compressed axially between the filter housing and the outer wrapper.

11. The filter assembly of claim 10, wherein the seal is not carried by the filter element.

12. The filter assembly of claim 10, wherein the outer wrapper includes a radially outward extending flange, the seal being axially compressed between the radially outward extending flange and the filter housing.

13. The filter assembly of claim 5, wherein the outer wrapper includes a plurality of a support ribs extending radially outward, the ribs being axially elongated.

14. The filter assembly of claim 13, wherein the outer wrapper includes a radially outward extending flange that extends radially outward further than the support ribs.

15. The filter assembly of claim 5, wherein the filter element includes a radially outward directed seal support flange operably secured to the filter media and the seal is axially compressed between the seal support flange and the housing.

16. The filter assembly of claim 15, wherein the housing includes a radially outward directed seal support flange, the seal being axially compressed between the seal support flanges of the housing and the filter element.

17. The filter assembly of claim 16, further comprising attachment mechanisms securing the cover to the housing.

18. The filter assembly of claim 17, wherein the attachment mechanisms includes one of either A) screws extending through the seal support flanges of the housing and the filter element or B) latches securing the cover to the housing.

19. A filter assembly comprising:
a filter housing defining an internal cavity, an inlet and an outlet;
a first grate interposed between the inlet and the outlet;
a cover axially spaced from the first grate;
a seal;
a filter element having filter media, the filter element axially interposed between the first grate and the cover and positioned, at least in part, within the internal cavity, the seal acting between the filter element and the filter housing preventing bypass around the filter media from the inlet to the outlet;
wherein the filter element includes an outer wrapper, the filter media being positioned within the outer wrapper and being circumscribed by the outer wrapper;
wherein the filter media has a first axial length between an inlet face of the filter element and an outlet face of the filter element, the outer wrapper having a second axial length, the second axial length being less than the first axial length such that an exposed portion of the filter media extends axially out of the outer wrapper;
wherein the cover includes an annular axially extending first flange portion that circumscribes the exposed portion of the filter media when the filter assembly is assembled;
wherein the cover includes an annular axially extending second flange portion, the second flange portion extending axially into the internal cavity of the filter housing and being radially interposed between the filter element and the filter housing, the second flange portion being radially spaced from the first flange portion; and
wherein the first and second flange portions provide a stepped relationship with the first flange portion having an internal diameter that is less than an internal diameter of the second flange portion.

20. A filter assembly comprising:
a filter housing defining an internal cavity, an inlet and an outlet;
a first grate interposed between the inlet and the outlet;
a cover axially spaced from the first grate;
a seal;
a filter element having filter media, the filter element axially interposed between the first grate and the cover and positioned, at least in part, within the internal cavity, the seal acting between the filter element and the filter housing preventing bypass around the filter media from the inlet to the outlet;
wherein the filter element includes an outer wrapper, the filter media being positioned within the outer wrapper and being circumscribed by the outer wrapper;
wherein the filter media has a first axial length between an inlet face of the filter element and an outlet face of the filter element, the outer wrapper having a second axial length, the second axial length being less than the first axial length such that an exposed portion of the filter media extends axially out of the outer wrapper;
wherein the cover includes an annular axially extending first flange portion that circumscribes the exposed portion of the filter media when the filter assembly is assembled,
wherein the filter media defines an outer periphery extending axially between the inlet and outlet faces, the outer wrapper circumscribing the outer periphery of the filter media with the exposed portion of the filter media being provided by the outer periphery extending between the inlet and outlet faces; and
wherein the outer wrapper extends axially along the outer periphery at least a majority of the first length between the inlet and outlet faces.

21. The filter assembly of claim 20, wherein the cover includes an annular axially extending second flange portion, the second flange portion extending axially into the internal cavity of the filter housing and being radially interposed between the filter element and the filter housing, the second flange portion being radially spaced from the first flange portion.

* * * * *